US009617152B2

(12) United States Patent
Johnston

(10) Patent No.: US 9,617,152 B2
(45) Date of Patent: Apr. 11, 2017

(54) REFORMING APPARATUS AND METHOD

(71) Applicant: Meggitt (UK) Limited, Christchurch, Dorset (GB)

(72) Inventor: Anthony M. Johnston, Double Bay (AU)

(73) Assignee: Meggitt (UK) Limited, Christchurch, Dorset (GB)

( * ) Notice: Subject to any disclaimer, the term of this patent is extended or adjusted under 35 U.S.C. 154(b) by 249 days.

(21) Appl. No.: 14/299,584

(22) Filed: Jun. 9, 2014

(65) Prior Publication Data

US 2014/0346401 A1 Nov. 27, 2014

Related U.S. Application Data

(60) Continuation of application No. 13/445,601, filed on Apr. 12, 2012, now Pat. No. 8,758,459, which is a (Continued)

(30) Foreign Application Priority Data

Jan. 4, 2002 (AU) ...................................... PR9817

(51) Int. Cl.
*C01B 3/34* (2006.01)
*C01B 3/38* (2006.01)
(Continued)

(52) U.S. Cl.
CPC ............... *C01B 3/34* (2013.01); *B01J 12/005* (2013.01); *B01J 19/249* (2013.01); *C01B 3/38* (2013.01);
(Continued)

(58) Field of Classification Search
CPC ................ C01B 3/38; C01B 3/48; C01B 3/34
See application file for complete search history.

(56) References Cited

U.S. PATENT DOCUMENTS 2,676,156 A 4/1954 Bailey
4,516,632 A 5/1985 Swift et al.
(Continued)

FOREIGN PATENT DOCUMENTS

DE 4313723 11/1994
EP 0308976 3/1989
(Continued)

OTHER PUBLICATIONS

PCT, International Preliminary Examination Report, Jul. 1, 2003, International Application No. PCT/AU03/00022, Australian Patent Office.
(Continued)

*Primary Examiner* — Matthew Merkling
(74) *Attorney, Agent, or Firm* — Jones Day

(57) ABSTRACT

A multiple adiabatic bed reforming apparatus and process are disclosed in which stage-wise combustion, in combination with multiple reforming chambers with catalyst, utilize co-flow and cross-flow under laminar flow conditions, to provide a reformer suitable for smaller production situation as well as large scale production. A passive stage by stage fuel distribution network suitable for low pressure fuel is incorporated and the resistances in successive fuel distribution lines control the amount of fuel delivered to each combustion stage.

27 Claims, 35 Drawing Sheets

Related U.S. Application Data division of application No. 12/157,695, filed on Jun. 11, 2008, now Pat. No. 8,177,868, which is a continuation-in-part of application No. 11/818,916, filed on Jun. 16, 2007, now Pat. No. 7,967,878, which is a continuation-in-part of application No. 10/500,176, filed as application No. PCT/AU03/00022 on Jan. 3, 2003, now Pat. No. 7,276,214.

(51) Int. Cl.
    *C01B 3/48* (2006.01)
    *B01J 19/24* (2006.01)
    *B01J 12/00* (2006.01)

(52) U.S. Cl.
    CPC ......... *C01B 3/48* (2013.01); *B01J 2219/2453* (2013.01); *B01J 2219/2458* (2013.01); *B01J 2219/2465* (2013.01); *B01J 2219/2475* (2013.01); *B01J 2219/2477* (2013.01); *B01J 2219/2497* (2013.01); *C01B 2203/0216* (2013.01); *C01B 2203/0233* (2013.01); *C01B 2203/0288* (2013.01); *C01B 2203/044* (2013.01); *C01B 2203/047* (2013.01); *C01B 2203/0495* (2013.01); *C01B 2203/066* (2013.01); *C01B 2203/0811* (2013.01); *C01B 2203/0844* (2013.01); *C01B 2203/0866* (2013.01); *C01B 2203/0883* (2013.01); *C01B 2203/1241* (2013.01); *C01B 2203/143* (2013.01); *C01B 2203/146* (2013.01); *C01B 2203/147* (2013.01); *C01B 2203/82* (2013.01); *Y02P 20/129* (2015.11)

(56) References Cited

U.S. PATENT DOCUMENTS

| | | | |
|---|---|---|---|
| 4,569,391 | A | 2/1986 | Hulswitt et al. |
| 5,068,058 | A | 11/1991 | Bushinsky et al. |
| 5,209,906 | A | 5/1993 | Watkins et al. |
| 5,324,452 | A | 6/1994 | Allam et al. |
| 5,733,347 | A | 3/1998 | Lesieur |
| 6,048,472 | A | 4/2000 | Nataraj et al. |
| 6,117,578 | A | 9/2000 | Lesieur |
| 6,214,066 | B1 | 4/2001 | Nataraj et al. |
| 6,296,679 | B1 | 10/2001 | Kato |
| 6,447,736 | B1 | 9/2002 | Autenrieth et al. |
| 6,562,105 | B2 | 5/2003 | Gottzmann |
| 6,695,983 | B2 | 2/2004 | Prasad et al. |
| 6,892,802 | B2 | 5/2005 | Kelly et al. |
| 6,893,619 | B1 | 5/2005 | James et al. |
| 7,008,707 | B2 | 3/2006 | Goebel |
| 7,101,175 | B2 | 9/2006 | Deshpande et al. |
| 7,128,769 | B2 | 10/2006 | Renn |
| 2002/0071797 | A1 | 6/2002 | Loffler |
| 2002/0155061 | A1* | 10/2002 | Prasad ............ C01B 3/382 423/652 |
| 2003/0049184 | A1 | 3/2003 | Kimata et al. |
| 2003/0103878 | A1 | 6/2003 | Morse et al. |
| 2003/0154654 | A1 | 8/2003 | Goebel |
| 2004/0209131 | A1 | 10/2004 | Bolton et al. |
| 2007/0000176 | A1 | 1/2007 | Liu et al. |

FOREIGN PATENT DOCUMENTS

| | | |
|---|---|---|
| EP | 0529329 | 3/1993 |
| EP | 0430184 | 9/1993 |
| EP | 0926097 | 9/2003 |
| EP | 1403215 | 3/2004 |
| GB | 671573 | 5/1952 |
| GB | 2333351 | 7/1999 |
| JP | 2001/052727 | 2/2001 |
| JP | 2005/087784 | 4/2005 |
| JP | 2006/327836 | 12/2006 |
| WO | WO 97/21064 | 6/1997 |
| WO | WO 01/54806 | 8/2001 |
| WO | WO 02/28769 | 4/2002 |
| WO | 02/100773 | 12/2002 |
| WO | 03/055585 | 7/2003 |
| WO | 2007/047898 | 4/2007 |

OTHER PUBLICATIONS

PCT, International Search Report, Jun. 5, 2001, International Application No. PCT/GB01/00258, European Patent Office.

PCT, International Preliminary Examination Report, Jun. 5, 2002, International Application No. PCT/GB01/00258, European Patent Office.

PCT, International Search Report, Mar. 10, 2003, International Application No. PCT/AU03/00022, Australian Patent Office.

PCT, International Search Report, Jul. 28, 2008, International Application No. PCT/AU2008/000870, Australian Patent Office.

PCT, Written Opinion of the International Searching Authority, Jul. 28, 2008, International Application No. PCT/AU2008/000870, Australian Patent Office.

European Search Report, Mar. 26, 2015, Application No. 14188506. 1, European Patent Office.

Official Action (with English summary attached), Nov. 24, 2015, Application No. 2014-216383, Japanese Patent Office.

Bes, Th., "Thermal Performances of Codirected Cross-Flow Heat Exchangers," *Heat and Mass Transfer*, vol. 31 (1996) pp. 215-222.

Hofman, A., "The Cross-Flow Heat Exchanger in Comparison," *Heat and Mass Transfer*, vol. 40 (2004) pp. 903-907.

Ogulata, R. T. et al., "Experiments and Entropy Generation Minimization Analysis of a Cross-Flow Heat Exchanger," *Int. J. Heat Mass Transfer*, vol. 41, No. 2 (1998) pp. 373-381.

Reay, David, "Compact Heat Exchangers—Moving Up the Learning Curve," *CADDET Energy Efficiency Analyses Series*, Newsletter No. 4 (1999) pp. 27-28.

\* cited by examiner

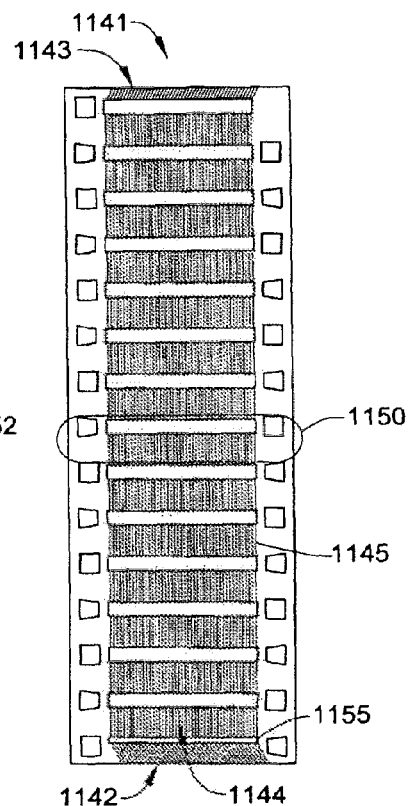
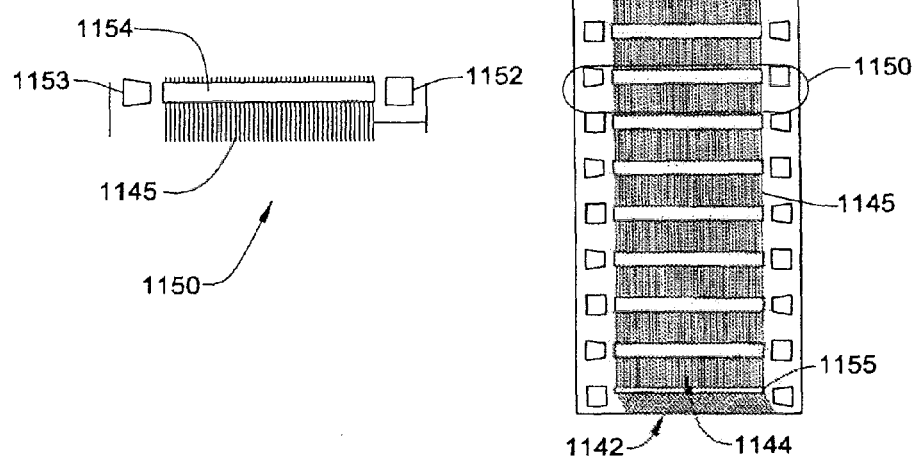

FIG. 11E
FIG. 11F
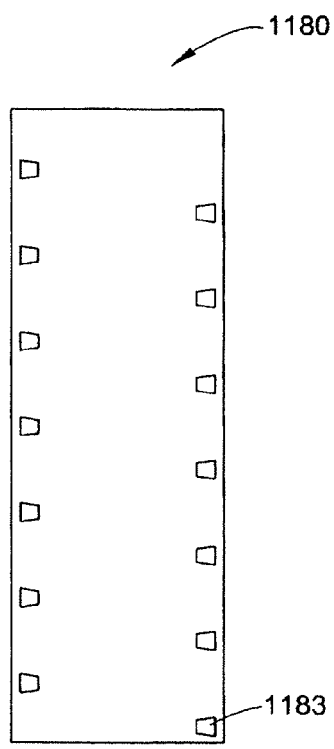
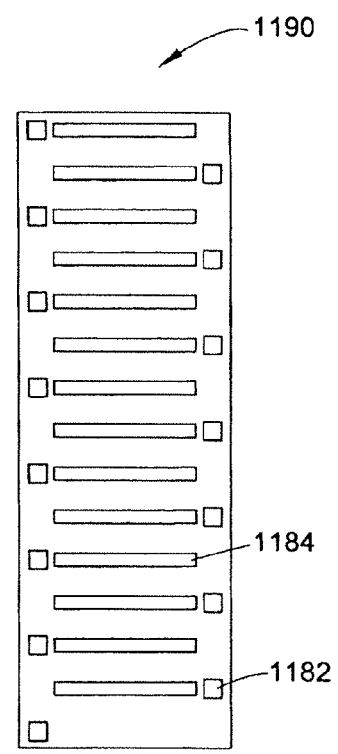

REFORMING APPARATUS AND METHOD

CROSS-REFERENCE TO RELATED APPLICATIONS

This application is a continuation of U.S. patent application Ser. No. 13/445,601, filed Apr. 12, 2012, which is a divisional of U.S. patent application Ser. No. 12/157,695, filed Jun. 11, 2008, now U.S. Pat. No. 8,177,868, which is a continuation-in-part of U.S. patent application Ser. No. 11/818,916, filed Jun. 16, 2007, now U.S. Pat. No. 7,967,878, which is further a continuation-in-part of U.S. patent application Ser. No. 10/500,176, filed Jan. 10, 2005, now U.S. Pat. No. 7,276,214, which is the National Stage under 35 U.S.C. §371 of International Patent Application No. PCT/AU2003/000022, filed Jan. 3, 2003. Each of the foregoing related applications, in their entirety, are incorporated herein by reference.

FIELD OF THE INVENTION

This invention relates to apparatuses and methods for reforming of gaseous hydrocarbons and more particularly relates to high efficiency, low metal dusting, low coking apparatuses and methods for reforming gaseous hydrocarbons.

BACKGROUND OF THE INVENTION

Steam reforming is a catalytic reaction in which a mixture of steam and gaseous hydrocarbons is exposed to a catalyst at high temperature to produce a mixture of carbon oxides and hydrogen, commonly known as syngas. Syngas may be further converted to a very wide range of bulk and specialty chemicals, including hydrogen, methanol, ammonia, transport fuels and lubricants.

The chemical reactions involved in steam reforming have been well known for many years. Indeed, steam reforming has been used by industry since the 1930s, and steam reforming of natural gas has been the dominant method of hydrogen production since the 1960s, when high pressure operation was introduced.

Two potential problems arising from the reforming reactions include metal dusting and coking, which can lead to process inefficiencies and equipment failure. Metal dusting occurs when the combination of temperature, pressure and composition within a carbonaceous gaseous environment leads to corrosive degradation of alloys into dust. Metal dusting conditions can be difficult to avoid in reformer systems and thus metal dusting is a constant threat. Coking occurs when the gaseous hydrocarbons crack to produce a solid carbonaceous material which may clog or damage flow paths, which can lead to heat transfer and conversion inefficiencies and equipment failure.

Industrial steam reformers are conventionally of tubular construction, employing several large metal tubes packed with the reforming catalyst. The hydrocarbon/steam feed mixture flows through the tubes, contacting the catalyst and undergoing conversion to syngas. Because the reforming reactions are endothermic, heat must be supplied to maintain the required reforming temperatures (generally above 800° C.). In conventional tubular reforming systems, this is accomplished by placing the tubes in a combustion furnace, usually fired by natural gas, where the heat is transmitted to the tubes by a combination of convective and radiant heat transfer.

Thus, the successful operation of a tubular reformer relies on maintaining a somewhat delicate balance between the endothermic reforming reactions within the tubes and the heat transfer to the tubes from the furnace combustion. The heat flux through the tube walls must be sufficiently high to maintain the required temperatures for the reforming reactions, but must not be so high as to give rise to excessive metal wall temperatures (accompanied by strength reduction) or to coking of the hydrocarbon at hot spots within the tubes. Therefore, the operation of tubular reformers must be subject to stringent control.

While large-scale tubular reformers have been very successful both technically and economically, small-scale tubular reformers are less successful. Amongst other things, the costs to manufacture, install, maintain and operate tubular reformers on a smaller scale are unattractive.

Smaller users of syngas downstream products such as hydrogen, ammonia and methanol have therefore not found it attractive to establish on-site production facilities for those products. Rather, they generally rely on truck-delivery of cylinders of the product from bulk producers. This solution is becoming less attractive as the price of transport fuels increases. Also, many such users with access to natural gas would prefer to have on-site production facilities not only to avoid transport costs but also to enhance the reliability of their supply. Additionally, much of the world's natural gas supply lies in small fields in remote regions not served by pipelines to the natural gas market. The energy content of this so-called "stranded gas" could be more easily transported to market if the gas were first converted to liquids such as methanol and long-chain hydrocarbons, which may be produced from syngas.

Therefore there is a need for the production of syngas on a smaller scale than has been economically and practically feasible with conventional tubular systems, and that need is likely to increase. There are considerable challenges, however: a smaller-scale system must be reasonably proportionate to large scale plant in initial cost, and operating costs must also be proportionate to the scale of production. Low operating costs require high energy efficiency, minimizing natural gas costs, simplicity of operation and minimizing or avoiding the need for attention from full-time plant operators.

While the amount of heat required by the reforming reactions is fixed by thermodynamics, the overall efficiency of energy usage in the plant is dependent upon the effectiveness with which heat is recovered from the hot syngas and hot combustion flue streams to preheat the cold feeds to reforming temperatures and raise the necessary steam. High-effectiveness feed-effluent heat exchangers and the use of flue-heated pre-reformers can assist in this regard. Importantly, whilst large-scale reforming systems might claim energy efficiency credit for the energy content of excess steam exported to other processes on the site, small-scale reforming systems are unlikely to have an export destination available for excess steam and hence its production does not enhance efficiency.

Both initial capital costs and operational simplicity may be enhanced by minimizing the use of active control, using instead passive control techniques where possible. For example, the suitable splitting of a single stream to pass to several components connected in parallel can be achieved by arranging for suitable relative pressure drops through those components, without the use of control valves. As a further example, the temperature of a stream exiting a heat exchanger can be held within close limits by arranging for the heat exchanger to operate with a small temperature pinch.

An additional consideration in small-scale systems is that the user might not operate continuously at or near full plant capacity, in contrast to large-scale plants. Therefore modulation of throughput through a wide range should be achievable and subject to automation, as should fast start-up and shut-down procedures.

The small-scale reformer should also minimize maintenance requirements.

Thus, there is a need for a small-scale reforming process and apparatus which will accomplish the goal of being capital and operating cost-competitive with large-scale systems as a result of simplicity of control, monitoring and maintenance together with high energy efficiency.

BRIEF SUMMARY OF THE INVENTION

In some embodiments, a gaseous hydrocarbon-steam reforming process and/or apparatus may be designed to limit the occurrence of metal dusting conditions to localized portions of the apparatus or process. In some embodiments, the localized portions of the apparatus or process to which the occurrence of metal dusting conditions are limited may include a fuel pre-heater wherein a fuel/air mixture is partially combusted to heat a fuel stream from below the metal dusting temperature to above the metal dusting temperature. In some embodiments, the localized portions of the apparatus or process to which the occurrence of metal dusting conditions are limited may include an air pre-heater wherein a fuel/air mixture is combusted to heat an air stream from below the metal dusting temperature to above the metal dusting temperature. In some embodiments, the localized portions of the apparatus or process to which the occurrence of metal dusting conditions are limited may include a portion of the piping adjacent to a quench heat exchanger where a portion of the syngas stream formed during the reformer process is quenched from above the metal dusting temperature to below the metal dusting temperature. In some embodiments, the localized portions of the apparatus or process to which the occurrence of metal dusting conditions are limited may include a portion of the process piping where the quenched syngas is mixed with a second portion of the syngas that has not been quenched.

Accordingly, in some embodiments, the gaseous hydrocarbon-steam reforming process may include a) preheating one or more air streams to form one or more preheated air streams;

b) combining at least one air stream with a portion of at least one fuel stream to form a fuel/air mixture having a temperature below metal dusting conditions;

c) partially combusting the fuel in a portion of the fuel/air mixture to form a heated fuel stream having a temperature above metal dusting conditions for use in one or more reformer stages;

d) combusting a portion of the fuel/air mixture in the presence of at least one of the preheated air streams to form a heated air stream having a temperature above metal dusting conditions for use in reforming for use in one or more reformer stages;

e) heating one or more water streams to form steam;

f) mixing the steam with one or more gaseous hydrocarbon streams to form a gaseous hydrocarbon-steam stream;

g) heating and partially reforming the gaseous hydrocarbon-steam stream in one or more pre-reforming stages to form a reformer stream, wherein throughout the one or more pre-reforming stages the gaseous hydrocarbon-steam stream has a combination of temperature and composition that avoids metal dusting and coking conditions;

h) reforming the reformer stream in one or more reformer stages to form a syngas stream and a flue gas stream, wherein throughout the one or more reforming stages the reformer stream has a combination of temperature and composition that avoids metal dusting and coking conditions;

i) recovering heat from the flue gas stream to provide heat to the pre-reforming stages in step g) and to provide preheating to the water stream; and j) recovering heat from the syngas stream to preheat the air stream from step a) and to provide heat to form steam in step e).

In some embodiments, the process or apparatus comprises a process or apparatus for steam reforming of gaseous hydrocarbons to produce syngas where the feed rate of the gaseous hydrocarbon is from 1 to 10,000 standard cubic meters per hour ("SCMH"). In some embodiments, the process or apparatus is configured to minimize, avoid or localize the occurrence of metal dusting and/or coking conditions throughout the steam reforming process. Preferably, the process or apparatus is configured to avoid metal dusting conditions in the heat exchangers, reforming stages and pre-reforming stages of the process or apparatus. Preferably, the process or apparatus is configured to avoid coking conditions in the fuel feed streams, in the pre-reforming and reforming stages and/or in the syngas streams.

In some embodiments, the process or apparatus comprises a process or apparatus for steam reforming of gaseous hydrocarbons to produce syngas, where the process has a hydrocarbon conversion of greater than 50% and less than 95%. In some embodiments, the process or apparatus comprises a process or apparatus for steam reforming of gaseous hydrocarbons to produce syngas, where the process has an energy efficiency of greater than 50%. In some embodiments, the process or apparatus comprises a process or apparatus for steam reforming of gaseous hydrocarbons, wherein all steam required for the process is generated and used within the process, i.e. there is no steam export from or import into the process.

In some embodiments, a process or apparatus for steam reforming of gaseous hydrocarbons comprises a passive flow control system whereby the appropriate amount of fuel and air are delivered to various points in the process, such as the pre-heaters, the pre-reforming stages and/or the reforming stages by means of pressure drop balancing within the heat exchangers, the pre-reformer stages and/or the reformer stages.

In general, steam reforming of gaseous hydrocarbon streams is believed to involve the following reactions:

$$C_nH_m + nH_2O \leftrightarrow nCO + (n+m/2)H_2 \tag{1};$$

and

$$CO + H_2O \leftrightarrow CO_2 + H_2 \tag{2}$$

Equation (1) reduces to

$$CH_4 + H_2O \leftrightarrow CO + 3H_2 \tag{3}$$

when the gaseous hydrocarbon is methane.

BRIEF SUMMARY OF THE DRAWINGS

FIG. 11A-F show schematics of plates that may be used to form an embodiment of a reformer.

DEFINITIONS

Figure 1A:
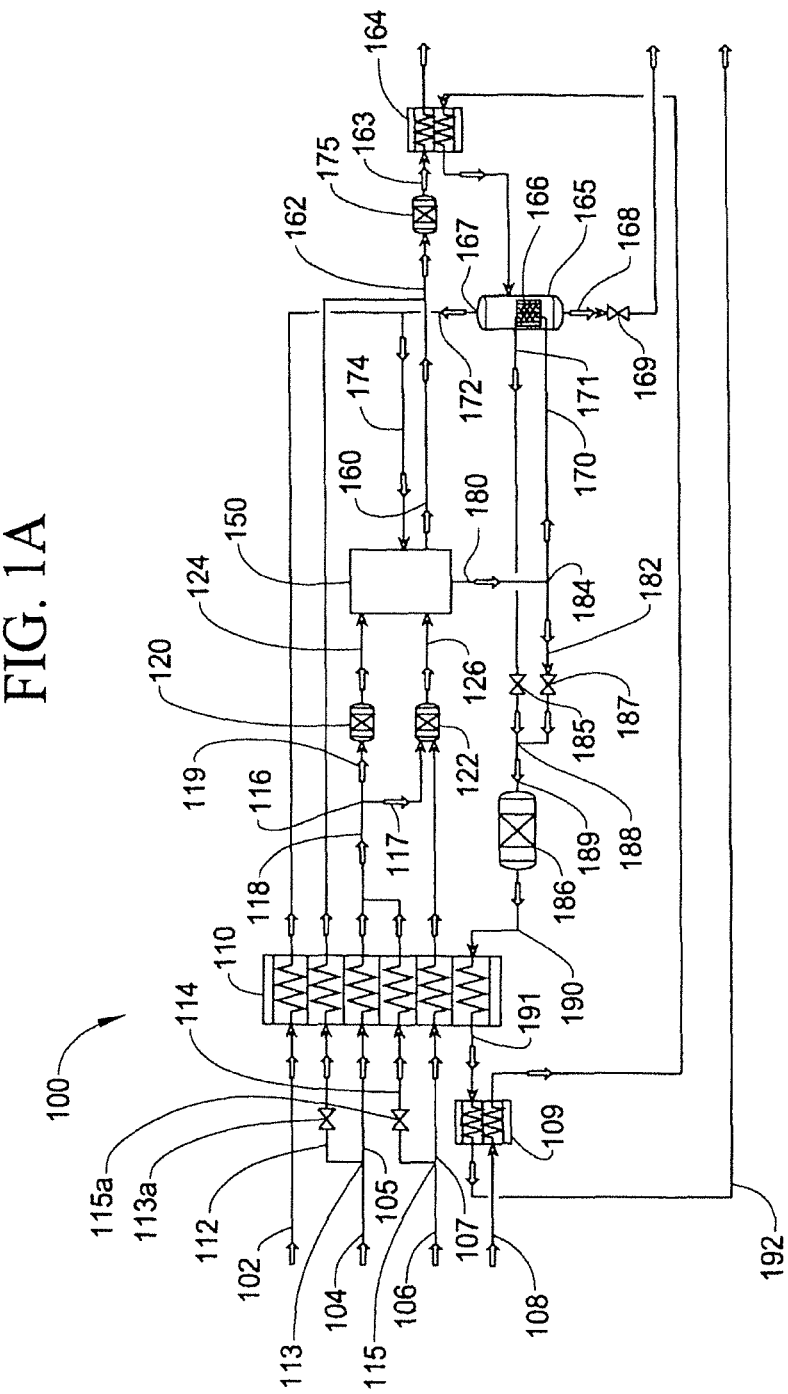
FIG. 1A shows a schematic of an embodiment of a reforming system.

Metal dusting conditions: the combination of temperature and composition within a carbonaceous gaseous environment that leads to corrosive degradation of structural materials and alloys into dust. In general, metal dusting occurs at intermediate temperatures between 400° C. and 800° C. and where the activity of the carbon in the gas phase ("$a_C$") is greater than 1. Because metal dusting is a result of a combination of temperature and composition in a given stream, either of these variables may be manipulated to avoid or reduce the occurrence of metal dusting conditions. Accordingly, for some compositions, the upper limit for metal dusting may be less than 800° C. such as 700° C. or 750° C. and the lower limit may be higher than 400° C. such as 420° C. or 450° C. Thus, it should be understood that 400° C. to 800° C. is intended as a general rule of thumb, but that there are exceptions and that metal dusting conditions involve the combination of composition and temperature. Accordingly, when this application mentions "metal dusting conditions are avoided or reduced" and the like, it is intended that the combination of the variables that may lead to metal dusting conditions are avoided or reduced by either manipulating temperature, composition or both.

While not wishing to be bound by any theories, metal dusting is believed to be, for the most part, a result of the following reactions:

(4)

and

(5)

Accordingly, metal dusting conditions may be avoided or reduced by manipulating the temperature and/or composition of a gaseous stream to avoid these reaction situations and to avoid conditions where $a_C$>1. Alternatively, the process and/or apparatus may be designed to limit the occurrence of metal dusting conditions to localized points of the process and/or apparatus to minimize repair requirements, minimize difficulty and cost of repair and minimize requirements for use of costly alloys or coated materials that are resistant to metal dusting.

Metal dusting resistant materials: Metal dusting resistant materials are materials that resist corrosive degradation when exposed to metal dusting conditions. Any materials that are metal dusting resistant and otherwise are suitable for the relevant process conditions such as temperature and pressure may be used. In some embodiments, the metal dusting resistant materials may be Alloy 617, Alloy 617 coated with an aluminide coating or Alloy 800H coated with an aluminide coating. The aluminide coating may be formed by depositing aluminium onto the surface of the material, diffusing it into the alloy at high temperature and oxidizing it.

Catalysts: In general, when the term catalyst is used herein with respect to the reforming or combustion beds or chambers, it is intended to include any suitable catalyst, such as any suitable non-precious or precious metal catalyst or mixtures and combinations thereof, which may be a structured or unstructured catalyst and may be a supported or unsupported catalyst. Suitable unstructured catalysts may include porous particulate catalysts which may have their size optimized to achieve the desired reforming reaction or combustion, while maintaining the desired pressure drop within the relevant stream. Suitable structured catalysts may be coated on a metallic wire mesh or metal foil support or on a ceramic matrix. In some embodiments, the catalyst may comprise a metal catalyst comprising a metal selected from: gold, silver, platinum, palladium, ruthenium, rhodium, osmium, iridium, or rhenium or combinations of one or more thereof. In some embodiments, the catalyst may be a platinum/palladium catalyst on an alumina washcoat support coated on a fecralloy (iron-chromium-aluminium) metal foil matrix.

Alternatively, when using the term catalyst when referring to a water-gas shift reactor catalyst, it is intended to include any suitable catalyst, such as a non-precious or precious metal catalyst or mixtures and combinations thereof, which may be a structured or unstructured catalyst and may be a supported or unsupported catalyst. Suitable unstructured catalysts may include porous particulate catalysts which may have their size optimized to achieve the desired water-gas shift reaction, while maintaining the desired pressure drop within the relevant stream. Suitable structured catalysts may be coated on a metallic wire mesh or metal foil support or on a ceramic matrix.

DETAILED DESCRIPTION

In some embodiments, the process or apparatus comprises a process or apparatus for steam reforming of gaseous hydrocarbons to produce syngas where the feed rate of the gaseous hydrocarbon is from 1 to 10,000 standard cubic meters per hour ("SCMH"), such as from 2 to 5000 SCMH, such as 1 to 10, 10 to 100, 100 to 1000, 1000 to 10,000, 10 to 4000, 15 to 3000, 20 to 2000, 30 to 1000, 40 to 500, 50 to 250 or 60 to 100 SCMH.

In some embodiments, a process or apparatus for steam reforming of gaseous hydrocarbons to produce syngas, may have a hydrocarbon conversion of 50% or greater such as from 50% to 95%, such as from 55% to 90%, from 60% to 85%, from 65% to 80% or from 70% to 75%.

In some embodiments, a process or apparatus for steam reforming of gaseous hydrocarbons to produce syngas, may have an energy efficiency of from 50% to 90%, such as from 55% to 85%, from 60% to 80% or from 65% to 75% when calculated according to the following equation:

$$\frac{(LHV_s * M_s - LHV_f * M_f)}{LHV_{ng} * M_{ng}}$$

where
$LHV_s$=the amount of heat released per mole (or per kg) by combustion of the syngas product, excluding water latent heat;
$M_s$=the molar (or mass) flow rate of the syngas product;
$LHV_f$=the amount of heat released per mole (or per kg) by combustion of the fuel, excluding water latent heat;
$M_f$=the molar (or mass) flow rate of the fuel;
$LHV_{ng}$=the amount of heat released per mole (or per kg) by combustion of the natural gas, excluding water latent heat; and
$M_{ng}$=the molar (or mass) flow rate of the natural gas.

In some embodiments, the process or apparatus comprises a process or apparatus for steam reforming of gaseous hydrocarbons having the efficiencies described above and wherein all steam required for the process is generated and used within the process, i.e. there is no steam export from, or import into, the process.

In some embodiments, the process or apparatus is configured to minimize, avoid or localize the occurrence of metal dusting and/or coking conditions throughout. Preferably, the process or apparatus is configured to avoid metal dusting conditions in the heat exchangers, the pre-reforming stages and/or the reforming stages of the process or apparatus. Preferably, the process or apparatus is configured to avoid coking conditions in the gaseous hydrocarbon feed streams, the fuel feed streams, in the pre-reforming and reforming stages and/or in the syngas streams. In some embodiments, the process and/or apparatus may be designed to limit the occurrence of metal dusting conditions to localized points or components of the process and/or apparatus, such as to localized points of the process or apparatus that may be designed or constructed from metal dusting resistant or protected materials and/or configured for easy and/or lower cost repair and/or replacement.

In some embodiments, the process or apparatus for steam reforming of gaseous hydrocarbons comprises a passive flow control system whereby the appropriate amount of fuel and air are delivered to various points in the process, such as the pre-heater and the combustion stages of the reforming system by means of pressure drop balancing within the heat exchangers, the pre-reformer stages and/or the reformer stages.

In some embodiments, the gaseous hydrocarbon-steam reforming process comprises:
partially combusting the fuel in a first fuel/air mixture stream to heat the first fuel/air mixture stream for use during reforming of the gaseous hydrocarbon-steam stream;
combusting a second fuel/air mixture stream to heat an air stream for use during reforming of the gaseous hydrocarbon-steam stream; and
reforming the gaseous hydrocarbon-steam to form a syngas stream and a flue gas stream.

Partially combusting may comprise catalytically oxidizing at least a portion of the fuel in the first fuel/air mixture stream to provide a heated fuel stream. The partial combustion may use all or substantially all of the air in the first fuel/air mixture stream. After the partial combustion, the heated fuel stream may be provided to one or more reformer stages for further combustion to heat or re-heat one or more air streams. Combusting a second fuel/air mixture stream may comprise catalytically oxidizing all or substantially all of the fuel in the second fuel/air mixture stream to provide a heated air stream. The heated air stream may be provided to one or more reformer stages to provide heat to the gaseous hydrocarbon-steam stream being reformed. The resulting cooled air stream may then be heated or re-heated, for example by combustion of a portion of the heated fuel stream in the presence of the cooled air stream.

In some embodiments, reforming includes pre-reforming the gaseous hydrocarbon-steam stream to form a reformer stream, prior to reforming the reformer stream. In some embodiments, reforming includes reducing metal dusting and/or coking during reforming by heating and pre-reforming the gaseous hydrocarbon-steam stream in multiple pre-reforming stages to form a reformer stream, prior to reforming the reformer stream. In some embodiments, the pre-reforming includes partially reforming a portion of the gaseous hydrocarbon-steam stream. In some embodiments, partially reforming includes multiple pre-reforming stages, each stage including a) heating the gaseous hydrocarbon-steam stream followed by b) partial catalytic reforming of the gaseous hydrocarbon-steam stream. The heating may include recovering heat from a flue gas stream of the reforming process. The number of pre-reforming stages may be from 1 to 10 such as from 2 to 7 or 3 to 5 pre-reforming stages. In some embodiments, pre-reforming is performed in multiple stages to help avoid or reduce coking conditions during pre-reforming and reforming. In some embodiments, coking conditions are avoided or reduced during pre-reforming by altering the composition and/or temperature of the gaseous hydrocarbon-steam stream. In some embodiments, pre-reforming is conducted in a printed circuit reactor ("PCR").

The reformer stream may be reformed in one or more stages of catalytic reforming. In some embodiments, the reforming is conducted in a PCR. In some embodiments, the reforming comprises from 1 to 40 stages of reforming, such as from 2 to 35 stages, from 3 to 30 stages, from 5 to 25 stages, from 8 to 20 stages or from 10 to 15 stages of catalytic reforming. In some embodiments, reforming the gaseous hydrocarbon steam stream includes at least three stages of:

i) heating the reformer stream by recovering heat from a heated air stream in a heat exchanger to form a heated reformer stream and a cooled air stream;

ii) reforming at least a portion of the heated reformer stream; and iii) combusting a portion of a partially combusted fuel/air mixture stream in the presence of the cooled air stream to re-heat the cooled air stream.

In some embodiments, heating the reformer stream includes recovering heat in a heat exchanger from a heated air stream, such as the heated air stream made by combusting the second fuel/air mixture stream, or the heated air stream made by combusting a portion of the partially combusted fuel/air mixture stream in the presence of a cooled air stream to re-heat the cooled air stream. In some embodiments, the heat exchanger may comprise a co-flow, a cross-flow or a counter-flow heat exchanger. Preferably, the heat exchanger comprises a cross-flow heat exchanger. In some embodiments, the heat exchanger comprises a printed circuit heat exchanger. Preferably, the pressure drop across the heat exchanger for the heated air stream is less than 0.1 bar, such as less than 0.09 bar, less than 0.07 bar, less than 0.06 bar or less than 0.05 bar. In some embodiments, the pressure drop across the heat exchanger for the reformer stream is less than 0.5 bar, such as for example, less than 0.4 bar, less than 0.30 bar, less than 0.2 bar or less than 0.1 bar.

Reforming at least a portion of the heated reformer stream may include catalytically reforming a portion of the heated reformer stream to produce syngas. The reforming may be conducted through a series of catalytic reformation stages to maximize hydrocarbon conversion, while reducing or avoiding coking conditions in the reformer stream in the reformer. Preferably, the conversion of the gaseous hydrocarbon occurs according to Equation (1). In addition, additional production of hydrogen may occur via the water-gas shift reaction as follows:

$$CO+H_2O \rightarrow CO_2+H_2 \quad (6).$$

which may approach equilibrium during reforming and pre-reforming.

In some embodiments, combusting a portion of the partially combusted fuel/air mixture stream in the presence of the cooled air stream to re-heat the cooled air stream includes catalytic combustion of a portion of the partially combusted fuel/air mixture stream in the presence of the cooled air stream. In some embodiments, the portion of the partially combusted fuel/air mixture stream is supplied separately to the catalytic combustion chambers of a portion of, or all of, the reformer stages. In some embodiments, the portion of the partially combusted fuel/air mixture stream supplied to the reformer stages is the same amount of the partially combusted fuel/air mixture stream for each reformer stage supplied.

In other embodiments, the portion of the partially combusted fuel/air mixture stream supplied to the reformer stages varies depending on the stage supplied. In some embodiments, the amount of the partially combusted fuel/air mixture supplied to one or more of the combusting steps of the second and subsequent stages of the reformer may be less than that supplied to one or more of the preceding stages. For example, in some embodiments, the amount of the partially combusted fuel/air mixture stream supplied may reduce successively for each stage of reforming and in some embodiments, one or more later stages of reforming may have no portion of the partially combusted fuel/air mixture stream supplied to it. Preferably, the amount of the partially combusted fuel/air mixture supplied to the reformer stages reduces for each successive stage and may be zero for one or more stages.

The portion of the partially combusted fuel/air mixture stream supplied to each stage of reforming may be controlled using active or passive controls. Preferably the portion of the partially combusted fuel/air mixture stream supplied to each stage of reforming is controlled using passive flow control. Such passive flow control may be accomplished by balancing pressure drops in the fuel streams, the air streams, the fuel/air mixture streams and/or its component streams throughout the reformer and heat exchange components of the reforming process.

After the last reforming stage has been completed, two streams leave the reformer from which heat may be recovered. The first stream is the syngas stream, which is the reformed gaseous hydrocarbon-steam stream. The second stream is the flue gas stream, which is the air stream leaving the last heat exchanger from the last reformer stage. Each of these streams is at relatively high temperatures.

In some embodiments, the process or apparatus achieves the efficiencies described herein in part by recovering heat from the flue gas and/or the syngas streams leaving the reformer stages. In some embodiments, heat is recovered from the syngas stream into one or more reactant feed streams, such as one or more of: a gaseous hydrocarbon stream, one or more fuel streams, one or more air streams and one or more water streams in one or more heat exchangers. In some embodiments, heat is recovered in one or more heat exchangers from the flue gas stream to heat the gaseous hydrocarbon-steam stream in one or more of the pre-reformer stages. In some embodiments, heat is recovered from the flue gas stream by both the gaseous hydrocarbon steam-stream and one or more water streams. In some embodiments where heat is recovered from the flue gas stream by both the gaseous hydrocarbon steam-stream and one or more water streams, the flue gas stream is heated prior to exchanging heat with the water stream by combusting a portion of at least one fuel stream in the presence of the flue gas stream. In some embodiments, the water stream recovers heat from both the flue gas stream and the syngas stream. In some embodiments, heat is recovered from at least a portion of the syngas stream by quenching at least a portion of the syngas stream in a quench heat exchanger.

In some embodiments, the gaseous hydrocarbon-steam reforming process comprises:

a) preheating one or more air streams to form one or more preheated air streams;

b) combining at least one air stream with a portion of at least one fuel stream to form a fuel/air mixture having a temperature below metal dusting conditions;

c) partially combusting the fuel in a portion of the fuel/air mixture to form a heated fuel stream having a temperature above metal dusting conditions for use in one or more reformer stages;

d) combusting a portion of the fuel/air mixture in the presence of at least one of the preheated air streams to form a heated air stream having a temperature above metal dusting conditions for use in one or more reformer stages;

e) heating one or more water streams to form steam;

f) mixing the steam with one or more gaseous hydrocarbon streams to form a gaseous hydrocarbon-steam stream;

g) heating and partially reforming the gaseous hydrocarbon-steam stream in one or more pre-reforming stages to form a reformer stream, wherein throughout the one or more pre-reforming stages the gaseous hydrocarbon-steam stream has a combination of temperature and composition that avoids metal dusting and coking conditions;

h) reforming the reformer stream in one or more reformer stages to form a syngas stream and a flue gas stream, wherein throughout the one or more reforming stages the reformer stream has a combination of temperature and composition that avoids metal dusting and coking conditions;

i) recovering heat from the flue gas stream to provide heat to the pre-reforming stages in step g) and to provide pre-heating to the water stream; and j) recovering heat from the syngas stream to preheat the air stream from step a) and to provide heat to form steam in step e).

In some embodiments, the air stream is preheated by recovering heat from the syngas stream in a heat exchanger. In this way, at least a portion of the heat remaining in the syngas stream may be recovered, thereby improving the efficiency of the process. The air stream may be any suitable air stream, such as a process air stream or a blown air stream and may be conditioned or unconditioned, such as filtered or unfiltered, purified or unpurified or humidified or dehumidified. Preferably the air stream may be a forced air stream provided from a blower or other blown air source. Generally, it is preferred that the air is supplied at a sufficient pressure for the process requirements, while not at an excessive pressure that may cause inefficiency in the process due to increased blower energy requirements. Accordingly, the process and apparatus is desirably configured to minimize the air pressure required in the process, which may be accomplished by avoiding large pressure drops across process components, such as heat exchangers, valves, and pre-reforming and reforming stages.

In some embodiments combining at least one air stream with a portion of at least one fuel stream to form a fuel/air mixture having a temperature below metal dusting conditions includes joining an air stream and a fuel stream. In some embodiments, the at least one air stream is a portion of the air stream discussed above either before or after that air stream is preheated. In some embodiments, the at least one air stream is a portion of the air stream discussed above prior to pre-heating. In this manner, there may be a single air stream provided to the system or process that may be split into two or more air streams prior to or after preheating. One or more of the air streams may be preheated in the same or different heat exchangers by recovering heat from the syngas stream.

In some embodiments, the fuel stream may be preheated by recovering heat from the syngas stream, such as in a heat exchanger. In some embodiments, a portion of the fuel stream that is combined with the at least one air stream is preheated in the same heat exchanger in which one or more of the air streams described above is preheated. The fuel stream may be a portion of any suitable combustion fuel feed stream for steam reforming processes, such as off-gas or tail gas streams from a pressure swing adsorption process (PSA), from a methanol production process or from an ammonia production process, or it may be a mixture of an off-gas or tail gas with a gaseous hydrocarbon stream or streams such as natural gas streams, methane streams, propane streams, mixtures of gaseous hydrocarbons, refinery or other off gases or tail gases and mixtures or combinations thereof. The conditions during preheating are preferably maintained to reduce or avoid metal dusting and coking conditions in the fuel stream and in the heat exchanger.

The at least one air stream and the portion of the fuel stream may be joined in any suitable manner, such as by joining the streams to form a single stream using a "Y" or "T" connector or by adding one stream into the other stream. In some embodiments, the at least one air stream and the portion of the fuel stream may be joined in the heat exchanger by combining the heat exchange streams of the two or by feeding the streams to the same heat exchanger outlet. Preferably, the resulting fuel/air mixture is fuel rich and capable only of incomplete combustion due to the limited amount of air in the stream.

In some embodiments, after the fuel/air mixture has been formed, it may be split into two or more streams using any suitable splitting mechanism, such as a "Y" or "T" connection. At least one portion of the split fuel/air mixture may be partially combusted, such as catalytically combusted, to form a heated fuel stream, which may have a temperature above metal dusting conditions. Preferably, the combustion is partial as a result of the limited air in the mixture. In some embodiments, the heated fuel stream may contain substantially no combustible air and may include fuel and combustion byproducts. In some embodiments, during the combustion of the fuel/air mixture, the stream experiences metal dusting and/or coking conditions. In such cases, the components of the stream associated with the combustion, including the combustion chamber, are preferably constructed from metal dusting resistant materials, such as metal dusting resistant alloys or alloys that have been coated with metal dusting resistant coatings and/or are configured for easy repair and/or removal and replacement. Preferably, the temperature and composition of the heated fuel stream, after the combustion, are appropriate for use in the reformer stages with no further modification and are such that the heated fuel stream will not experience metal dusting or coking conditions within the reformer stages.

A second portion of the fuel/air mixture may be combusted, such as catalytically combusted in the presence of a preheated air stream to form a heated air stream for the reformer stages. In some embodiments, the heated air stream may have a temperature above metal dusting conditions. Preferably, the fuel in the fuel/air mixture is completely or substantially completely combusted to provide additional heat to the preheated air stream.

In some embodiments, heating one or more water streams to form steam includes recovering heat from a flue gas stream and/or a syngas stream. In some embodiments, recovering heat from a syngas stream includes recovering heat from a syngas stream at two different points in the gaseous hydrocarbon-steam reforming process, such as shortly after the syngas stream leaves the reformer stages and just prior to the syngas stream leaving the process.

In some embodiments, the one or more water streams recovers heat from the flue gas stream in a heat exchanger after the flue gas stream has left the reforming and pre-reforming stages, such as just prior to the flue gas stream leaving the reforming process. In some embodiments, the flue gas stream may be combined with a portion of the fuel stream and/or the gaseous hydrocarbon stream and then preheated by combusting, such as catalytically combusting, the portion of the fuel stream and/or the gaseous hydrocarbon stream in the presence of the flue gas stream prior to entering the heat exchanger but after the flue gas stream has left the reforming and pre-reforming stages. In other embodiments, such as embodiments where the reforming is conducted as a high temperature reforming process, this combustion step may not be included or used.

In some embodiments, the water stream recovers heat from a portion of the syngas stream shortly after the syngas stream leaves the reformer stages, the recovery occurring in a quench heat exchanger in which the entering syngas stream raises steam by exchanging heat with a water stream in a heat exchanger that is submerged in the water. In such embodiments, because the heat exchanger is submerged in water, metal dusting conditions are avoided as a result of the relatively constant metal temperature due to boiling of the water, in conjunction with insufficient pressure to raise the boiling point of the water to metal dusting temperatures. Though the heat exchanger does not experience metal dusting conditions, the syngas stream, shortly before entering the quench heat exchanger, may. Accordingly, that portion of the syngas piping within at least five pipe diameters of the entrance to the heat exchanger is preferably constructed from metal dusting resistant materials, such as metal dusting resistant alloys or alloys that have been coated with metal dusting resistant coatings and/or is configured for easy repair and/or removal and replacement. In some embodiments, all or a majority of the steam raised and used in the gaseous hydrocarbon-steam reforming process is raised in the quench heat exchanger. In some embodiments, the syngas stream is split to form a first syngas stream and a second syngas stream and heat is recovered in the quench heat exchanger from one of the first and the second syngas streams.

In some embodiments, the water stream recovers heat from the syngas stream just prior to the syngas stream leaving the gaseous hydrocarbon-steam reforming process. In some embodiments, this heat recovery occurs in the same heat exchanger as the heat recovery for the air and fuel streams as discussed above. In other embodiments, a separate heat exchanger is used for the heat recovery into the water stream from the syngas stream just prior to the syngas stream leaving the gaseous hydrocarbon steam reforming process.

In some embodiments, after the one or more water streams have been heated to produce steam, the steam is mixed with one or more gaseous hydrocarbon streams to form a gaseous hydrocarbon-steam stream. The mixing may be accomplished by joining a steam stream with a gaseous hydrocarbon stream to form a single stream using any suitable means such as using a "Y" or "T" connector or by adding one stream into the other stream. In some embodiments, the gaseous hydrocarbon stream has been preheated, such as preheated by recovering heat from the syngas stream, such as in the same or a different heat exchanger as the heat recovery for the air and fuel streams as discussed above. The gaseous hydrocarbon stream may be any suitable gaseous hydrocarbon stream for steam reforming, such as natural gas, methane, propane, mixtures of gaseous hydrocarbons, refinery or other flue gases and mixtures or combinations thereof. In some embodiments the ratio of steam to gaseous hydrocarbon in the gaseous hydrocarbon-steam stream may be indicated by a ratio of steam to carbon. In some embodiments the ratio of steam to carbon in the reformer stream may be from 1:1 to 12:1, such as from 2:1 to 10:1, from 3:1 to 8:1 or from 4:1 to 6:1.

In some embodiments, the gaseous hydrocarbon-steam stream is pre-reformed in one or more pre-reforming stages. In some embodiments, the one or more pre-reforming stages include heating and partially reforming the gaseous hydrocarbon-steam stream to form a reforming stream. In such embodiments, the partial reforming may comprise one or more stages of heating the gaseous hydrocarbon-steam stream by recovering heat from the flue gas stream followed by partial catalytic reformation of the gaseous hydrocarbon-steam stream. In some embodiments, at least 2 stages of pre-reforming are performed, such as from 2 to 10, from 3 to 10, from 4 to 8 or from 5 to 7 pre-reforming stages such as 2 or more, 3 or more, 4 or more or 5 or more pre-reforming stages. In some embodiments, coking conditions are avoided in the pre-reforming stages by modifying the temperature of the gaseous hydrocarbon-steam stream and/or by modifying the composition of the gaseous hydrocarbon-steam stream by heating and partially reforming it to avoid such conditions. In addition, in some embodiments, the pre-reforming stages provide a reformer stream to the first stage of reforming that avoids metal dusting and coking conditions.

Reforming of the reformer stream in one or more reformer stages to form a syngas stream and a flue gas stream may be accomplished as described elsewhere herein including the control of the heated fuel stream supplied to the individual stages. For example, in some embodiments, the reforming may be accomplished in one or more reformer stages, each stage comprising: i) heating the reformer stream by recovering heat from a heated air stream to form a heated reformer stream and a cooled air stream, ii) reforming at least a portion of the heated reformer stream; and iii) combusting a portion of a heated fuel stream in the presence of the cooled air stream to form the heated air stream for the next stage. Preferably, the reformer stream has a combination of temperature and composition that avoids coking and metal dusting conditions throughout the reformer stages.

In some embodiments, an apparatus for steam reforming of a gaseous hydrocarbon comprises:

a) a fuel pre-heater that partially combusts the fuel in a first fuel/air mixture to form a heated fuel stream, the heated fuel stream being combusted in a reformer module;

b) an air pre-heater that combusts a second fuel/air stream in the presence of an air stream to form a heated air stream, the heated air stream supplying heat to the reformer module; and c) a reformer module for forming a syngas stream from a reformer stream.

The fuel and air pre-heaters may comprise any suitable catalytic combustion chamber and may comprise a separate catalytic reactor or may comprise a modified section of pipe that has been loaded with structured or unstructured catalyst. In general, the catalytic combustion involves catalytic oxidation of combustible components in the relevant stream to produce heat as a result of the highly exothermic oxidation reaction. The combustion reaction may be catalyzed using any suitable catalyst and/or may include or comprise non-catalytic combustion in conjunction with an ignition source or a flame source for start-up.

In some embodiments, the reformer module may comprise one or more, such as 2 or more, 3 or more, 4 or more, 5 or more, 6 or more, 7 or more, 8 or more, 9 or more or 10 or more pre-reformer stages. In some embodiments, the reformer module may comprise from 2 to 10, 3 to 8 or 4 to 7 pre-reformer stages. After the pre-reformer stages, the reformer module may comprise from 1-40 reformer stages, such as from 2 to 35 stages, from 3 to 30 stages, from 5 to 25 stages, from 8 to 20 stages or from 10 to 15 reformer stages. Each pre-reformer stage may comprise at least one heat exchanger and at least one pre-reforming bed. Any suitable heat exchanger and catalytic pre-reforming bed may be used.

In some embodiments, the one or more pre-reformer stages may comprise a PCR. The PCR may be configured similar to a printed circuit heat exchanger ("PCHE") as known in the art, with catalyst chambers or beds intermittently placed within the flow path of the gaseous hydrocarbon-steam stream such that the stream may be alternately heated in a heat exchanger or heat exchange portion and then partially reformed catalytically in a catalyst chamber or bed in a series of pre-reforming stages. In this regard, the PCR may comprises a series of plates having one or multiple channels for flow of the gaseous hydrocarbon-steam stream and the flue gas stream in proximity to each other to exchange heat. The channels for the individual streams may be etched or otherwise formed on separate plates, which may then be stacked and diffusion bonded or otherwise bonded into a heat exchanger configuration such that the channels are brought into close proximity with each other and heat is exchanged through the channel walls. The stacking may include stacking of end plates, bounding plates and specific configurations of gaseous hydrocarbon-steam and flue gas plates according to the desired heat transfer. The channels on each plate may be configured for single or multiple pass heat transfer between the streams, and when formed into a PCR may be configured to operate in co-flow, cross-flow or counter-flow. In some embodiments, the plates for one of the streams may be configured for multiple passes, while the plates for the other stream are configured for single passes.

Each of the gaseous hydrocarbon-steam and flue gas plates may include multiple pre-reforming catalyst chamber or bed penetrations, such that when the plates are stacked and bonded into a heat exchanger configuration, the plates form multiple heat exchange zones, where heat is exchanged from the flue gas channels into the gaseous hydrocarbon-steam stream channels, and multiple reforming zones, where the heated gaseous hydrocarbon-steam stream is partially catalytically reformed. The reforming zones may be formed by aligning the pre-reforming catalyst chamber or bed penetrations when the plates are stacked to form chambers in which catalyst may be placed either, supported or unsupported.

In this regard, in some embodiments the PCR may operate as follows: the gaseous hydrocarbon-steam stream may enter the gaseous hydrocarbon-steam stream plate channels of the PCR, where it may be heated by the hot stream, which may be the flue gas stream from the reformer stages flowing in the channels of the flue gas plate. After heating, the gaseous hydrocarbon-steam stream plate channels may direct the gaseous hydrocarbon-steam stream to a pre-reforming chamber or bed containing catalyst, in which the gaseous hydrocarbon-steam stream may be partially catalytically reformed. After being partially reformed, the gaseous hydrocarbon-steam stream may proceed into plate channels further along the plate, where the stream will be re-heated by flue gas flowing in the flue gas plate channels of the flue gas plate. In this manner, the partial reforming may included multiple iterations of the heating and partial reforming in a single structure comprising end plates, bounding plates one or more flue gas plates and gaseous hydrocarbon-steam plates.

After the pre-reformer stages, the reformer module may comprise from 1-40 reformer stages, such as from 2 to 35 stages, from 3 to 30 stages, from 5 to 25 stages, from 8 to 20 stages or from 10 to 15 stages of catalytic reforming. The reformer module may be configured in any suitable manner for converting the reformer stream leaving the pre-reformer stages into syngas. Such reforming may include one or more heat exchangers that heat the reformer stream by recovering heat from a hot stream, such as a heated air stream. The hot stream may provide sufficient heat to the reformer stream to promote reforming in one or more catalytic reforming beds. The reforming beds may catalytically reform the reformer stream in an endothermic reaction, thereby cooling the reformer stream. The reformer stream may then be re-heated by recovering heat from a hot stream, such as a heated air stream and then may be directed to one or more additional reformer beds. In this manner, the steps may be repeated through the reformer stages.

In some embodiments, the reformer module may comprise multiple stages, where each stage includes i) a heat exchanger that heats the reformer stream by recovering heat from a heated air stream to form a cooled air stream; ii) a reforming bed that reforms the heated reformer stream; and iii) a combustion chamber that combusts a portion of a heated fuel stream to re-heat the cooled air stream.

In some embodiments, the apparatus may include a fuel distribution control network that is configured to passively control the amount of the heated fuel stream that is supplied to each combustion chamber in the reformer stages. This configuration may be obtained by designing the apparatus and the individual heat exchange and reformer components of the apparatus to balance the pressure drops in the air and the fuel streams throughout the apparatus to supply the appropriate amount of air and fuel to each combustion chamber in the reformer stages. In some embodiments, the fuel distribution control network is configured to supply an amount of the heated fuel stream to one or more of the combustion chambers of the second and subsequent reformer stages that is less than the amount of the heated fuel stream supplied to one or more of the preceding stages. In some embodiments, the fuel distribution control network is configured to supply an amount of the heated fuel stream to each of the combustion chambers of the second and subsequent reformer stages that is less than the amount of the heated fuel stream supplied to the preceding stage.

As with the pre-reforming stages, in some embodiments, the reformer stages may comprise a PCR. In some embodiments, the PCR making up the reformer stages may be comprised of end plates, bounding plates, air flow plates, fuel flow plates, and reformer stream plates. Each of the active plates may include flow channels for the relevant feed stream (air, fuel or reformer), multiple catalytic combustion chamber penetrations and multiple catalytic reforming bed penetrations. When combined into a stack and diffusion bonded or bonded otherwise, the multiple catalytic combustion chamber penetrations and multiple catalytic reforming bed penetrations of each plate may be aligned with the corresponding penetrations of the other plates in the stack to form multiple catalytic combustion chambers and multiple catalytic reforming beds.

In some embodiments, such a printed circuit reactor may operate as follows. A heated air stream flows through the flow channels of the air flow plates and exchanges heat with the reformer stream flowing through the flow channels of the reformer plate to heat the reformer stream and cool the air stream. The reformer stream then enters the first catalytic reforming bed, where it is catalytically reformed in an endothermic reaction, cooling the reformer stream and converting a portion of the stream to syngas. The cooled air stream proceeds to the first catalytic combustion chamber where it is joined by a portion of the heated fuel stream, which is catalytically combusted to re-heat the air stream. The re-heated air stream then exchanges heat with the cooled reformer stream and the process may be repeated through multiple stages. In some embodiments, the portion of the heated fuel stream is supplied in parallel to each of the combustion chambers. In some embodiments, each combustion chamber is supplied with the same amount of fuel from the heated fuel stream. Preferably, the amount of the heated fuel stream supplied to each of the combustion chambers after the first combustion chamber is reduced relative to the preceding combustion chamber. Preferably, the supply of the heated fuel stream is passively controlled. Ultimately, the streams leaving the reformer module comprise a syngas stream formed from the reformer stream and a flue gas stream comprising the air stream, any residual fuel components and the fuel combustion components.

In some embodiments, the apparatus for steam reforming of a gaseous hydrocarbon may further include at least one heat exchanger that recovers heat from the syngas stream after it leaves the reformer module. In some embodiments, the apparatus comprises at least two heat exchangers for recovering heat from a portion of the syngas stream. In some embodiments, at least one of the at least one heat exchangers is a quench heat exchanger. The quench heat exchanger may comprise a heat exchanger that is submerged in water. A portion of the hot syngas may enter the quench heat exchanger at a temperature at/or above metal dusting temperatures and may be quenched to a temperature below metal dusting conditions. Because the heat exchanger is submerged in water, the heat exchanger never sees metal dusting conditions because the temperature of the water will remain essentially constant as it boils and as a result of the high heat transfer coefficient of boiling water the metal of the submerged heat exchanger will remain essentially at the boiling temperature of the water. The steam produced by quenching the syngas stream in this manner may be combined with the gaseous hydrocarbon stream prior to entering the reformer module. Though the quench exchanger avoids metal dusting conditions, a portion of the syngas piping adjacent to the entrance to the quench exchanger may experience metal dusting conditions and thus this portion of the apparatus is preferably constructed from metal dusting resistant materials or from material coated with a metal dusting resistant coating and/or is configured for easy repair and/or removal and replacement.

The submerged heat exchanger is preferably a PCHE that relies on a thermosyphon effect to exchange the heat from the syngas stream into the water, circulating water through the exchanger as a result of the density differences between the boiling water and the single phase water. The PCHE may comprise one or more syngas plates and one or more water plates which together may be the "active" plates within the exchanger. The syngas plates may have multiple flow channels etched or otherwise provided thereon through which the syngas flows. The water plates may have multiple flow channels etched or otherwise provided thereon, through which the water/steam flows. The water and syngas plates, along with bounding plates and/or endplates may be stacked into a heat exchanger configuration. In this configuration, the PCHE may comprise a series of stacked and diffusion bonded or other wise bonded plates having multiple channels for flow of the syngas and water streams in proximity to each other to exchange heat from the syngas streams to the water streams. The PCHE may be formed by stacking end plates, bounding plates and specific configurations of syngas and water stream plates according to the desired heat transfer. The channels on each plate may be configured for single or multiple pass heat transfer between the streams, and when formed into a heat exchanger may be configured to operate in co-flow, cross-flow or counter-flow. Preferably, the heat exchanger formed from the plates is configured in co-flow to avoid dryout in the passages on the water side of the exchanger. In some embodiments, the plates for one of the streams may be configured for multiple passes, while the plates for the other are configured for single passes.

The water level in the quench exchanger may be controlled using any suitable method such as known water level control means for controlling boiler water levels. The submerged heat exchanger may be partially or completely submerged, provided that sufficient water is present to ensure that metal dusting conditions are avoided in the heat exchanger. In some embodiments, the quench exchanger raises the bulk of the steam for combination with the gaseous hydrocarbon stream.

In some embodiments, at least one of the heat exchangers that recover heat from the syngas stream comprises a syngas heat recovery heat exchanger. In some embodiments, the syngas heat recovery heat exchanger exchanges heat from the syngas stream into at least one stream selected from: one or more air stream, one or more fuel streams, one or more water streams and one or more gaseous hydrocarbon streams. In some embodiments, the syngas heat recovery heat exchanger comprises a multi-stream heat exchanger. The syngas heat recovery heat exchanger may comprise a multi-stream heat exchanger that is a multi-stream PCHE. The multi-stream PCHE may comprise one or more syngas plates and one or more reactant feed plates, which together may be the active plates within the exchanger. The syngas plates may have multiple flow channels etched or otherwise provided thereon through which the syngas flows. The reactant feed plates may have multiple flow channels etched or otherwise provided thereon, through which the various reactant feeds flow. For example, in some embodiments, the reactant feed plates may have one or more sets of flow channels for one or more air streams, one or more sets of flow channels for one or more fuel streams, one or more sets of flow channels for one or more gaseous hydrocarbon streams and/or one or more sets of flow channels for one or more water streams. The reactant feed and syngas plates, along with bounding plates and/or endplates may be stacked into a heat exchanger configuration. In this configuration, the PCHE may comprise a series of stacked and diffusion bonded or other wise bonded plates having multiple channels for flow of the syngas and reactant feed streams in proximity to each other to exchange heat from the syngas streams to the reactant feed streams. The stacking may include stacking of end plates, bounding plates and specific configurations of syngas and reactant feed stream plates according to the desired heat transfer. The channels on each plate may be configured for single or multiple pass heat transfer between the streams, and when formed into a heat exchanger may be configured to operate in co-flow, cross-flow or counter-flow. Preferably, the syngas heat recovery heat exchanger operates in counter-flow or in a multi-pass cross-flow approximation of counter-flow to maximize heat recovery from the syngas stream. In some embodiments, the plates for one or some of the streams may be configured for multiple passes, while the plates for the one or some of the other streams are configured for single passes.

In some embodiments, the at least one heat exchangers that recovers heat from the syngas stream comprises a quench heat exchanger and a syngas heat recovery heat exchanger.

In some embodiments, the apparatus comprises at least one heat exchanger that recovers heat into a water stream from a flue gas stream after the flue gas stream leaves the reformer module. In some embodiments, such a heat exchanger comprises a PCHE as described elsewhere herein, where the active plates of the PCHE are one or more flue gas plates and one or more water plates. In some embodiments, such as in embodiments where the reformer module is run in a reduced reforming temperature mode or in a higher pressure reforming mode, the flue gas stream may be pre-heated prior to entering the PCHE for exchange of heat with the water stream. Such pre-heating may include catalytic combustion of a portion of at least one fuel stream or a portion of at least one gaseous hydrocarbon stream in the presence of the flue gas stream. The catalytic combustion may be conducted in a flue gas pre-heater which may be configured substantially the same as the air pre-heater discussed previously. The flue gas pre-heater may be used to heat the flue gas to provide increased heat to the water stream, thereby increasing the ratio of steam to carbon that is ultimately fed to the reformer module and promoting a more favorable equilibrium for the reforming reaction for a given pressure and temperature, making the flue gas pre-heater an attractive option for lower temperature or higher pressure reformer modules.

In some embodiments, especially embodiments where a high hydrogen concentration is desired in the syngas stream, the apparatus may include a water-gas shift reactor. The water gas shift reactor may promote catalytic production of hydrogen according to Equation (6).

The water-gas shift reactor preferably receives the syngas stream at a temperature sufficiently below metal dusting temperatures that the exit equilibrium temperature from the reactor is also below metal dusting temperatures. In some embodiments, multiple water-gas shift reactors may be used in series to further increase the hydrogen content of the syngas stream. The water-gas shift reactor may be similar to a catalytic combustion chamber and may comprise a separate catalytic reactor or may comprise a modified section of pipe that has been loaded with structured or unstructured catalyst, and which preferably may include a suitable precious metal catalyst.

In some embodiments, the apparatus is configured to avoid or reduce metal dusting conditions and coking conditions in all heat exchangers, pre-reforming stages, reforming stages and water-gas shift reactors within the apparatus.

In some embodiments, the apparatus for steam reforming of a gaseous hydrocarbon comprises:

a) a syngas heat recovery heat exchanger that recovers heat from a syngas stream to heat at least one air stream;

b) an air flow splitter that splits the air stream into a first air stream and a second air stream, the first air stream connecting to a fuel stream to form a fuel/air mixture;

c) a fuel flow splitter that splits the fuel/air mixture into a first fuel/air stream and a second fuel/air stream, the first fuel/air stream connecting to a fuel pre-heater and the second fuel/air stream connecting to an air pre-heater;

d) a fuel pre-heater that partially combusts the fuel in the first fuel/air stream to form a heated fuel stream;

e) an air pre-heater that combusts the second fuel/air stream in the presence of the second air stream to form a heated air stream;

f) a pre-reformer that partially reforms a heated gaseous hydrocarbon stream in the presence of steam to form a reformer stream;

g) a reformer that reforms the reformer stream to form a syngas stream;

h) a quench exchanger that recovers heat from the syngas stream to form or assist in forming steam from a water stream for the pre-reformer.

Some embodiments of the apparatus will now be detailed with reference to the Figures. It should be understood that the apparatuses detailed are only by way of example and that various modifications and changes to the apparatuses may be made without departing from the scope of the processes and apparatuses defined herein as understood by those of skill in the art. Examples of such changes may include, but are not limited to, the type and number of reactant streams, they type and number of each of the heat exchangers and combustion chambers/pre-heaters, the type, number and configurations of the pre-reforming and reforming stages, the materials of construction, the heat exchanger and piping configurations and sizes, the placement and type of valves, the temperatures and pressures in the streams, the flow-rates and compositions of the various streams, the type and number of water-gas shift reactors if any and the catalyst types and compositions.

Referring to FIG. 1A, in some embodiments, a gaseous hydrocarbon-steam reforming system or apparatus 100 may include at least four reactant feed streams: a gaseous hydrocarbon feed stream 102, a fuel feed stream 104, an air feed stream 106 and a water feed stream 108. Gaseous hydrocarbon feed stream 102 may feed any suitable gaseous hydrocarbon stream for steam reforming, including natural gas, methane, propane, other gaseous hydrocarbons, mixtures of gaseous hydrocarbons, refinery or other flue gases and mixtures or combinations thereof into system 100. Preferably, gaseous hydrocarbon feed stream 102 is sufficiently low in impurities (such as sulfur) to provide acceptable reforming and/or water-gas shift catalyst life. In some embodiments, gaseous hydrocarbon feed stream 102 is natural gas or methane. Gaseous hydrocarbon feed stream 102 may enter reforming system 100 at any temperature and pressure suitable for the system. Preferably, the pressure is equal to or above the pressure of syngas stream 180 leaving the reformer module 150. In some embodiments, the gaseous hydrocarbon feed stream 102 enters system 100 at a pressure between 10 bara and 100 bara, such as between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara. In some embodiments, gaseous hydrocarbon feed stream 102 enters system 100 at any suitable temperature, such as the supply temperature or at room temperature, but preferably above the dew point temperature for the stream. In some embodiments, gaseous hydrocarbon feed stream 102 enters system 100 at a temperature between about −40° C. and 250° C., such as between −25 and 200° C., between −10 and 150° C., between −10° C. and 100° C., between 0 and 90° C., between 0° C. and 75° C., between 5° C. and 65° C., between 10° C. and 50° C., between 15° C. and 40° C., between 15° C. and 35° C., between 20° C. and 30° C. or between 20° C. and 25° C.

Fuel feed stream 104 may be any suitable combustion fuel feed stream for steam reforming processes, such as off-gas or tail streams from a pressure swing adsorption process (PSA), from a methanol production process or from an ammonia production process and may include or be enriched with other fuel components such as a gaseous hydrocarbon stream, or streams such as natural gas streams, methane streams, propane streams, mixtures of gaseous hydrocarbons, refinery or other flue gases and mixtures or combinations thereof. In some embodiments, a portion of gaseous hydrocarbon feed stream 102 or another gaseous hydrocarbon stream may be provided as at least a portion of fuel feed stream 104. In some embodiments, fuel feed stream 104 may include residual gaseous hydrocarbons and/or hydrogen from syngas stream 192 after downstream processing. Fuel feed stream 104 may enter reforming system 100 at any temperature and pressure suitable for the system. In some embodiments, such as embodiments when fuel feed stream 104 comprises a PSA off-gas or tail stream, fuel feed stream 104 enters system 100 at a pressure less than 10 barg, such as less than 8 barg, less than 5 barg, less than 2.5 barg, less than 1 barg, less than 0.75 barg, less than 0.5 barg, less than 0.4 barg, less than 0.3 barg, less than 0.2 barg, less than 0.15 barg, less than 0.10 barg or less than 0.075 barg. In some embodiments, such as when fuel feed stream 104 comprises a methanol synthesis purge, fuel feed stream 104 may enter the system at a pressure that is substantially higher, in which case, the pressure may be stepped down using any suitable means for stepping down pressures of gaseous streams. In some embodiments, fuel feed stream 104 enters system 100 at any suitable temperature, such as the supply temperature or at room temperature, but preferably above the dew point of the stream. In some embodiments, fuel feed stream 104 enters system 100 at a temperature between −40° C. and 350° C., such as between −30° C. and 300° C., between −20° C. and 250° C., between −10° C. and 200° C., between −5° C. and 150° C., between 0° C. and 100° C., between 0° C. and 50° C., between 5° C. and 40° C., between 10° C. and 35° C., between 15° C. and 30° C. or between 20° C. and 25° C.

Air feed stream 106 may be any suitable air feed stream, such as a forced air feed stream or a compressed air feed stream, that provides sufficient oxygen for combustion processes within the reforming system 100. In some embodiments, the air feed stream may be enriched with additional oxygen or may be purified to remove or limit the presence of one or more particulate or gaseous components or contaminants. In some embodiments, air feed stream 106 enters system 100 at a pressure less than 1 barg, such as less than 0.75 barg, less than 0.50 barg, less than 0.40 barg, less than 0.30 barg, less than 0.20 barg, less than 0.15 barg, less than 0.10 barg or less than 0.075 barg. In some embodiments, air feed stream 106 enters system 100 at any suitable temperature, such as the supply temperature or at room temperature, but preferably above the stream's dew point temperature. In some embodiments, air feed stream 106 enters system 100 at a temperature between −40° C. and 350° C., such as between −30° C. and 300° C., between −20° C. and 250° C., between −10° C. and 200° C., between −5° C. and 150° C., between 0° C. and 100° C., between 0° C. and 50° C., between 5° C. and 40° C., between 10° C. and 35° C., between 15° C. and 30° C. or between 20° C. and 25° C.

Water feed stream 108 may be any suitable water feed stream and may be an untreated, a treated, a purified or a conditioned water stream. Preferably, the water has been treated to meet at least boiler feedwater standards appropriate for the operating temperatures and pressures to avoid scale formation within the heat exchangers and/or excessive blowdown requirements. In some embodiments, water feed stream 108, may have been heated above ambient temperature in a water heater or boiler prior to entering the process. In some embodiments, water feed stream 108 may comprise steam produced outside of the process, in which case it may be directly mixed with gaseous hydrocarbon stream 102 just prior to entering the reformer module 150, in which case the heat exchange configuration for FIG. 1A may be changed. Preferably, all of the necessary steam is generated within the process from water stream 108 with no steam export from the process or import into the process. In some embodiments, water feed stream 108 enters system 100 at any suitable pressure above the pressure of syngas stream 180 leaving the reformer module, such as between 10 bara and 100 bara, such as between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara. In some embodiments, water feed stream 108 enters system 100 at any suitable temperature, such as the supply temperature or at room temperature. In some embodiments, water feed stream 108 enters system 100 at a temperature just above freezing and below boiling, such as between 0.1° C. and 350° C., between 2.5° C. and 250° C., between 5° C. and 150° C., between 10° C. and 125° C., between 15° C. and 100° C., between 15° C. and 75° C., between 15° C. and 50° C., between 15° C. and 40° C., between 15° C. and 35° C., between 20° C. and 30° C. or between 20° C. and 25° C. Water feed stream 108 may be pre-heated in heat exchanger 109 which may be separate from or may be part of syngas heat recovery heat exchanger 110. In some embodiments, heat exchanger 109 is combined with syngas heat recovery heat exchanger 110 in a single PCHE.

One or more of the reactant feed streams, such as from 2 to 10, 3 to 9 or 4 to 6 reactant feed streams or 2, 3, 4, 5, 6, 7, 8, 9 or 10 reactant feed streams, may be pre-heated in one or more syngas heat recovery heat exchangers 110. In some embodiments, at least one air feed stream, such as air feed stream 106 or air feed stream 107 is pre-heated in exchanger 110. In other embodiments and as shown, exchanger 110 may be a multi-stream heat exchanger where more than one reactant feed stream is pre-heated.

In some embodiments, including the embodiment as shown in FIG. 1A, fuel feed stream 104 optionally may be split via fuel stream splitter 113 into fuel feed stream 105 and flue gas fuel stream 112 prior to entering syngas heat recovery heat exchanger 110. Both streams 105 and 112 may then be heated in syngas heat recovery heat exchanger 110. Alternatively, fuel feed stream 104 may be split after leaving exchanger 110, but preferably prior to combining with combustion air stream 114. Fuel feed stream 104 may be split using any suitable means of splitting the flow, either before or after the syngas heat recovery heat exchanger 110, such as a "T" or "Y" piping connection, and may be split to divert sufficient fuel from fuel feed stream 104 via flue gas fuel stream 112 for combustion in the presence of flue gas stream 160 to provide additional heat to water feed stream 108. Fuel stream splitter 113 may be a piping junction or any other suitable flow splitting mechanism, may include a valve 113a as shown, or other suitable splitting device for controlling flow of the fuel, may be split and the flow controlled using passive means which maintain the desired downstream fuel/air ratio for feed to fuel pre-heater 120, air pre-heater 122, and flue gas pre-heater 175 throughout a broad range of flow magnitudes. Such passive means may include control of the flow path geometry based on pressure drops and a desired Reynolds number range within the relevant flow paths.

Similarly, in some embodiments, including the embodiment as shown in FIG. 1A, air feed stream 106 may be split into air feed stream 107 and combustion air stream 114 prior to entering syngas heat recovery heat exchanger 110 via air flow splitter 115. Both streams 107 and 114 may then be heated in syngas heat recovery heat exchanger 110. In some embodiments, exchanger 110 is configured such that combustion air stream 114 combines with fuel feed stream 105 in exchanger 110 to form fuel/air mixture stream 118 prior to exiting the exchanger. Alternatively, air feed stream 106 may be split after leaving exchanger 110. Air flow splitter 115 may be any suitable means of splitting the flow of air feed stream 106 either before or after the syngas heat recovery heat exchanger 110, such as a "T" or "Y" piping connection, as long as combustion air stream 114 connects with the fuel feed stream 105 prior to the fuel/air flow splitter 116. The air flow splitter 115 diverts sufficient air from air feed stream 106 via combustion air stream 114 into fuel feed stream 105, preferably prior to the fuel/air flow splitter 116 to form a fuel/air mixture stream 118 with sufficient air for partial combustion of fuel from fuel feed stream 105 in the fuel pre-heater 120. Air flow splitter 115 may be a piping junction or any other suitable flow splitting mechanism, may include a valve 115a as shown, or other suitable splitting and control device, or the air flow may be split and the flow controlled using passive means which maintain the desired downstream fuel/air ratio for feed to fuel pre-heater 120 and air pre-heater 122 throughout a broad range of flow magnitudes. Such passive means may include control of the flow path geometry based on pressure drops and a desired Reynolds number range within the relevant flow paths.

The syngas heat recovery heat exchanger 110 may be any suitable heat exchanger and may exchange heat between the entering hot and cold streams using co-flow, counter-flow or cross-flow heat exchange. Preferably, the syngas heat recovery heat exchanger is a PCHE and exchanges heat using counter-flow heat exchange or an approximation to counter-flow heat exchange using multi-pass cross flow exchange in an overall counter-flow direction. In some embodiments, the syngas heat recovery heat exchanger recovers heat from the syngas stream before it exits the reformer system 100 for further processing, such as, for example, in a pressure swing adsorption system, a membrane separation system, a methanol production system or in an ammonia production system. The syngas heat recovery heat exchanger 110 may recover heat from the syngas stream 190 to preheat one or more reactant feed streams, including one or more gaseous hydrocarbon streams, one or more fuel streams, one or more air streams, and/or one or more water streams. In order to avoid or reduce metal dusting, the syngas stream 190 preferably enters the heat exchanger 110 at a temperature that is below the metal dusting temperature. Preferably the syngas stream 190 leaves the heat exchanger 110 at a temperature and pressure suitable for any further downstream processing.

Figure 2A:
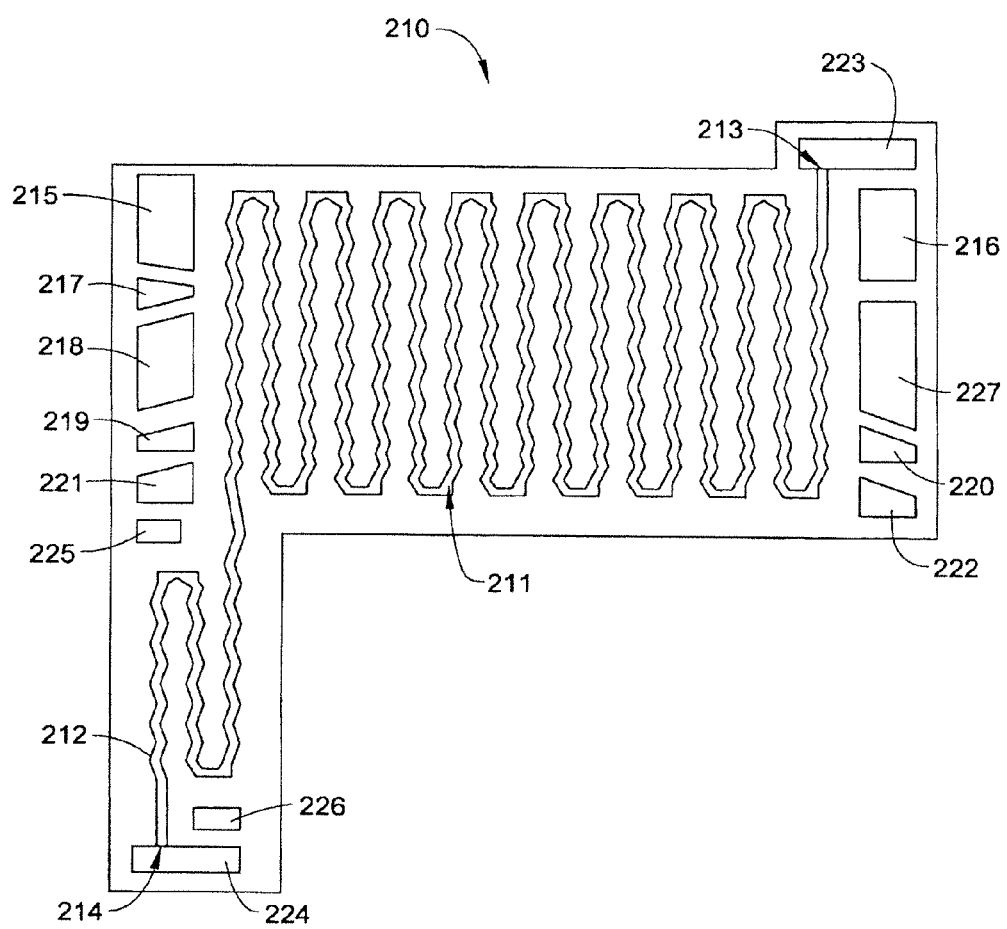
FIG. 2A-C show schematics of plates that may be used to form an embodiment of syngas heat recovery heat exchanger 110 as identified in FIG. 1A.
Figure 2B:
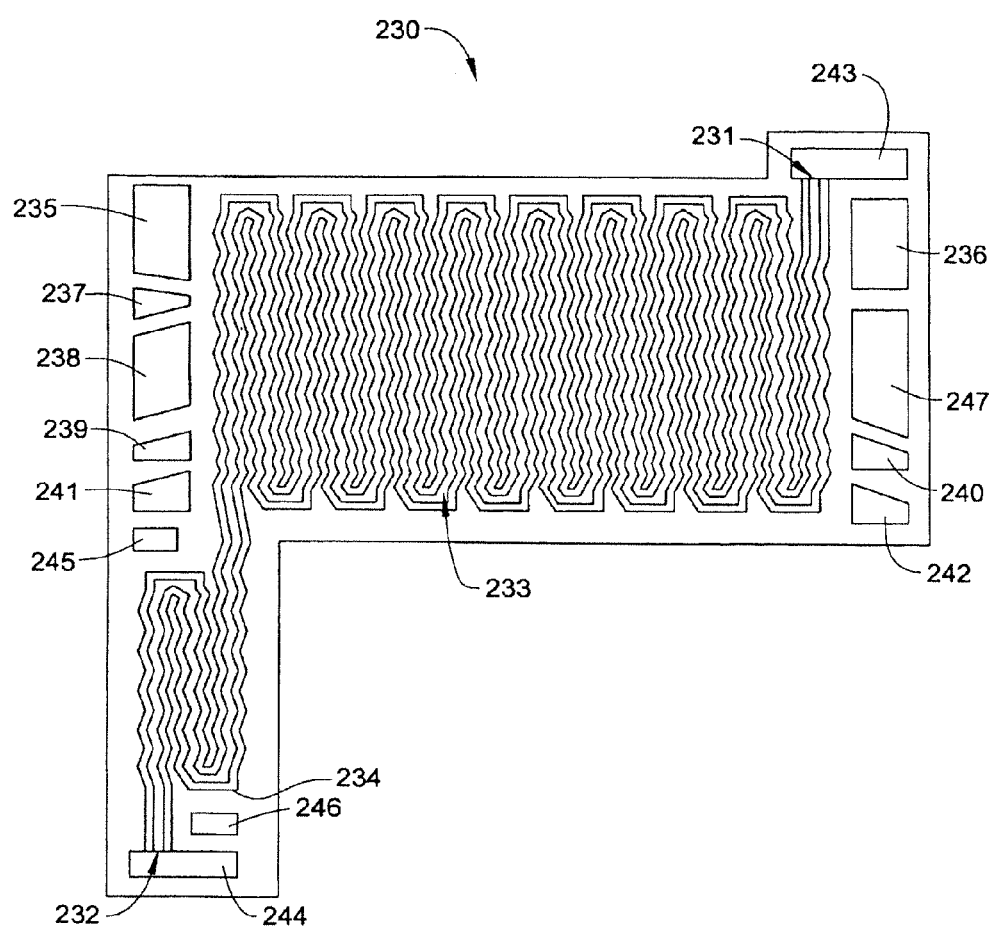
Figure 2C:
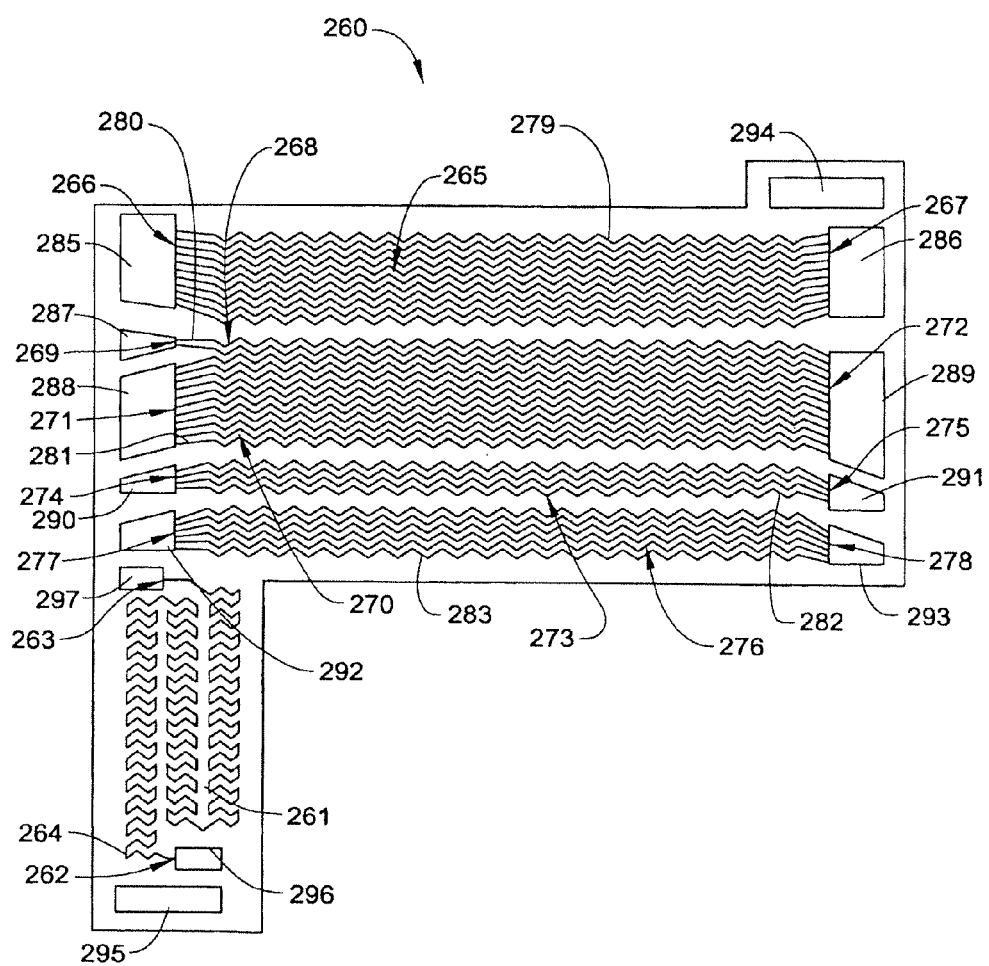

In some embodiments, the syngas heat recovery heat exchanger 110 may comprise a PCHE that is constructed from a series of plates as shown in FIG. 2A-C. The plates may be combined into a stack and diffusion bonded or otherwise bonded to one another to provide heat exchange between the entering hot and cold streams. In general the flow paths for each of the streams may be formed in the plates by etching, milling or other suitable process and may be configured to provide for the desired heat exchange, while limiting pressure drop for one or more streams across the heat exchanger. Preferably, the entering syngas stream 190 is below metal dusting temperatures thereby ensuring that metal dusting conditions are avoided within syngas heat recovery heat exchanger 110.

Referring to FIG. 2A-C, in some embodiments, syngas heat recovery heat exchanger 110 may comprise one or more bounding plates 210, one or more syngas plates 230 and one or more reactant feed plates 260. In the embodiment shown in FIG. 2A-C, the plates in conjunction with suitable end-plates (not shown), when appropriately stacked and formed into a heat exchanger, will form a syngas heat recovery heat exchanger 110 that includes heat exchanger 109. Each of the plates may be constructed from materials suitable for the purpose and the conditions present in exchanger 110. Examples of suitable materials for constructing plates 210, 230 and 260 include 316 stainless steel and 304 stainless steel and the plates may independently have the thicknesses described in Table 1. In some embodiments, the plates may each be 1.6 mm thick.

FIG. 2A shows a bounding plate 210 having a syngas flow path 211 comprising at least one flow channel 212 connecting syngas inlets 213 with syngas outlets 214. Bounding plates 210 ensures that all of the reactant feed plates 260 have hot stream plates on both sides, either a bounding plate 210 or a syngas plate 230 and help to balance the heat load and heat flux throughout the height of the stack. Bounding plate 210 may have one or more independent flow channels 212, which with adjacent ridges may be sized to provide for safe pressure containment and a cost effective combination of heat transfer capacity and pressure drop. In some embodiments, independent flow channels 212 may each comprise a generally semicircular cross-section and may have the dimensions described in Table 1. In some embodiments, independent flow channels 212 may each have a semicircular cross-section with a width of about 1.95 mm, a depth of about 1.10 mm and about 0.4 mm ridges. Though a specific number of independent flow channels 212 are shown, it should be understood that syngas flow path 211 may comprise any suitable number of independent flow channels configured appropriately according to the individual needs of the system.

Though FIG. 2A shows syngas flow path 211 as a multi-pass flow path, flow path 211 may also comprise a direct counter flow, co-flow, cross flow or single pass flow path comprising multiple independent channels. In some embodiments syngas flow path 211 may comprise more than one pass, each pass comprising a single reversal in flow direction, such as from 2 to 100 passes, 5 to 75 passes, 10 to 60 passes, 15 to 50 passes or 20 to 40 passes. Preferably, syngas flow path 211 comprises a multi-loop flow path having 5 passes or greater, 10 passes or greater, 15 passes or greater, 20 passes or greater, 25 passes or greater or 30 passes or greater where the passes are in cross flow during heat exchange and where the syngas flows in a generally counter-flow direction relative to the flows on the reactant feed plate 260.

Bounding plate 210 also includes air feed stream penetrations 215 and 216, combustion air stream penetration 217, fuel feed stream penetration 218, fuel/air mixture stream penetration 227, flue gas fuel stream penetrations 219 and 220, gaseous hydrocarbon feed stream penetrations 221 and 222, syngas stream penetrations 223 and 224 and water stream penetrations 225 and 226.

Referring to FIG. 2B, syngas plate 230 includes syngas inlets 231, syngas outlets 232 and syngas flow path 233. Syngas flow path 233 may comprise one or multiple syngas independent flow channels 234. The channels 234 and adjacent ridges may be sized to provide for safe pressure containment and a cost effective combination of heat transfer capacity and pressure drop. In some embodiments, syngas independent flow channels 234 may each comprise a generally semicircular cross-section and may have the dimensions described in Table 1. In some embodiments, independent flow channels 234 may each have a semicircular cross-section with a width of about 1.95 mm, a depth of about 1.10 mm and 0.4 mm ridges. Though a specific number of independent flow channels 234 are shown, it should be understood that syngas flow path 233 may comprise any suitable number of independent flow channels configured appropriately according to the individual needs of the system.

Though FIG. 2B shows syngas flow path 233 as a multi-pass flow path, flow path 233 may also comprise a direct counter flow, co-flow, cross flow or single pass flow path comprising multiple independent channels. In some embodiments syngas flow path 233 may comprise more than one pass, each pass comprising a single reversal in flow direction, such as from 2 to 100 passes, 5 to 75 passes, 10 to 60 passes, 15 to 50 passes or 20 to 40 passes. Preferably, syngas flow path 233 comprises a counter-flow flow path which may be approximated by a multi-pass flow path having 5 passes or greater, 10 passes or greater, 15 passes or greater, 20 passes or greater, 25 passes or greater or 30 passes or greater where the passes are in cross flow during heat exchange, but the syngas flows in a generally cross flow or counter-flow direction relative to the air, fuel and gaseous hydrocarbon flows on the reactant feed plate 260.

Syngas plate 230 also includes air feed stream penetrations 235 and 236, combustion air stream penetration 237, fuel feed stream penetration 238, fuel/air mixture stream penetration 247, flue gas fuel stream penetrations 239 and 240, gaseous hydrocarbon feed stream penetrations 241 and 242, syngas stream penetrations 243 and 244 and water stream penetrations 245 and 246.

Referring to FIG. 2C, reactant feed plate 260 has a water stream flow path 261 which connects water stream inlets 262 and water stream outlets 263 as shown in the lower left portion of the reactant feed plate 260. Water stream flow path 261 may comprise one or multiple independent flow channels 264. This portion of reactant feed plate 260, when formed into a heat exchanger corresponds to the water flow streams for heat exchanger 109 as indicated in FIG. 1A. Flow channels 264 and adjacent ridges may be sized to provide for safe pressure containment and a cost effective combination of heat transfer capacity and pressure drop. In some embodiments, independent flow channels 264 may each comprise a generally semicircular cross-section and may have the dimensions described in Table 1. In some embodiments, independent flow channels 264 may each have a semicircular cross-section with a width of about 1.90 mm, a depth of about 1.10 mm and about 0.4 mm ridges. Though a specific number of independent flow channels 264 are shown, it should be understood that water stream flow path 261 may comprise any suitable number of independent flow channels configured appropriately according to the individual needs of the system.

Though FIG. 2C shows water stream flow path 261 as a multi-pass flow path, flow path 261 may also comprise a direct counter flow, co-flow, cross flow or single pass flow path comprising multiple independent channels. In some embodiments water stream flow path 261 may comprise more than one pass, each pass comprising a single reversal in flow direction, such as from 2 to 100 passes, 5 to 75 passes, 10 to 60 passes, 15 to 50 passes or 20 to 40 passes. Preferably, water stream flow path 261 comprises a multi-pass flow path having 5 passes or greater, 10 passes or greater, 15 passes or greater, 20 passes or greater, 25 passes or greater or 30 passes or greater where the passes are in cross flow during heat exchange, but flow in a generally counter-flow direction relative to the flow of the syngas stream.

Reactant feed plate 260 also includes air feed flow path 265 with air feed inlet 266 and air feed outlet 267, combustion air feed flow path 268, with combustion air feed inlet 269, fuel feed flow path 270 with fuel feed inlet 271 and fuel/air mixture outlet 272, flue gas fuel flow path 273 with flue gas fuel inlet 274 and flue gas fuel outlet 275 and gaseous hydrocarbon flow path 276 with gaseous hydrocarbon inlet 277 and gaseous hydrocarbon outlet 278. Each of flow paths 265, 268, 270, 273 and 276 may comprise one or multiple independent flow channels 279, 280, 281, 282 and 283 respectively. In general, each of independent flow channels 279, 280, 281, 282 and 283 and adjacent ridges may be sized to provide for safe pressure containment and a cost effective combination of heat transfer capacity and pressure drop. In some embodiments, independent flow channels 279, 280, 281, 282 and 283 may each independently comprise a generally semicircular cross-section and may each independently have the dimensions described in Table 1. In some embodiments, independent flow channels 279, 280, 281, 282 and 283 may each have a semicircular cross-section with a width of about 1.90 mm, a depth of about 1.10 mm and about 0.4 mm ridges. In some embodiments the inlet and outlet portions of independent flow channels 283 may each have a semicircular cross-section with a width of about 1.75 mm, a depth of about 1.00 mm and 0.5 mm ridges. Though a specific number of independent flow channels 279, 280, 281, 282 and 283 are shown, it should be understood that flow paths 265, 268, 270, 273 and 276 may independently comprise any suitable number of independent flow channels configured appropriately according to the individual needs of the system.

Though FIG. 2C shows flow paths 265, 268, 270, 273 and 276 as direct cross flow or single pass flow paths, in some embodiments flow paths 265, 268, 270, 273 and 276 may independently comprise more than one pass, each pass comprising a single reversal in flow direction, such as from 2 to 20 passes, 2 to 10 passes or 2 to 5 passes. Preferably, flow paths 265, 268, 270, 273 and 276 each comprise a direct or single pass cross flow flow path. In FIG. 2C, combustion air flow path 268 is configured to provide for mixing the combustion air stream 114 of FIG. 1A, with fuel feed stream 105 inside exchanger 110 by directing air flowing through flow path 268 and fuel flowing in flow path 270 to the same outlet, fuel/air mixture outlet 272. When configured in this manner, there is no separate joining of these streams downstream of syngas heat recovery heat exchanger 110 as is depicted in FIG. 1A.

Reactant feed plate 260 also includes air feed stream penetrations 285 and 286, combustion air stream penetration 287, fuel feed stream penetration 288, fuel/air mixture stream penetration 289, flue gas fuel stream penetrations 290 and 291, gaseous hydrocarbon feed stream penetrations 292 and 293, syngas stream penetrations 294 and 295 and water stream penetrations 296 and 297.

In some embodiments, the plates used to form embodiments of syngas heat recovery heat exchanger 110 may be stacked and diffusion bonded or otherwise bonded in any suitable order to form a heat exchanger. In some embodiments, the plates may be stacked and diffusion bonded or otherwise bonded in order as follows: at least one 1 end plate (not shown), 1 bounding plate 210, multiple heat exchange cells, each heat exchange cell comprising a reactant feed plate 260 followed by a syngas plate 230, 1 additional reactant feed plate 260, 1 bounding plate 210, and at least 1 end plate (not shown). Accordingly, in some embodiments the order of printed circuit heat exchange plates in a given stack may have the following pattern (Endplate="E", bounding plate 210="B", reactant feed plate 260="R", syngas feed plate 230="S"): E B R S R S R S . . . R S R B E. The end plates may be blank plates with no flow path circuitry and may be insulated to enhance heat transfer and limit heat loss. The end plates may serve as lids to the chambers and flow access paths formed by alignment of the penetrations and support connection of the relevant streams to heat exchanger 110, such as via ports or headers in fluid connection with the chambers and flow paths. Accordingly, the endplates should be thick enough to accommodate the pressures in each of the penetrations and to support the ports or headers. In some embodiments, a single endplate is used for each end of the exchanger 164, where the endplate is thicker than the other plates. In other embodiments, multiple endplates may be used at each end to provide sufficient thickness to support or provide for the headers or ports.

In some embodiments, syngas heat recovery heat exchanger 110 comprises from 5 to 30 heat exchange cells, such as from 7-25, from 8-20, from 9 to 17 or from 10 to 15 heat exchange cells, each heat exchange cell comprising a reactant feed plate 260 and a syngas plate 230. In preferred embodiments for reforming 2 SCMH of natural gas using PSA off-gas as fuel, syngas heat recovery heat exchanger 110 comprises at least 14 heat exchange cells. In one preferred embodiment, syngas heat recovery heat exchanger 110 comprises 2 bounding plates 210, 14 heat exchange cells, an additional reactant feed plate 260 and 5 endplates and comprises plates that are each 1.65 mm thick giving a stack that is 57.75 mm tall. The number of plates and heat exchange cells may be modified according to production needs, heat exchange efficiency, number of feed streams and other parameters.

When the various plates are stacked and diffusion bonded or otherwise bonded to form a heat exchanger, preferably the various corresponding penetrations on each of the plates are aligned to form flow access paths or chambers for the various reactant feeds. In some embodiments, air feed stream penetrations 215, 235 and 285 and 216, 236 and 286 are aligned to form access flow paths or chambers through which air feed stream 107 may be supplied to and may exit, respectively, from the reactant feed plates 260 of the heat exchanger. In some embodiments, combustion air stream penetrations 217, 237 and 287 are aligned to form access flow paths or chambers through which combustion air stream 114 may be supplied to the reactant feed plates 260 of the heat exchanger. In some embodiments, fuel feed stream penetrations 218, 238 and 288 are aligned to form access flow paths or chambers through which fuel feed stream 105 may be supplied to the reactant feed plates 260 of the heat exchanger. In some embodiments, fuel/air mixture stream penetrations 227, 247 and 289 are aligned to form access flow paths or chambers through which fuel feed stream 107 in combination with combustion air stream 114 may exit the reactant feed plates 260 of the heat exchanger. In some embodiments, flue gas feed stream penetrations 219, 239 and 290 and 220, 240 and 291 are aligned to form access flow paths or chambers through which flue gas fuel stream 112 may be supplied to and may exit, respectively, the reactant feed plates 260 of the heat exchanger. In some embodiments, gaseous hydrocarbon feed stream penetrations 221, 241 and 292 and 222, 242 and 293 are aligned to form access flow paths or chambers through which gaseous hydrocarbon feed stream 102 may be supplied to and may exit, respectively, the reactant feed plates 260 of the heat exchanger. In some embodiments syngas gas stream penetrations 213, 231 and 294 and 224, 244 and 295 are aligned to form access flow paths or chambers through which syngas stream 190 may be supplied to and may exit, respectively, the syngas plates 230 and bounding plates 210 of the heat exchanger. In some embodiments, water feed stream penetrations 225, 245 and 277 and 226, 246 and 296 are aligned to form access flow paths or chambers through which water feed stream 108 may be supplied to and may exit, respectively, the reactant feed plates 260 of the heat exchanger.

In addition to aligning the various penetrations, the stacking of the plates preferably places the independent channels making up flow paths 265, 268, 270, 273 and 276 in close proximity to the independent channels making up flow paths 211 and/or 233 to facilitate heat transfer between the relevant streams through the walls of the respective independent channels.

In operation, gaseous hydrocarbon stream 102 may enter syngas heat recovery heat exchanger 110 at essentially the pressure and temperature it enters the reformer system 100 and may leave exchanger 110 at a pressure between 10 bara and 100 bara, such as between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara and at a temperature between 200° C. and 375° C., such as between 225° C. and 375° C., between 250° C. and 370° C., between 275 and 365° C., between 300 and 360° C. or between 325° C. and 355° C. Preferably, the temperature of stream 102 leaving syngas heat recovery heat exchanger 110 is within 100° C. of the temperature of syngas stream 190, such as within 90° C., 80° C., 70° C., 60° C. 50° C., 40° C. 30° C. or within 20° C. of the temperature of syngas steam 190. Preferably the pressure drop for gaseous hydrocarbon stream 102 across exchanger 110 is less than 0.50 bara, such as for example, less than 0.40 bara, less than 0.30 bara, less than 0.20 bara or less than 0.10 bara.

In some embodiments, fuel feed stream 105 may enter syngas heat recovery heat exchanger 110 at a pressure less than 10 barg, such as less than 8 barg, less than 5 barg, less than 2.5 barg, less than 1 barg, less than 0.75 barg, less than 0.5 barg, less than 0.4 barg, less than 0.3 barg, less than 0.2 barg, less than 0.15 barg, less than 0.10 barg or less than 0.075 barg. In some embodiments, fuel feed stream 105 enters syngas heat recovery heat exchanger 110 at any suitable temperature, such as the supply temperature or at room temperature. In some embodiments, fuel feed stream 105 enters syngas heat recovery heat exchanger 110 at a temperature between −40° C. and 350° C., such as between −30° C. and 300° C., between −20° C. and 250° C., between −10° C. and 200° C., between −5° C. and 150° C., between 0° C. and 100° C., between 0° C. and 50° C., between 5° C. and 40° C., between 10° C. and 35° C., between 15° C. and 30° C. or between 20° C. and 25° C. In some embodiments, fuel feed stream 105 may leave exchanger 110 at a pressure less than 10 barg, such as less than 8 barg, less than 5 barg, less than 2.5 barg, less than 1 barg, less than 0.75 barg, less than 0.5 barg, less than 0.4 barg, less than 0.3 barg, less than 0.2 barg, less than 0.15 barg, less than 0.10 barg or less than 0.075 barg and at a temperature between 200° C. and 375° C., such as between 225° C. and 375° C., between 250° C. and 370° C., between 275 and 365° C., between 300 and 360° C. or between 325° C. and 355° C. Preferably, the temperature of stream 105 leaving syngas heat recovery heat exchanger 110 is within 100° C. of the temperature of syngas stream 190, such as within 90° C., 80° C., 70° C., 60° C. 50° C., 40° C. 30° C. or within 20° C. of the temperature of syngas steam 190. Preferably the pressure drop for fuel feed stream 105 across exchanger 110 is less than 0.10 bar, such as less than 0.09 bar, less than 0.07 bar, less than 0.06 bar or less than 0.05 bar.

Flue gas fuel stream 112 may enter syngas heat recovery heat exchanger 110 at a pressure less than 10 barg, such as less than 8 barg, less than 5 barg, less than 2.5 barg, less than 1 barg, less than 0.75 barg, less than 0.5 barg, less than 0.4 barg, less than 0.3 barg, less than 0.2 barg, less than 0.15 barg, less than 0.10 barg or less than 0.075 barg and at any suitable temperature, such as at the supply temperature or at room temperature, or such as at a temperature between −40° C. and 350° C., such as between −30° C. and 300° C., between −20° C. and 250° C., between −10° C. and 200° C., between −5° C. and 150° C., between 0° C. and 100° C., between 0° C. and 50° C., between 5° C. and 40° C., between 10° C. and 35° C., between 15° C. and 30° C. or between 20° C. and 25° C. In some embodiments, flue gas fuel stream 112 may leave exchanger 110 at a pressure less than 10 barg, such as less than 8 barg, less than 5 barg, less than 2.5 barg, less than 1 barg, less than 0.75 barg, less than 0.5 barg, less than 0.4 barg, less than 0.3 barg, less than 0.2 barg, less than 0.15 barg, less than 0.10 barg or less than 0.075 barg and at a temperature between 200° C. and 375° C., such as between 225° C. and 375° C., between 250° C. and 370° C., between 275 and 365° C., between 300 and 360° C. or between 325° C. and 355° C. Preferably, the temperature of stream 112 leaving syngas heat recovery heat exchanger 110 is within 100° C. of the temperature of syngas stream 190, such as within 90° C., 80° C., 70° C., 60° C. 50° C., 40° C. 30° C. or within 20° C. of the temperature of syngas steam 190. Preferably the pressure drop for flue gas fuel stream 112 across exchanger 110 is less than 0.10 bar, such as less than 0.09 bar, less than 0.07 bar, less than 0.06 bar or less than 0.05 bar.

Combustion air stream 114 may enter syngas heat recovery heat exchanger 110 at a pressure less than 1 barg, such as less than 0.75 barg, less than 0.50 barg, less than 0.40 barg, less than 0.30 barg, less than 0.20 barg, less than 0.15 barg, less than 0.10 barg or less than 0.075 barg and at any suitable temperature, such as at the supply temperature or at room temperature, or such as at a temperature between −40° C. and 350° C., such as between −30° C. and 300° C., between −20° C. and 250° C., between −10° C. and 200° C., between −5° C. and 150° C., between 0° C. and 100° C., between 0° C. and 50° C., between 5° C. and 40° C., between 10° C. and 35° C., between 15° C. and 30° C. or between 20° C. and 25° C. In some embodiments, combustion air stream 114 may leave exchanger 110 at a pressure less than 1 barg, such as less than 0.75 barg, less than 0.50 barg, less than 0.40 barg, less than 0.30 barg, less than 0.20 barg, less than 0.15 barg, less than 0.10 barg or less than 0.075 barg and at a temperature between 200° C. and 375° C., such as between 225° C. and 375° C., between 250° C. and 370° C., between 275 and 365° C., between 300 and 360° C. or between 325° C. and 355° C. Preferably, the temperature of stream 114 leaving syngas heat recovery heat exchanger 110 is within 100° C. of the temperature of syngas stream 190, such as within 90° C., 80° C., 70° C., 60° C. 50° C., 40° C. 30° C. or within 20° C. of the temperature of syngas steam 190. Preferably, the pressure drop for combustion air stream 114 across exchanger 110 is less than 0.10 bar, such as less than 0.09 bar, less than 0.07 bar, less than 0.06 bar or less than 0.05 bar.

Air feed stream 107 may enter syngas heat recovery heat exchanger 110 at a pressure less than 1 barg, such as less than 0.75 barg, less than 0.50 barg, less than 0.40 barg, less than 0.30 barg, less than 0.20 barg, less than 0.15 barg, less than 0.10 barg or less than 0.075 barg and at any suitable temperature, such as at the supply temperature or at room temperature, or such as at a temperature between −40° C. and 350° C., such as between −30° C. and 300° C., between −20° C. and 250° C., between −10° C. and 200° C., between −5° C. and 150° C., between 0° C. and 100° C., between 0° C. and 50° C., between 5° C. and 40° C., between 10° C. and 35° C., between 15° C. and 30° C. or between 20° C. and 25° C. In some embodiments, air feed stream 107 may leave exchanger 110 at a pressure less than 1 barg, such as less than 0.75 barg, less than 0.50 barg, less than 0.40 barg, less than 0.30 barg, less than 0.20 barg, less than 0.15 barg, less than 0.10 barg or less than 0.075 barg and at a temperature between 200° C. and 375° C., such as between 225° C. and 375° C., between 250° C. and 370° C., between 275 and 365° C., between 300 and 360° C. or between 325° C. and 355° C. Preferably, the temperature of stream 107 leaving syngas heat recovery heat exchanger 110 is within 100° C. of the temperature of syngas stream 190, such as within 90° C., 80° C., 70° C., 60° C. 50° C., 40° C. 30° C. or within 20° C. of the temperature of syngas steam 190. Preferably, the pressure drop for air feed stream 107 across exchanger 110 is less than 0.10 bar, such as less than 0.09 bar, less than 0.07 bar, less than 0.06 bar or less than 0.05 bar.

Syngas stream 190 may enter syngas heat recovery heat exchanger 110 at a temperature of between 200° C. and 450° C., such as between 300° C. and 420° C., between 325° C. and 400° C., between 350° C. and 400° C., between 375° C. and 400° C., between 385° C. and 400° C. or between 385° C. and 395° C. and at a pressure below the pressure of syngas stream 180 leaving reformer module 150, such as between 10 bara and 100 bara, between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara and may leave exchanger 110 at a temperature of between 75° C. and 200° C., between 100° C. and 180° C., between 125° C. and 170° C. or between 130° C. and 150° C. and at a pressure between 10 bara and 100 bara, such as between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.0 bara. Preferably, the pressure drop for syngas stream 114 across exchanger 110 is less than 0.50 bar, such as for example, less than 0.40 bar, less than 0.30 bar, less than 0.20 bar or less than 10 bar.

Syngas stream 191 leaving syngas heat recovery heat exchanger 110 may proceed to heat exchanger 109, where it may exchange heat with water stream 108. Preferably, heat exchanger 109 is combined with heat exchanger 110 into a single PCHE. Syngas stream may enter heat exchanger 109 (whether as a portion of heat exchanger 109 or separately) at the temperature and pressure that it left heat exchanger 110 and may leave exchanger 109 at a temperature of between 75° C. and 200° C., between 100° C. and 180° C., between 125° C. and 170° C. or between 130° C. and 150° C. and at a pressure of between 10 bara and 100 bara, between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara. Preferably, water stream 108 leaves heat exchanger 109 within 20° C. of the inlet temperature of syngas stream 191.

Water stream 108 may enter heat exchanger 109 (whether as a portion of heat exchanger 110 or separately) at essentially the temperature and pressure that it enters system 100 and may leave heat exchanger 109 at a temperature of between 95° C. and 200° C., such as between 110° C. and 190° C., between 115° C. and 180° C., between 120° C. and 170° C. or between 130° C. and 150° C. and at a pressure equal to or above the pressure of stream 180 leaving reformer module 150, such as between 10 bara and 100 bara, between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara.

Combustion air stream 114 may be combined with fuel feed stream 105 inside syngas heat recovery heat exchanger 110 or after leaving heat exchanger 110 as shown in FIG. 1A to form fuel/air mixture stream 118 and fuel air mixture stream 118 may be split via fuel/air flow splitter 116 into fuel preheat mixture 119 and air preheat mixture 117. Fuel/air flow splitter 116 may be a piping junction or any other suitable flow splitting mechanism, may include a valve, or other suitable splitting device for controlling flow or the fuel/air flow may be split and the flow controlled using passive means which maintain the desired downstream fuel/air ratio for feed to fuel pre-heater 120 and air pre-heater 122 throughout a broad range of flow magnitudes.

Figure 1B:
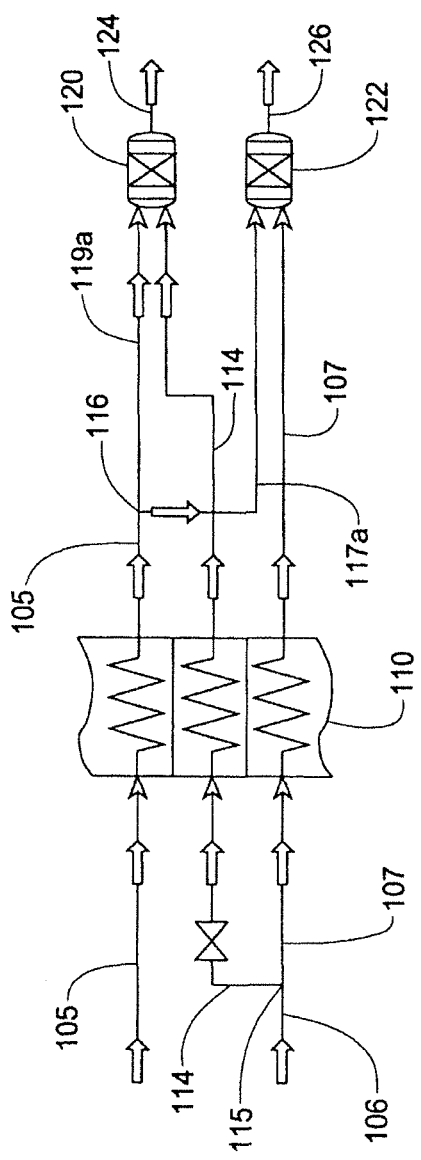
FIG. 1B shows a schematic of an alternative configuration for a portion of the reforming system according to FIG. 1A, FIG. 5 and FIG. 7.

Alternatively, in some embodiments, the details of the configuration of the fuel and air streams entering and leaving the syngas heat recovery heat exchanger and proceeding to the pre-heaters may appear as in FIG. 1B. FIG. 1B shows fuel feed stream 105, combustion air stream 114 and air feed stream 107 entering a portion of syngas heat recovery heat exchanger 110. In FIG. 1B, combustion air stream 114 does not combine with fuel feed stream 105 prior to entering fuel pre-heater 120 and instead joins with fuel preheat stream 119a, which is not an air/fuel mixture in this embodiment, at pre-heater 120. In such a case fuel feed stream 105 may be split into air preheat fuel stream 117a and fuel preheat stream 119a, with neither stream including air from combustion air stream 114, and fuel stream 117a may be fed as a pure fuel stream into air pre-heater 122. In such a case, the details of the resistance network and the pressure balances in FIG. 15 would be slightly different. In some embodiments, such as embodiments where the hydrogen and carbon monoxide content of the fuel streams is sufficient for catalytic combustion, pre-heaters 120 and 122 may be configured to mix the entering air and pure fuel streams prior to passing the mixed stream to the catalyst beds or chambers for catalytic combustion. Alternatively, pre-heaters 120 and 122 may be configured with an ignition source for start-up, such as a spark source or a heating element, to provide for non-catalytic (homogeneous) combustion of all or at least a portion of the fuel stream. In such cases at least a portion of the non-catalytic combustion would need to occur in a diffusion flame, while some of the non-catalytic combustion could occur in a premixed flame. The pre-heaters may also be configured for both non-catalytic combustion and catalytic combustion of the fuel stream.

Referring to FIG. 1A, fuel preheat mixture 119 may be partially catalytically combusted in fuel pre-heater 120 to provide heat to reforming fuel stream 124. Fuel pre-heater 120 may be any suitable catalytic combustion chamber wherein the fuel in fuel preheat mixture 119 is partially catalytically combusted, and may comprise a separate catalytic reactor loaded with structured or unstructured catalyst or may comprise a modified section of pipe that has been loaded with structured or unstructured catalyst. In some embodiments, the fuel in fuel preheat mixture 119 is only partially catalytically combusted because the amount of air in the fuel preheat mixture 119 is deliberately insufficient to fully combust the fuel. In preferred embodiments, where the fuel preheat mixture 119 entering fuel pre-heater 120 is below metal dusting temperatures and the reformer fuel stream 124 is above metal dusting temperatures, metal dusting conditions may occur in fuel pre-heater 120, and therefore fuel pre-heater 120 is preferably constructed from metal dusting resistant metal or from metal coated with a metal dusting resistant coating and/or is configured for easy repair and/or removal and replacement.

Preferably fuel preheat mixture 119 is at a temperature below metal dusting conditions, such as at a temperature below 400° C., such as below 375° C., below 360° C., below 350° C., below 325° C. or below 300° C. Preferably the pressure of the fuel preheat mixture 119 is less than 10 barg, such as less than 8 barg, less than 5 barg, less than 2.5 barg, less than 1 barg, less than 0.75 barg, less than 0.5 barg, less than 0.4 barg, less than 0.3 barg, less than 0.2 barg, less than 0.15 barg, less than 0.10 barg or less than 0.075 barg. Preferably, the amount of air in fuel preheat mixture 119 is just sufficient, when fully consumed in excess fuel, to give the necessary reformer fuel temperature, with no further control of the reactor necessary.

Preferably reformer fuel stream 124 is at a temperature above metal dusting conditions, such as at a temperature above 775° C., above, 780° C., above 785° C., above 790° C., above 795° C., above 800° C., above 805° C., above 810° C. or above 815° C. Preferably the pressure of the reformer fuel stream 124 is less than 10 barg, such as less than 8 barg, less than 5 barg, less than 2.5 barg, less than 1 barg, less than 0.75 barg, less than 0.5 barg, less than 0.4 barg, less than 0.3 barg, less than 0.2 barg, less than 0.15 barg, less than 0.10 barg or less than 0.075 barg, or less than 0.05 barg.

Air preheat mixture 117 may be combusted in air pre-heater 122 in the presence of air feed stream 107 to form reforming air stream 126. Air pre-heater 122 may be any suitable catalytic combustion chamber wherein the fuel in air preheat mixture 117 is catalytically combusted and may comprise a separate catalytic reactor loaded with structured or unstructured catalyst or may comprise a modified section of pipe that has been loaded with structured or unstructured catalyst. Unlike in fuel pre-heater 120, the fuel in air preheat mixture 117 is completely or substantially completely catalytically combusted because the amount of air in the air pre-heater 122 is not limited to conserve fuel for further combustion downstream. In preferred embodiments, where the air preheat mixture 117 entering fuel pre-heater 122 is below metal dusting temperatures and the reformer air stream 126 is above metal dusting temperatures, metal dusting conditions may occur in air pre-heater 122, and therefore air pre-heater 122 is preferably constructed from metal dusting resistant metal or from metal coated with a metal dusting resistant coating and/or is configured for easy repair and/or removal and replacement. By localizing the occurrence of metal dusting conditions or limiting the components within reformer system 100 that are exposed to metal dusting conditions, the cost of the system and ease of use and repair/maintenance may be minimized.

In general, air preheat mixture 117 is at a temperature below metal dusting conditions, such as at a temperature below 400° C., such as below 375° C., below 360° C., below 350° C., blow 325° C. or below 300° C. Preferably the pressure of the air preheat mixture 122 is less than 1 barg, such as less than 0.75 barg, less than 0.50 barg, less than 0.40 barg, less than 0.30 barg, less than 0.20 barg, less than 0.15 barg, less than 0.10 barg, less than 0.075 barg, or less than 0.05 barg. Preferably, the amount of fuel in air preheat mixture 117 is just sufficient, when fully combusted in excess air, to give the necessary reformer air temperature, with no further control of the reactor necessary.

Air feed stream 107 may enter air pre-heater 122 at essentially the temperature and pressure it leaves syngas heat recovery heat exchanger 110, such as at a temperature below metal dusting conditions and may leave air pre-heater 122 as reformer air stream 126 at a temperature above metal dusting conditions, such as at a temperature above 800° C., above 815° C., above 830° C., above 840° C., above 850° C., above 860° C., above 875° C., above 890° C., or above 900° C. Preferably the pressure of the reformer air stream 126 is less than less than 1 barg, such as less than 0.75 barg, less than 0.50 barg, less than 0.40 barg, less than 0.30 barg, less than 0.20 barg, less than 0.15 barg, less than 0.10 barg, less than 0.075 barg, or less than 0.05 barg.

As shown in FIG. 1A, after leaving syngas heat recovery heat exchanger 110, flue gas fuel stream 112 is combined with flue gas stream 160 from the reformer module 150 to form fuel-containing flue gas stream 162. Fuel-containing flue gas stream 162 is combusted in flue gas pre-heater 175 via catalytic combustion of the fuel components in fuel-containing flue gas stream 162, forming heated flue gas stream 163. Alternatively, flue gas fuel stream 112 may feed directly to flue gas pre-heater 175, where it may mix with flue gas stream 160 and then be combusted to form heated flue gas stream 163. Heated flue gas stream 163 may provide additional heat to water stream 108 in heat exchanger 164 after water stream 108 leaves heat exchanger 109. From there heated flue gas stream 163 may be exhausted as flue gas or may proceed to further downstream processing.

Flue gas pre-heater 175 may be any suitable catalytic combustion chamber wherein the fuel in fuel-containing flue gas stream 162 (or in fuel stream 112, when fuel stream 112 connects directly to flue gas pre-heater 175) is catalytically combusted to provide heat to fuel containing flue gas stream 162 and may comprise a separate catalytic reactor loaded with structured or unstructured catalyst or may comprise a modified section of pipe that has been loaded with structured or unstructured catalyst. Preferably, fuel containing flue gas stream 162 enters flue gas pre-heater 175 at a temperature between 200° C. and 450° C., such as between 225° C. and 440° C., between 250 and 425° C., between 275° C. and 420° C., between 300 and 410° C., between 325 and 400° C., or between 350 and 390° C. and a pressure less than 1 barg, such as less than 0.75 barg, less than 0.50 barg, less than 0.40 barg, less than 0.30 barg, less than 0.20 barg, less than 0.15 barg, less than 0.10 barg, less than 0.075 barg, or less than 0.05 barg and leaves flue gas pre-heater 175 as heated flue gas stream 163 at a temperature between 250° C. and 550° C., such as between 275° C. and 525° C., between 300° C. and 500° C., between 350° C. and 490° C., between 375° C. and 475° C. or between 400° C. and 450° C., and at a pressure of less than 1 barg, such as less than 0.75 barg, less than 0.50 barg, less than 0.40 barg, less than 0.30 barg, less than 0.20 barg, less than 0.15 barg, less than 0.10 barg, less than 0.075 barg, or less than 0.05 barg.

Figure 3A:
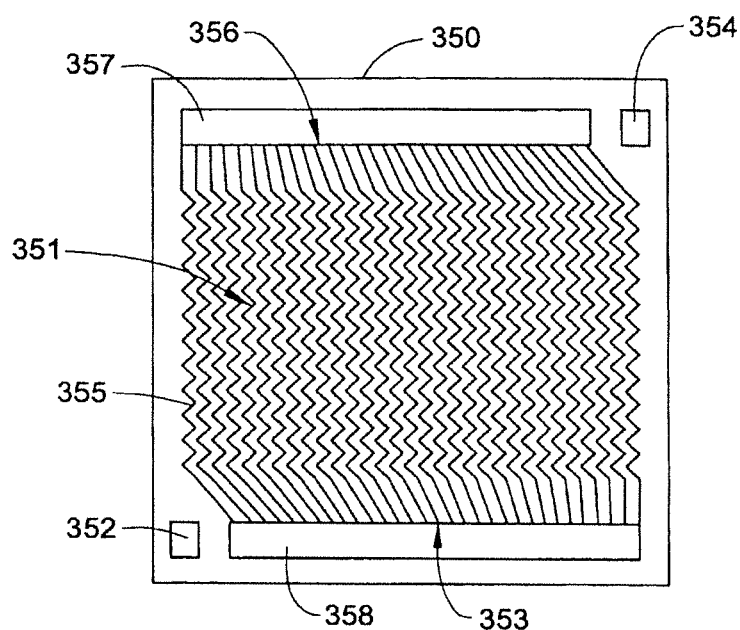
FIG. 3A-B show schematics of plates that may be used to form an embodiment of heat exchanger 164 as identified in FIG. 1A, FIG. 5 and FIG. 7.
Figure 3B:
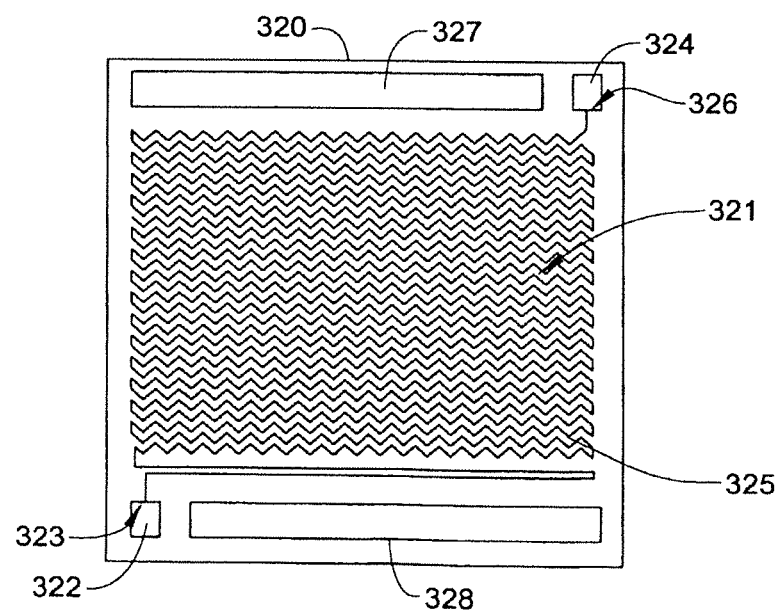

Heat exchanger 164 may be any suitable heat exchanger for exchanging heat from heated flue gas stream 163 into water stream 108. In some embodiments, heat exchanger 164 may be a PCHE. In some embodiments, heat exchanger 164 may comprise a PCHE that is constructed from a series of plates as shown in FIG. 3A-B. The plates may be combined into a stack and diffusion bonded or otherwise bonder to one another to form heat exchanger 164 to provide heat exchange between the entering hot and cold streams. In general the flow paths for each of the streams may be formed in the plates by etching, milling or other suitable process and may be configured to provide for the desired heat exchange, while limiting pressure drop for one or more streams across the heat exchanger. Preferably, the streams entering and leaving exchanger 164 are maintained at temperature, pressure and composition conditions that avoid or reduce metal dusting conditions within the heat exchanger.

Referring to FIG. 3A-B, in some embodiments, heat exchanger 164 may comprise one or more water feed plates 320 and one or more heated flue gas plates 350. Each of the plates may be constructed from materials suitable for the purpose and the conditions present in exchanger 164. Examples of suitable materials for constructing plates 320 and 350 include 316 stainless steel and 304 stainless steel. The water feed plates 320 and heated flue gas plates 350 may independently have the thicknesses described in Table 1. In some embodiments, the plates may each be 1.6 mm thick.

FIG. 3A shows heated flue gas flow plate 350 with heated flue gas stream flow path 351, which connects heated flue gas stream inlets 353 and heated flue gas stream outlets 356. Heated flue gas inlets 353 may split the heated flue gas stream 163 into multiple independent flow channels 355 comprising heated flue gas stream flow path 351. Heated flue gas stream outlets 356 may re-combine the flow in flow channels 355 to re-form flue gas stream 163 as it leaves heat exchanger 164. Heated flue gas stream inlets 353 and heated flue gas stream outlets 356 connect to heated flue gas stream inlet penetration 358 and heated flue gas stream outlet penetration 357 and heated flue gas flow plate 350 also includes water inlet penetration 354 and water outlet penetration 352. Flow channels 355 and adjacent ridges may be sized to provide for safe pressure containment and a cost effective combination of heat transfer capacity and pressure drop. In some embodiments, independent flow channels 355 may each comprise a generally semicircular cross-section and may have the dimensions described in Table 1. In some embodiments, independent flow channels 355 may each have a semicircular cross-section with a width of about 1.9 mm, a depth of about 1.0 mm and about 0.4 mm ridges. Though a specific number of independent flow channels 355 are shown, it should be understood that water stream flow path 351 may comprise any suitable number of independent flow channels configured appropriately according to the individual needs of the system.

Though FIG. 3A shows heated flue gas stream flow path 351 as a direct cross flow or single pass flow path, in some embodiments heated flue gas stream flow path 351 may comprise more than one pass, each pass comprising a single reversal in flow direction, such as from 2 to 20 passes, 2 to 10 passes or 2 to 5 passes. Preferably, heated flue gas stream flow path 351 comprises a direct cross flow or single pass flow path during heat exchange and flows in a counter flow direction relative to the general flow of the water stream.

FIG. 3B shows water feed plate 320 having a water stream flow path 321 which connects water stream inlets 326 and water stream outlets 323. Water stream flow path 321 may comprise one or multiple independent flow channels 325. Water stream inlets 326 and water stream outlets 323 connect to water inlet penetration 324 and water outlet penetration 322, respectively, and water feed plate 320 also includes heated flue gas stream outlet penetration 327 and heated flue gas stream inlet penetration 328. Flow channels 325 and adjacent ridges may be sized to provide for safe pressure containment and a cost effective combination of heat transfer capacity and pressure drop. In some embodiments, independent flow channels 325 may each comprise a generally semicircular cross-section and may have the dimensions described in Table 1. In some embodiments, independent flow channels 325 may each have a semicircular cross-section with a width of about 1.63 mm, a depth of about 0.75 mm and about 0.4 mm ridges. Though a specific number of independent flow channels 325 are shown, it should be understood that water stream flow path 321 may comprise any suitable number of independent flow channels configured appropriately according to the individual needs of the system.

Though FIG. 3B shows water stream flow path 321 as a multi-pass single channel flow path, flow path 321 may also comprise a direct counter flow, co-flow, cross flow or single pass flow path comprising multiple independent channels. In some embodiments water stream flow path 321 may comprise more than one pass, each pass comprising a single reversal in flow direction, such as from 2 to 100 passes, 5 to 75 passes, 10 to 60 passes, 15 to 50 passes or 20 to 40 passes. Preferably, water stream flow path 321 comprises a multi-pass flow path having 5 passes or greater, 10 passes or greater, 15 passes or greater, 20 passes or greater, 25 passes or greater or 30 passes or greater where the passes are in cross flow during heat exchange, and where the water stream flows in a generally counter-flow direction relative to the heated flue gas stream.

In some embodiments, the plates used to form embodiments of heat exchanger 164 may be stacked and diffusion bonded or otherwise bonded in any suitable order to form heat exchanger 164. In some embodiments, the plates may be stacked and diffusion bonded or otherwise bonded in order as follows: at least one 1 end plate (not shown), multiple heat exchange cells, each heat exchange cell comprising a heated flue gas flow plate 350 followed by a water stream feed plate 320, followed by a final heated flue gas flow plate 350, and then at least 1 end plate (not shown). Accordingly, the order of the printed circuit heat exchange plates in a given stack for heat exchanger 164 may have the following pattern (Endplate="E", Flue gas plate 350="F", water stream feed plate 320="W"): E F W F F W F F W F . . . F W F F W F E). The end plates may be blank plates with no flow path circuitry and may be insulated to enhance heat transfer and limit heat loss. The end plates may serve as lids to the penetrations and support connection of the relevant streams to heat exchanger 164, such as via ports or headers. Accordingly, the endplates should be thick enough to accommodate the pressures in each of the penetrations and to support the ports or headers. In some embodiments, a single endplate is used for each end of the exchanger 164, where the endplate is thicker than the other plates. In other embodiments, multiple endplates may be used at each end to provide sufficient thickness to support or provide for the headers or ports. In some embodiments, heat exchanger 164 may comprise a stack that is between 50 mm and 70 mm tall, such as 60 mm tall.

In some embodiments, heat exchanger 164 comprises from 2 to 30 heat exchange cells, such as from 5-25, from 7-20, from 8 to 17 or from 10 to 15 heat exchange cells, each heat exchange cell comprising a heated flue gas flow plate 350 followed by a water stream feed plate 320, followed by a heated flue gas flow plate 350. In preferred embodiments for reforming 2 SCMH of natural gas using PSA off-gas as fuel, heat exchanger 164 comprises at least 10 heat exchange cells. In one preferred embodiment, heat exchanger 164 comprises 10 heat exchange cells, each heat exchange cell comprising a heated flue gas flow plate 350 followed by a water stream feed plate 320, and comprises an additional heated flue gas flow plate 350, and six endplates for a total of 30 active plates. The number of plates and heat exchange cells may be modified according to production needs, heat exchange efficiency and other parameters.

When the various plates are stacked and diffusion bonded or otherwise bonded to form a heat exchanger, heated flue gas stream inlet penetrations 358 and heated flue gas stream outlet penetrations 357 are preferably aligned with heated flue gas stream inlet penetrations 328 and heated flue gas stream outlet penetrations 327 on the water feed plates 320 to form inlet and outlet flow access paths or chambers for the heated flue gas stream. In addition, the water stream inlet penetrations 324 and 356 and the water stream outlet penetrations 322 and 355 are also preferably aligned to form inlet and outlet flow access paths or chambers for the water stream. The stacking of the plates also preferably places flow paths 321 and 351 in close proximity to one another to facilitate heat transfer between the streams through the walls of independent channels 325 and 355.

In some embodiments, water stream 108 may enter heat exchanger 164 at essentially the temperature and pressure that it leaves syngas heat recovery heat exchanger 110 and may leave exchanger 164 at a temperature of between 120° C. and 210° C., such as between 130° C. and 205° C., between 150° C. and 200° C. or between 175° C. and 195° C. and at a pressure between 10 bara and 100 bara, such as between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara. Preferably, the pressure drop for water stream 108 across heat exchanger 164 is less than 1 bar, such as less than 0.75 bar, less than 0.60 bar less than 0.50 bar, less than 0.40 bar or less than 0.30 bar.

Heated flue gas stream 163 may enter heat exchanger 164 at essentially the temperature and pressure that it left flue gas pre-heater 175 and may leave exchanger 164 at a temperature of between 120° C. and 200° C., such as between 125° C. and 180° C., between 130° C. and 160° C. or between 140° C. and 150° C. and a pressure of less than 0.02 barg, such as less than 0.015 barg, or less than 0.010 barg.

After leaving heat exchanger 164, water stream 108 may enter quench heat exchanger 165 where it may be further heated to raise steam for the reforming process. Quench heat exchanger 165 may comprise heat exchanger 166 submerged in water in a tank or vessel. Quench heat exchanger 165 may be used to quench syngas quench stream 170. Syngas quench stream 170 may be a portion of syngas stream 180 leaving reformer module 150. Syngas stream 180 may be split using syngas stream splitter 184 to form syngas quench stream 170 and syngas stream 182. Syngas stream splitter 184 may be any suitable means of splitting the flow of syngas stream 180, such as a "T" or "Y" piping connection and may direct the desired amount of flow in each direction to ensure adequate steam production in quench heat exchanger 165 and adequate hydrogen production in optional water-gas shift reactor 186 or adequate syngas temperature and pressure entering syngas heat recovery heat exchanger 110. Preferably, quench heat exchanger 165 and heat exchanger 166 are configured such that the flow of syngas quench stream 170 remains turbulent throughout the desired turndown range in which system 100 is operated.

As long as heat exchanger 166 remains submerged in the water in quench exchanger 165, metal dusting conditions are avoided in the exchanger because the temperature of the exchanger never rises above the boiling point of the water, as the temperature of the water remains essentially constant during the phase transition. Though avoided in the quench heat exchanger 165, metal dusting conditions may occur in syngas quench stream 170 adjacent to quench heat exchanger 165, and therefore a portion of syngas quench stream 170 is preferably constructed from metal dusting resistant metal or metal coated with a metal dusting resistant coating and/or is configured for easy repair and/or removal and replacement. Ideally, the portion of syngas quench stream 170 that is exposed to metal dusting conditions is minimized and is configured to minimize repair, maintenance and replacement. In some embodiments, the metal dusting conditions within stream 170 are preferably limited to within 5 pipe diameters of the entrance to quench heat exchanger 165 and therefore the piping in this portion of the system may be constructed from metal dusting resistant metal or metal coated with a metal dusting resistant coating and/or is configured for easy repair and/or removal and replacement. In this fashion, steam may be raised from the hot syngas to be used for the reforming stages, while metal dusting conditions are localized in a small portion of the syngas quench stream 170. Quench heat exchanger 165 also comprises steam outlet 167 and water blow down 168. Steam formed in quench heat exchanger 165 may pass through steam outlet 167 and proceed further into the system 100. Waste water and dissolved solids may be periodically blown down through water blow down 168 by actuation of valve 169 to prevent or limit build-up in quench heat exchanger 165.

Heat exchanger 166 may be partially or completely submerged in water from water stream 108 after it leaves heat exchanger 164. Heat exchanger 166 and the heat it transfers from the syngas quench stream 170 to the water preferably generate the bulk of the steam used in the reformer module 150. In some embodiments, heat exchanger 166 may be a PCHE. In some embodiments, heat exchanger 166 may comprise a PCHE that is constructed from a series of plates as shown in FIG. 4A-D. The plates may be combined into a stack and diffusion bonded or otherwise bonder to one another to form heat exchanger 166 to provide heat exchange between the entering hot and cold streams. In general the flow paths for each of the streams may be formed in the plates by etching, milling or other suitable process and may be configured to provide for the desired heat exchange, while limiting pressure drop for one or more streams across the heat exchanger. Preferably, the streams entering and leaving exchanger 166 are maintained at temperature, pressure and composition conditions that avoid or reduce metal dusting conditions within the heat exchanger.

Referring to FIG. 4A-D, in some embodiments, heat exchanger 166 may comprise one or more water plates 410, one or more syngas quench stream plates 420, one or more top endplates 430 and one or more bottom endplates 440. Each of the plates may be constructed from materials suitable for the purpose and the conditions present in exchanger 166. Examples of suitable materials for constructing plates 320 and 350 include 316 stainless steel and 304 stainless steel. The plates may independently have the thicknesses described in Table 1. In some embodiments, the plates may each be 1.6 mm thick.

Figure 4A:
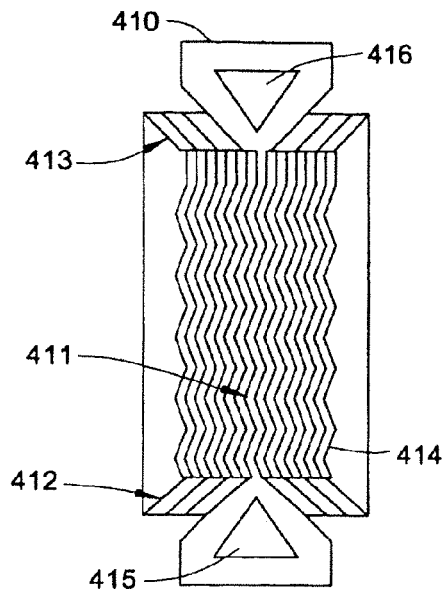
FIG. 4A-D show schematics of plates that may be used to form an embodiment of heat exchanger 166 as identified in FIG. 1A, FIG. 5 and FIG. 7.

FIG. 4A shows water plate 410 having a water stream flow path 411 which connects water stream inlets 412 and water stream outlets 413. Water stream inlets 412 may split the water flow into one or multiple independent flow channels 414 that form flow path 411. Water stream outlets 413 may re-combine flow channels 414 for exit from heat exchanger 166. Flow channels 414 may be configured for thermosyphon boiling of the water within exchanger 166 and may be formed in any suitable shape and size. In some embodiments, independent flow channels 414 may each comprise a generally semicircular cross-section and may have the dimensions described in Table 1. In some embodiments, independent flow channels 414 may each have a semicircular cross-section with a width of about 2.6 mm, a depth of about 1.10 mm and 0.4 mm ridges. Though a specific number of independent flow channels 414 are shown, it should be understood that water stream flow path 411 may comprise any suitable number of independent flow channels configured appropriately according to the individual needs of the system.

In some embodiments, water stream inlets 412 and outlets 413 may also comprise a generally semicircular cross-section having a width of from 0.6 mm to 3.5 mm, a depth of from 0.3 to 1.75 mm and ridges of from 0.3 mm to 1.5 mm and may be sized the same or differently than independent flow channels 414. In some embodiments, inlets 412 and outlets 413 each have a semicircular cross-section with a width of about 2.6 mm, a depth of about 1.10 mm and 0.4 mm ridges. Though FIG. 4A shows water stream flow path 411 as a direct counter or co-flow or single pass flow path, in some embodiments water stream flow path 411 may comprise more than one pass, each pass comprising a single reversal in flow direction, such as from 2 to 20 passes, 2 to 10 passes or 2 to 5 passes. Preferably, water stream flow path 411 comprises a direct or single pass co-flow flow path. As shown in FIG. 4A, water stream plate 410 also includes syngas quench stream inlet and outlet penetrations 415 and 416 respectively.

Figure 4B:
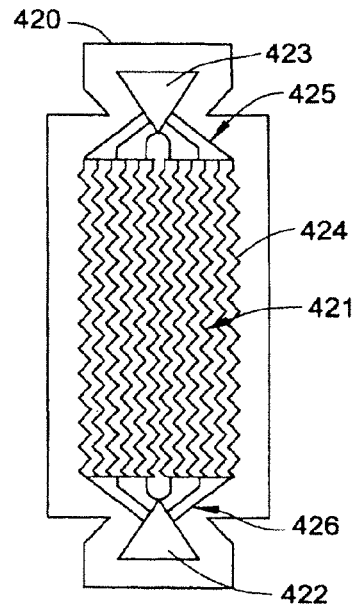
Figure 4C:
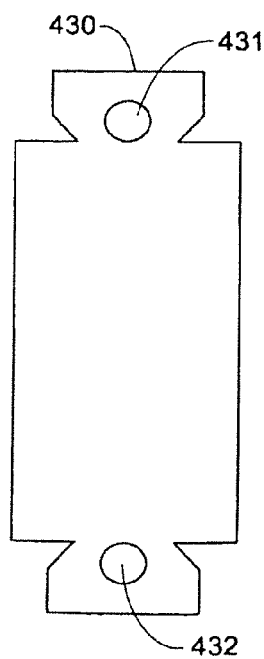

Referring to FIG. 4B, syngas quench stream plates 420 may have a syngas quench stream flow path 421, which connects syngas quench stream inlet penetrations 422 and syngas quench stream outlet penetrations 423. Syngas quench stream inlet penetrations 422 may feed inlet channels 426, which may be further split to form one or multiple independent flow channels 424 that make up flow path 421. Syngas quench stream outlet 423 may recombine multiple outlet channels 425 which may recombine independent flow channels 424 for exit from the heat exchanger. Inlet and outlet channels 426 and 425 and independent flow channels 424 may each comprise a generally semicircular cross-section and may have the dimensions described in Table 1. In some embodiments, independent flow channels 424 may each have a semicircular cross-section with a width of about 1.99 mm, a depth of about 1.10 mm and 0.4 mm ridges. In some embodiments, inlet and outlet channels 426 and 425 may each have a semicircular cross-section with a width of about 2.2 mm, a depth of about 1.10 mm and 0.4 mm ridges. Though a specific number of independent flow channels 414 are shown, it should be understood that water stream flow path 411 may comprise any suitable number of independent flow channels configured appropriately according to the individual needs of the system.

Though FIG. 4B shows syngas quench stream flow path 421 as a direct counter or co-flow or single pass flow path, in some embodiments syngas quench stream flow path 421 may comprise more than one pass, each pass comprising a single reversal in flow direction, such as from 2 to 20 passes, 2 to 10 passes or 2 to 5 passes. Preferably, syngas quench stream flow path 421 comprises a direct or single pass co-flow flow path.

Figure 4D:
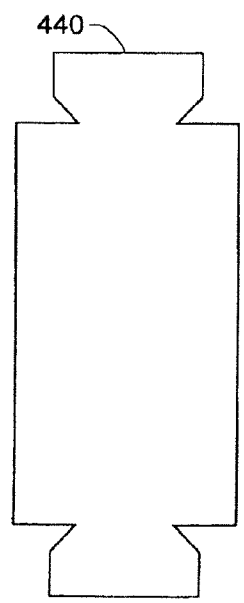

In some embodiments, the plates used to form embodiments of heat exchanger 166 may be stacked and diffusion bonded or otherwise bonded in any suitable order to form the heat exchanger. In some embodiments the plates may be stacked and diffusion bonded or otherwise bonded in order as follows: at least one top end plate 430 (FIG. 4C), multiple heat exchange cells, each heat exchange cell comprising a water plate 410 followed by a syngas quench stream flow plate 420, with one additional water plate and then at least one bottom end plate 440 (FIG. 4D). Accordingly, the order of printed circuit heat exchange plates in a given stack for heat exchanger 166 may have the following pattern for the active plates of heat exchanger 166, (water plate 410=W; syngas quench stream plate 420=S): W S W S W S . . . W S W S W. In some embodiments, the configuration will comprise cells of alternating water plates 410 and syngas quench stream plates 420 with one extra water plate 410 to serve as a bounding plate for the last syngas quench stream plate 420 in the stack. The end plates may be blank plates with no flow path circuitry and may be insulated to enhance heat transfer and limit heat loss. In some embodiments, multiple endplates may be used at each end. The end plates provide a wall for the passages on the bounding plate facing the end plate, serve as lids to the penetrations and support connection of the relevant streams to heat exchanger 166, such as via ports or headers. Accordingly, the endplates should be thick enough to accommodate the pressures in each of the penetrations and to support the ports or headers. In some embodiments, a single endplate is used for each end of the exchanger 166, where the endplate is thicker than the other plates. In other embodiments, multiple endplates may be used at each end to provide sufficient thickness to support or provide for the headers or ports. In some embodiments, heat exchanger 166 may comprise a stack that is between 15 and 25 mm tall.

In some embodiments, top end plate 430 may include a syngas stream inlet penetration 432 and a syngas stream outlet penetration 431 for entry and exit of the syngas quench stream. When the various plates are stacked and diffusion bonded or otherwise bonded to form a heat exchanger, syngas stream inlet penetrations 432 and syngas stream outlet penetrations 431 are preferably aligned with syngas quench stream inlet penetrations 422 and syngas quench stream outlet penetrations 423 on the syngas quench stream plates 420 and with the syngas quench stream inlet and outlet penetrations 414 and 415 on water plates 410 to form inlet and outlet flow access paths or chambers for the syngas quench stream. The stacking of the plates also preferably places flow paths 411 and 421 in close proximity to one another to facilitate heat transfer between the streams through the walls of independent channels 414 and 424. For those plates and streams that do not have penetrations through which the flow paths and flow channels are accessed, headers may be attached, such as welded, over the individual channel ends to facilitate delivery and/or collection of the stream flowing through the relevant channels.

In some embodiments, heat exchanger 166 comprises from 1 to 15 heat exchange cells, such as from 2 to 10, from 3 to 8, from 4 to 7 or from 5 to 7 heat exchange cells, each heat exchange cell comprising a water plate 410 followed by a syngas quench stream flow plate 420. In preferred embodiments for reforming approximately 2 SCMH of natural gas using PSA off-gas or tail gas as fuel, heat exchanger 166 comprises at least 4 heat exchange cells. In one preferred embodiment, heat exchanger 166 comprises 4 heat exchange cells, each heat exchange cell comprising a water plate 410 followed by a syngas quench stream flow plate 420, and 4 endplates for a total of 9 active plates. The number of plates and heat exchange cells may be modified according to production needs, heat exchange efficiency and other parameters.

Water stream 108 may enter quench heat exchanger 165 at essentially the temperature and pressure it left heat exchanger 164 and may leave exchanger 165 as reformer steam supply 172 at a temperature equal to the saturated steam temperature, such as between 175° C. and 225° C., between 180° C. and 210° C., between 185° C. and 205° C., between 190 and 205° C. or between 195 and 200° C. and at a pressure of between 10 bara and 100 bara, such as between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara.

Syngas quench stream 170 may enter quench heat exchanger 165 at a temperature of between 700° C. and 1000° C., such as between 750° C. and 975° C. or between 800° C. and 950° C., between 825° C. and 925° C. or between 850° C. and 900° C. and at a pressure of between 5 bara and 120 bara, such as between 10 bara and 100 bara, between 10 bara and 80 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara and may leave exchanger 165 at a temperature of between 180° C. and 210° C., such as between 185° C. and 205° C., between 190 and 205° C. or between 195 and 200° C. and at a pressure of between 5 bara and 120 bara, such as between 10 bara and 100 bara, between 10 bara and 80 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara. Preferably, the pressure drop for syngas quench stream 170 across exchanger 165 is less than 0.10 bar, such as less than 0.075 bar or less than 0.05 bar.

Water stream 108 is heated in quench heat exchanger 165 until it becomes steam at which point the steam leaves quench heat exchanger 165 through steam outlet 167 as reforming steam supply 172. Reforming steam supply 172 may be combined with gaseous hydrocarbon stream 102 after stream 102 leaves syngas heat recovery heat exchanger 110 to form gaseous/hydrocarbon steam stream 174. Reforming steam supply 172 and gaseous hydrocarbon stream 102 may be joined in any suitable manner, such as by joining the streams to form a single stream using a "Y" or "T" connector or by adding one stream into the other stream. After combining the streams, gaseous hydrocarbon-steam stream 174 may be fed to the first pre-reforming stage of reformer module 150. In some embodiments, the reforming steam supply 172 may include a back pressure regulator within its flow path prior to joining gaseous hydrocarbon stream 102 to help provide for stable boiling conditions during start-up, capacity changes and other transients, thereby avoiding surges of liquid water into the reformer module or starvation of steam flow to the reformer which could lead to coking in the reformer and/or pre-reformer. In some embodiments, gaseous hydrocarbon steam stream may also include a check valve within its flow path prior to being joined with reforming steam supply 172.

After being quenched in quench heat exchanger 165, syngas quench stream 170 may leave quench exchanger 165 as quenched syngas stream 171 and pass through valve 185, which may be any suitable valve for controlling or tuning the supply of quenched syngas 171 to syngas re-mixer 188. After proceeding through valve 185, quenched syngas stream 171 may be joined with syngas stream 182 in syngas re-mixer 188. Syngas stream 182 proceeds from syngas splitter 184 through fixed resistor 187, which may be a simple orifice or any other method of controlling high temperature flows. Generally, syngas stream 182 is too hot to employ a valve. Preferably, syngas stream 182 is at a temperature of between 700° C. and 1000° C., such as between 750° C. and 975° C. or between 800° C. and 950° C., between 825° C. and 925° C. or between 850° C. and 900° C. and at a pressure of between 5 bara and 120 bara, such as between 10 bara and 100 bara, between 10 bara and 80 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara.

Syngas re-mixer 188 may be any suitable apparatus for joining two streams, such as by joining the streams to form a single stream using a "Y" or "T" connector or by adding one stream into the other stream. Because of the temperature in syngas stream 182 relative to the temperature in quenched syngas stream 171, a portion of remixed syngas stream 189 and a portion of syngas stream 182 may be exposed to metal dusting conditions. Accordingly, a portion of syngas stream 182 within about 5 pipe diameters of re-mixer 188 and a portion of re-mixed syngas stream 189 within about 5 pipe diameters of re-mixer 188 are preferably constructed from metal dusting resistant alloys and/or alloys having a metal dusting resistant coating and/or is configured for easy repair and/or removal and replacement.

After being re-mixed, re-mixed syngas stream 189 may proceed to an optional water-gas shift reactor 186, where additional hydrogen is raised via the water-gas shift reaction. When a water-gas shift reactor is used, the temperature of re-mixed syngas stream 189 is preferably between 250° C. and 350° C., such as between 275° C. and 325° C., between 280° C. and 310° C., between 290° C. and 305° C. or between 295° C. and 300° C.

After leaving the water-gas shift reactor 186, syngas stream 190 may proceed to syngas heat recovery heat exchanger 110 where it may provide heat for the reactant feed streams, such as gaseous hydrocarbon stream 102, flue gas fuel stream 112, fuel feed stream 105, air feed stream 107, combustion air stream 114, and water stream 108 (when heat exchanger 109 is part of syngas heat recovery heat exchanger 110). Syngas stream 190 leaving the high temperature shift reactor may have a temperature between 250° C. and 450° C., such as between 275° C. and 450° C., between 300° C. and 440° C., between 325° C. and 430° C., between 350° C. and 420° C., between 375° C. and 410° C. or between 380° C. and 400° C. and a pressure between 10 bara and 100 bara, between 10 bara and 80 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara.

Figure 5:
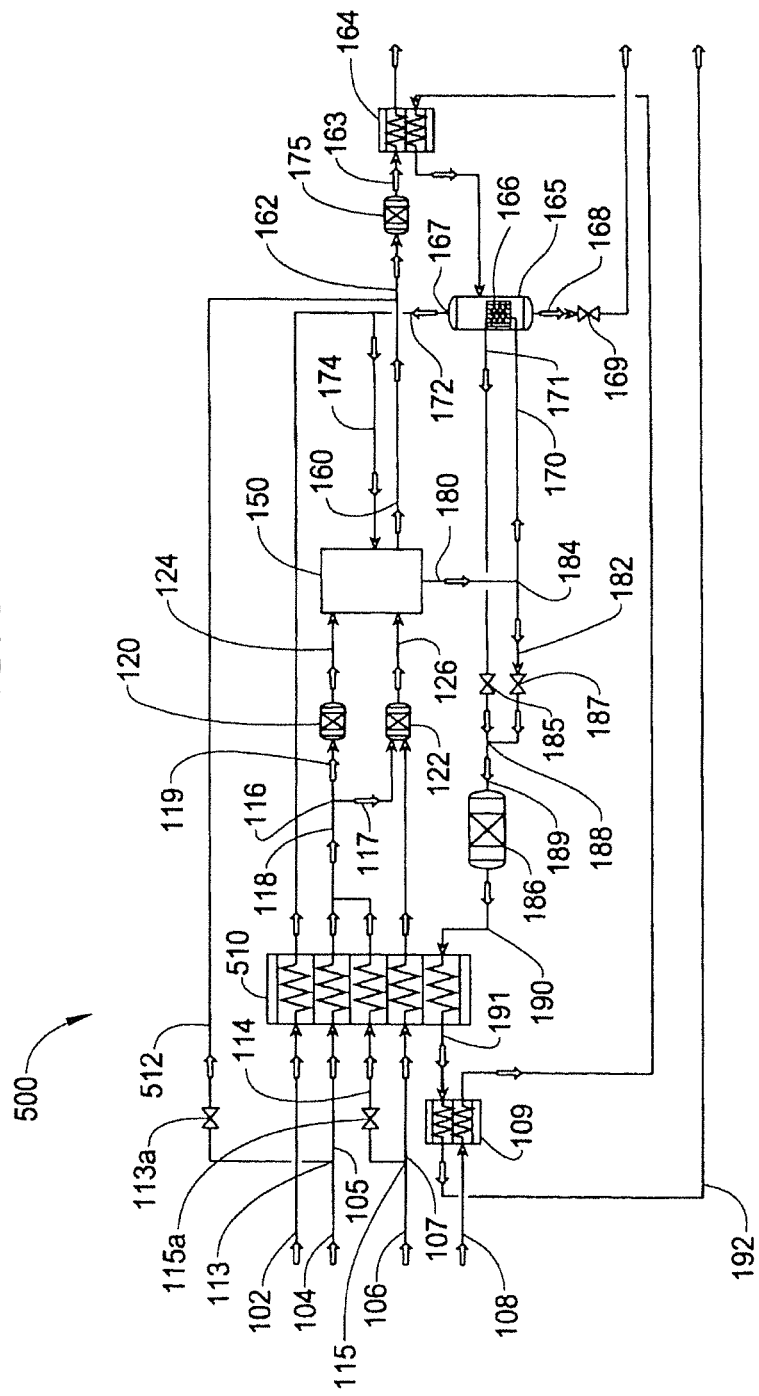
FIG. 5 shows a schematic of an alternate embodiment of a reforming system.

An example of an alternative configuration for the steam reforming apparatus is shown in FIG. 5. As shown, steam reforming apparatus 500 is substantially the same as apparatus 100 described with respect to FIG. 1A and/or FIG. 1B, with the exception that in steam reforming apparatus 500, flue gas fuel stream 512 bypasses the syngas heat exchanger 510 and is combined with flue gas stream 160 just prior to entering flue gas pre-heater 175 to form fuel rich flue gas stream 162. Flue gas fuel stream 512 may be combined with flue gas stream 160 in any suitable manner such as by joining the streams to form a single stream using a "Y" or "T" connector or by adding one stream into the other stream. Because flue gas fuel stream 512 bypasses syngas heat exchanger 510, syngas heat recovery heat exchanger 510, is configured slightly differently, having only 4 reactant feed streams (fuel feed stream 105, air feed stream 107, combustion air stream 114 and gaseous hydrocarbon feed stream 102), optionally water feed stream 108 (when heat exchanger 109 is included in heat exchanger 510) and syngas stream 190 flowing through it.

Figure 6A:
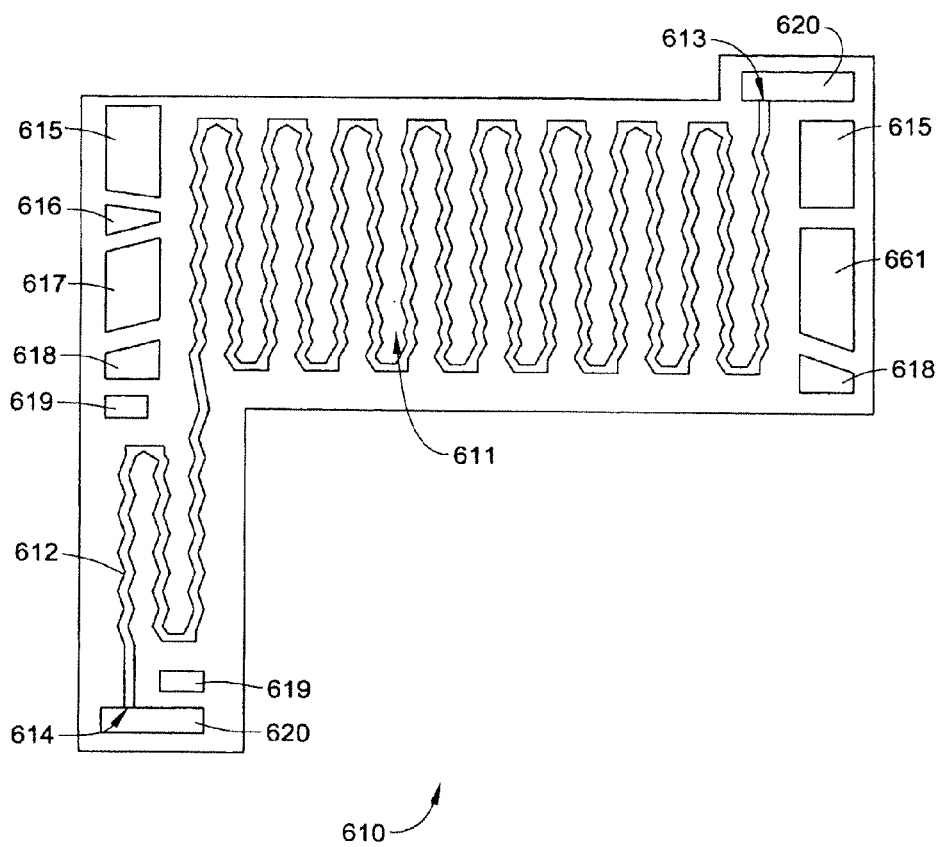
FIG. 6A-C show schematics of plates that may be used to form an embodiment of syngas heat recovery heat exchanger 510 as identified in FIG. 5.
Figure 6B:
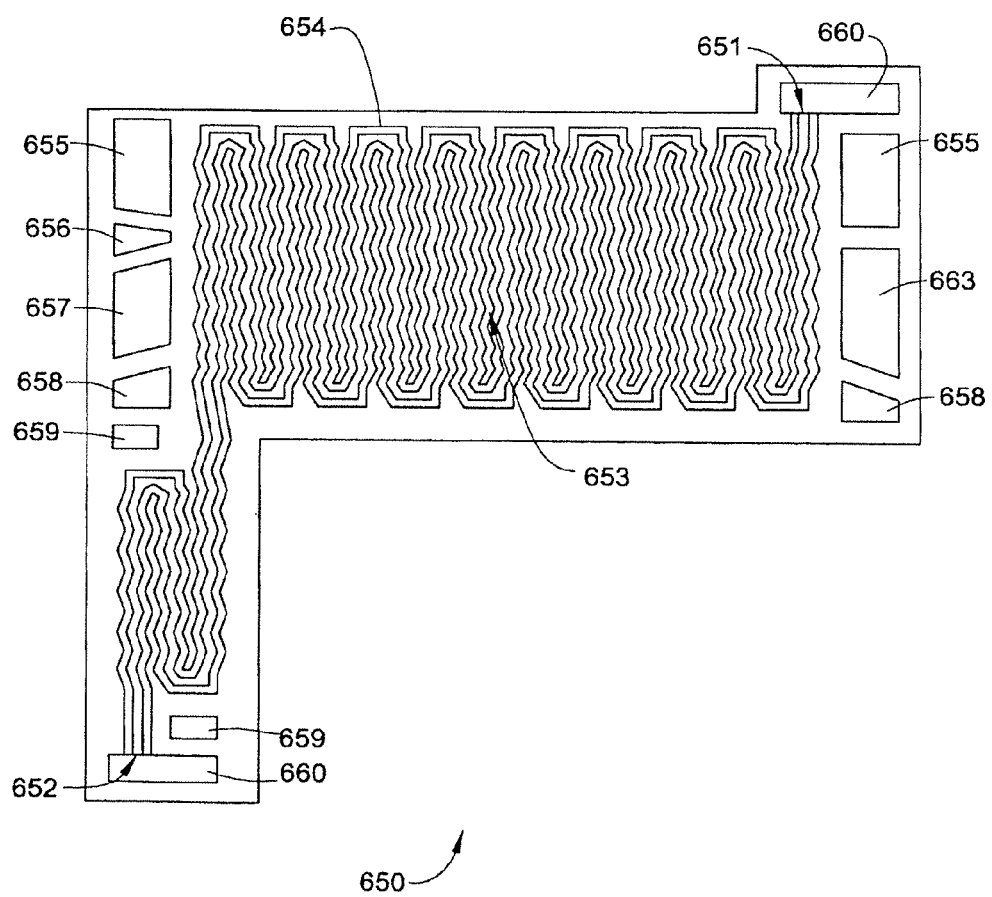
Figure 6C:
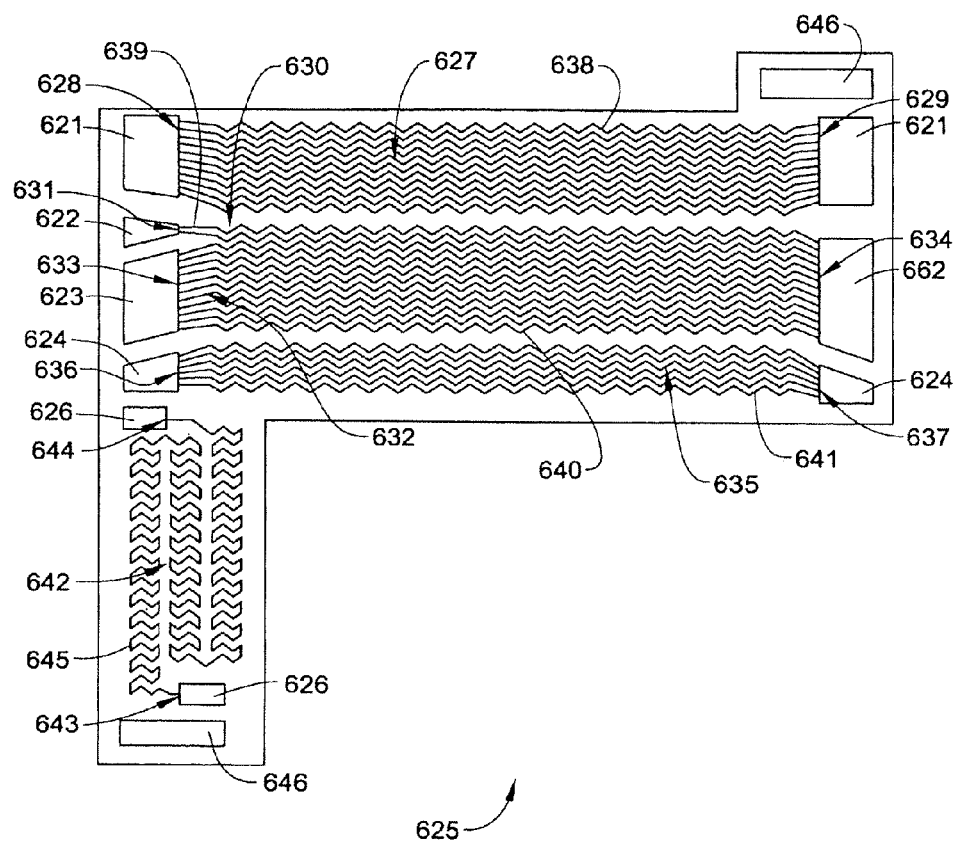

An example configuration of plates that may form syngas heat recovery heat exchanger 510 is shown in FIG. 6A-C. Referring to FIG. 6A-C, in some embodiments syngas heat recovery heat exchanger 510 may comprise a PCHE that is constructed from a series of plates that may be combined into a stack and diffusion bonded to one another to provide heat exchange between the entering hot and cold streams. In general the flow paths for each of the streams may be formed in the plates by etching, milling or other suitable process and may be configured to provide for the desired heat exchange, while limiting pressure drop for one or more streams across the heat exchanger. Preferably, the streams entering and leaving exchanger 510 are maintained at temperature, pressure and composition conditions that avoid or reduce metal dusting conditions within the heat exchanger. In most instances, the streams entering and leaving heat exchanger 510 are below metal dusting temperatures. In general, syngas heat recovery heat exchanger 510 is essentially the same as syngas heat recovery heat exchanger 110 shown in FIGS. 1 and 2A-C, with the exception that syngas heat recovery heat exchanger 510 does not heat the flue gas fuel stream 512. Accordingly, with this minor exception, the general construction of syngas heat recovery heat exchanger 510, the suitable plate and channel dimensions, thicknesses, and materials of construction for each of the plates and process conditions are substantially the same as those described with respect to FIG. 2A-C.

Referring to FIG. 6A-C, in some embodiments, syngas heat recovery heat exchanger 510 may comprise one or more bounding plates 610, one or more reactant feed plates 625 and one or more syngas plates 650. In the embodiment shown in FIG. 6A-C, the plates, when appropriately stacked and formed into a heat exchanger, will form a syngas heat recovery heat exchanger 510 that includes heat exchanger 109 (See FIG. 5). FIG. 6A shows a bounding plate 610 having a syngas flow path 611 comprising independent flow channels 612 connecting syngas inlets 613 with syngas outlets 614. Though FIG. 6A shows syngas flow path 611 as a multi-pass flow path, flow path 611 may also comprise a direct counter flow, co-flow, cross flow or single pass flow path comprising one or multiple independent channels 612.

In some embodiments syngas flow path 611 may comprise more than one pass, each pass comprising a single reversal in flow direction, such as from 2 to 100 passes, 5 to 75 passes, 10 to 60 passes, 15 to 50 passes or 20 to 40 passes. Preferably, syngas flow path 611 comprises a multi-pass flow path having 5 passes or greater, 10 passes or greater, 15 passes or greater, 20 passes or greater, 25 passes or greater or 30 passes or greater where the passes are in cross flow during heat exchange, but the syngas flows in a generally cross flow or counter-flow direction relative to the flows on the reactant feed plate 260. Bounding plate 610 also includes air stream penetrations 615, combustion air stream penetration 616, fuel stream penetration 617, fuel/air mixture penetration 661, gaseous hydrocarbon stream penetrations 618, water stream penetrations 619 and syngas stream penetrations 620. Bounding plate 610 ensures that all of the reactant feed plates 625 have hot stream plates on both sides either a bounding plate 610 or a syngas plate 650 and helps serve to balance the heat loads and the heat flux throughout the stacks. Bounding plate 610 may have more than one flow channels 612.

Referring to FIG. 6B, syngas plate 650 includes syngas inlets 651, syngas outlets 652 and syngas flow path 653. Syngas flow path 653 may comprise one or multiple syngas independent flow channels 654. Though a specific number of syngas independent flow channels 654 are shown, it should be understood that syngas flow path 653 may comprise any suitable number of independent flow channels configured appropriately according to the individual needs of the system.

Though FIG. 6B shows syngas flow path 653 having a specific number of passes, in some embodiments syngas flow path 653 may comprise more than one pass, each pass comprising a single reversal in flow direction, such as from 2 to 100 passes, 5 to 75 passes, 10 to 60 passes, 15 to 50 passes or 20 to 40 passes. Preferably, syngas flow path 653 comprises a multi-pass flow path having 5 passes or greater, 10 passes or greater, 15 passes or greater, 20 passes or greater, 25 passes or greater or 30 passes or greater where the passes are in cross flow during heat exchange, but the syngas flows in a generally cross flow or counter-flow direction relative to the flows on the reactant feed plate 525. Syngas plate 650 also has air stream penetrations 655, combustion air stream penetration 656, fuel stream penetration 657, fuel/air mixture penetration 663, gaseous hydrocarbon stream penetrations 658, water stream penetrations 659 and syngas stream penetrations 660.

Referring to FIG. 6C, reactant feed plate 625 has air stream penetrations 621, combustion air stream penetration 622, fuel stream penetration 623, fuel/air mixture penetration 662, gaseous hydrocarbon stream penetrations 624, water stream penetrations 626 and syngas stream penetrations 646. Reactant feed plate 625 includes air flow path 627 with air inlets 628 and air outlets 629, combustion air flow path 630 with combustion air inlets 631, fuel flow path 632 with fuel inlets 633 and fuel/air mixture outlets 634 and gaseous hydrocarbon flow path 635 with gaseous hydrocarbon inlets 636 and gaseous hydrocarbon outlets 637. Each of flow paths 627, 630, 632 and 635 may comprise one or multiple independent flow channels 638, 639, 640 and 641 respectively. In general, each of independent flow channels 638, 639, 640 and 641 and adjacent ridges may be sized to provide for safe pressure containment and a cost effective combination of heat transfer capacity and pressure drop. Though a specific number of independent flow channels 638, 639, 640 and 641 are shown in FIG. 6, it should be understood each of flow paths 627, 630, 632 and 635 may comprise any suitable number of independent flow channels configured appropriately according to the individual needs of the system.

Though FIG. 6C shows each of flow paths 627, 630, 632 and 635 as being cross flow and/or single pass, in some embodiments one or more of flow paths 627, 630, 632 and 635 may comprise multiple passes, such as from 2 to 20 passes, from 2 to 10 passes or from 2 to 5 passes. Preferably, flow paths 627, 630, 632 and 635 are cross flow and/or single pass flow paths. In FIG. 6C, combustion air flow path 630 is configured to provide for mixing the combustion air stream 114 of FIG. 5, with fuel feed stream 105 inside exchanger 510 by directing air flowing through flow path 630 and fuel flowing in flow path 632 to the same penetration, fuel/air mixture penetration 662. When configured in this manner, there is no separate joining of these streams downstream of syngas heat recovery heat exchanger 510 as is depicted in FIG. 5.

Reactant feed plate 625 also includes a water stream flow path 642 which connects water stream inlets 643 and water stream outlets 644 as shown in the lower left portion of the reactant feed plate 625 in FIG. 6C. Water stream flow path 642 may comprise one or multiple independent flow channels 645. This portion of reactant feed plate 625, when formed into a heat exchanger corresponds to the water flow streams for heat exchanger 109 as indicated in FIG. 5. Flow channels 645 may be sized to provide appropriate water supply at the desired pressure and temperature to the rest of the reformer system 500. Though one independent flow channel 645 is shown in FIG. 6C, it should be understood that flow path 642 may comprise any suitable number of independent flow channels configured appropriately according to the individual needs of the system.

Though FIG. 6C shows flow path 642 configured as a multi-loop or multi-pass counter-flow flow path, it may also be cross flow, co-flow, and/or single pass. In some embodiments flow path 642 may comprise more than one pass, each pass comprising a single reversal in flow direction, such as from 2 to 100 passes, 5 to 75 passes, 10 to 60 passes, 15 to 50 passes or 20 to 40 passes. Preferably, water stream flow path 642 comprises a multi-pass flow path having 5 passes or greater, 10 passes or greater, 15 passes or greater, 20 passes or greater, 25 passes or greater or 30 passes or greater where the passes are in cross flow during heat exchange, but the water flows in a generally cross flow or counter-flow direction relative to the flow of the syngas on syngas plate 650.

When stacked and diffusion bonded or otherwise bonded to form a heat exchanger, the various bounding plates 610, reactant feed plates 625 and syngas plates 650 are preferably aligned such that each of the various air stream penetrations 615, 621 and 655, combustion air stream penetrations 616, 622 and 656, fuel stream penetrations 617, 623 and 657, fuel/air mixture penetrations 661, 662 and 663, gaseous hydrocarbon stream penetrations 618, 624 and 658, water stream penetrations 619, 626 and 659 and syngas stream penetrations 620, 627 and 660 form flow access paths or chambers for connection of each of the various streams to the appropriate inlets and outlets for the various flow paths. The plates may be stacked in order as described with respect to FIG. 2 and may comprise the same number of cells and configuration as described with respect to FIG. 2. In addition to aligning the various penetrations, the stacking of the plates preferably places the independent channels 638, 639, 640 and 641 making up flow paths 627, 630, 632 and 635 in close proximity to the independent channels 612 and 654 making up flow paths 611 and 653 to facilitate heat transfer between the relevant streams through the walls of the respective independent channels.

Figure 7:
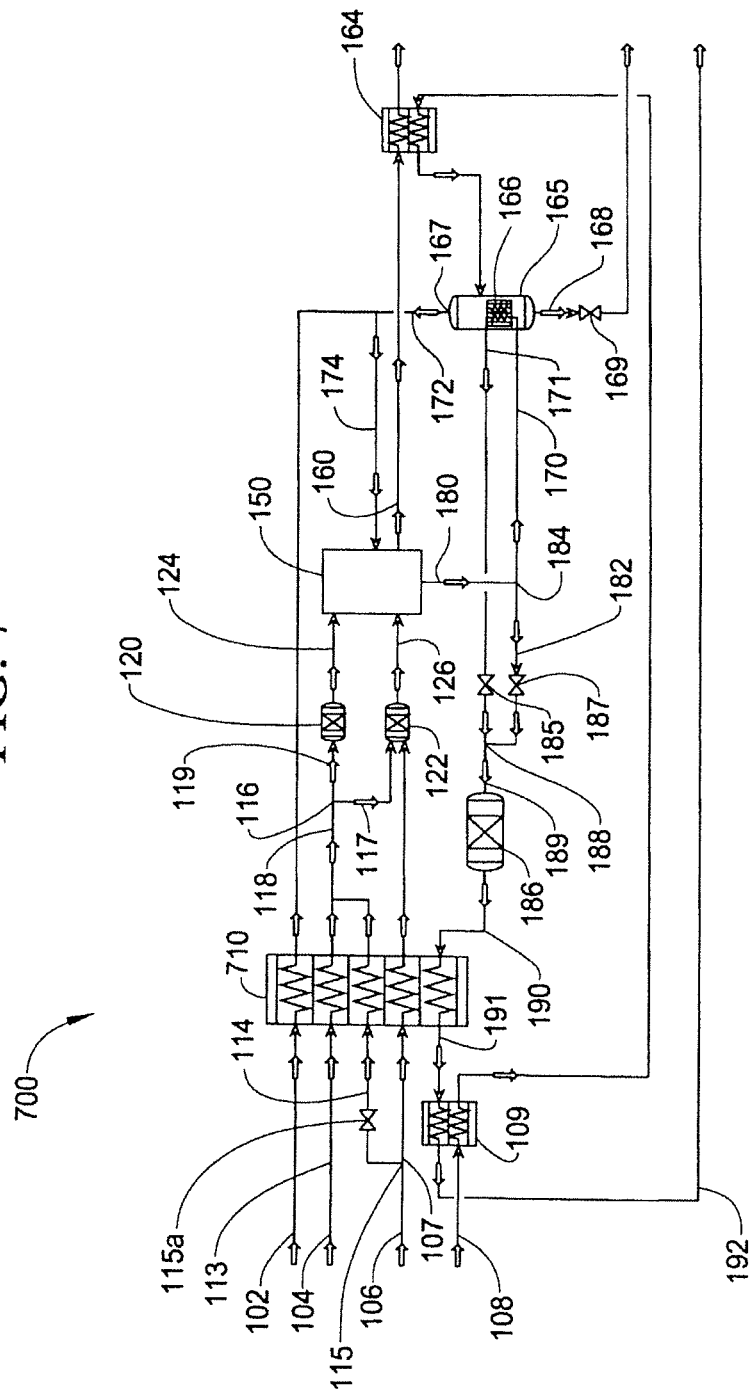
FIG. 7 shows a schematic of an alternate embodiment of a reforming system.

An example of another alternative configuration for the steam reforming apparatus is shown in FIG. 7. As shown, steam reforming apparatus 700 is substantially the same as apparatus 100 described with respect to FIG. 1A and/or FIG. 1B, with the exceptions that in steam reforming apparatus 700, the flue gas stream 160 is not pre-heated prior to entering heat exchanger 164. Accordingly, relative to FIG. 1A, fuel feed stream 104 is not split, there is no flue gas fuel stream 114 and flue gas pre-heater 175 has also been removed. As a result, syngas heat recovery heat exchanger 710 may be configured as discussed above with respect to FIG. 6A-C. The configuration in FIG. 7 is intended for situations where the reformer is operated at elevated temperatures relative to the system of FIG. 1A. In such situations, syngas stream 180 and flue gas stream 160 leave the reforming stages at temperatures approaching 1000° C. At this higher temperature, the additional steam raised with the assistance of combustion chamber 175 of FIG. 1A or 5 is not required, as reforming at a higher temperature provides higher methane conversion, for a given steam-to-carbon ratio and the additional heat recovered from the syngas stream 180 and the flue gas stream 160 is sufficient to raise the necessary steam for reforming at the elevated temperature.

Figure 8:
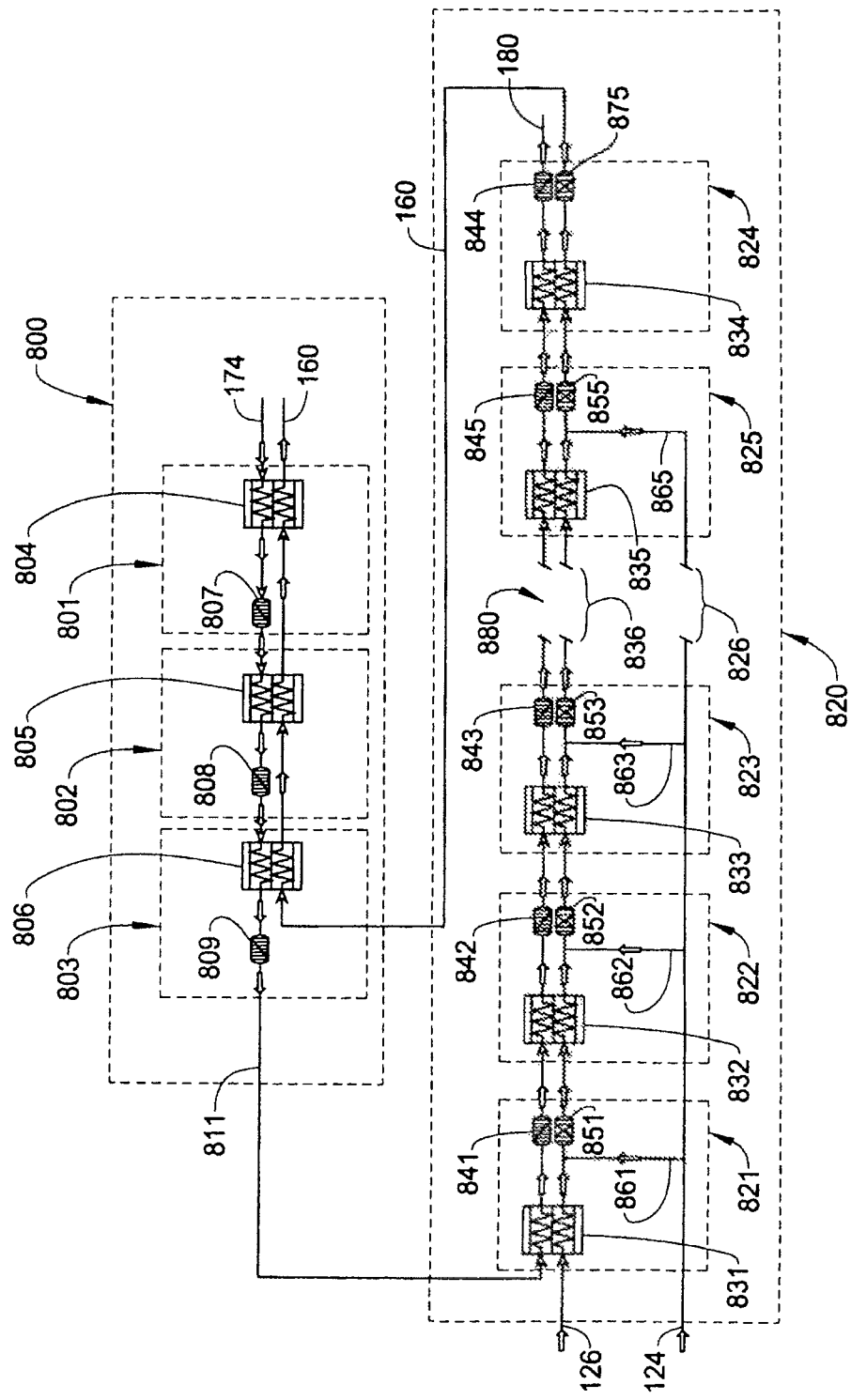
FIG. 8 shows a schematic for an embodiment of reformer module 150 as identified in FIG. 1A, FIG. 5 and FIG. 7 including a reformer and pre-reformer.

Referring to FIGS. 1A, 5 and 7, each of reforming apparatuses 100, 500 and 700 include a reformer module 150. Reformer module 150 reforms gaseous hydrocarbon-steam stream 174 to form syngas stream 180 and flue gas stream 160. During the reforming process, reforming fuel stream 124 is combusted in the presence of reforming air stream 126 to provide additional heat to the reforming process. An example of an embodiment of a reformer module 150 is shown in FIG. 8. As shown in FIG. 8, in some embodiments reformer module 150 may comprise a pre-reformer 800 and a reformer 820. Pre-reformer 800 may comprise multiple stages 801, 802 and 803 of heat exchange between the gaseous hydrocarbon-steam stream 174 and the flue gas stream 160 in heat exchangers 804, 805 and 806 followed by partial catalytic reforming of the gaseous hydrocarbon-steam stream 174 in catalytic reforming chambers or beds 807, 808 and 809. Though the embodiment in FIG. 8 shows three pre-reforming stages 801-803, the number of pre-reforming stages may be varied from 1 to 10 depending on the requirements of the system. Preferably, metal dusting and coking conditions are avoided throughout the pre-reforming stages. In operation, pre-reformer 800 includes multiple iterations or stages of heating gaseous hydrocarbon-steam stream 174 by recovering heat from flue gas stream 160 followed by partial catalytic reforming of the heated gaseous hydrocarbon-steam stream.

In some embodiments, pre-reformer 800 comprise a PCR that is constructed from a series of plates as shown in FIG. 9A-E that have been stacked and diffusion bonded or otherwise bonded to form a PCR. Such a PCR may be configured similar to a PCHE, with catalyst chambers or beds provided intermittently within the flow path of the gaseous hydrocarbon-steam stream 174 such that the stream may be alternately heated by flue gas stream 160 and then partially reformed catalytically. The PCR may be constructed from a series of plates that may be combined into a stack and diffusion bonded to one another to provide heat exchange between the hot and cold streams by placing the channels that make up the flow paths in close proximity to one another and to provide catalytic reforming of the gaseous hydrocarbon-steam stream 174. The stacking may include stacking of end plates, bounding plates and specific configurations of gaseous hydrocarbon-steam and flue gas plates according to the desired heat transfer. In general the flow paths for each of the streams may be formed as channels in the plates by etching, milling or other suitable process and may be configured to provide for the desired heat exchange, while limiting pressure drop for one or more streams across the PCR. The channels on each plate may be configured for single or multiple pass heat transfer between the streams, and may be configured to operate in co-flow, cross-flow or counter-flow. In some embodiments, the plates for one of the streams may be configured for multiple passes, while the plates for the other stream are configured for single passes. Preferably, the streams entering and leaving the PCR are maintained at temperature, pressure and composition conditions that avoid or reduce metal dusting conditions within the PCR. The embodiment shown in FIG. 9A-E comprises three stages of pre-reforming.

Referring to FIG. 9A-E, in some embodiments, the PCR may comprise one or more bounding plates 910, one or more flue gas plates 920, one or more gaseous hydrocarbon-steam plates 950, one or more top end plates 970 and one or more bottom end plates 980. For those plates and streams that do not have penetrations through which the flow paths and flow channels are accessed, headers may be attached, such as welded, over the individual channel ends at the end of the stacked plates to facilitate delivery and/or collection of the stream flowing through the relevant channels. In some embodiments, such a header may comprise a portion of pipe or tubing that has been opened on one side to provide for flow of the individual channels directly into the pipe or tubing. FIG. 9A-E each include insulating cutouts A and FIG. 9C also includes insulating penetrations B. Insulating cutouts A span the entire height of the stack of the PCR when the plates are stacked and formed into a PCR and serve to control heat flow and prevent the undesirable flow of heat from the hot portions of streams on a plates to cool portions of the same streams on the same plate via conduction along the plates by providing a region of reduced heat transfer between the streams. Insulating penetrations 9B serve the same purpose but are only present on the gaseous hydrocarbon steam plates 950 and do not span the height of the entire stack.

Figure 9A:
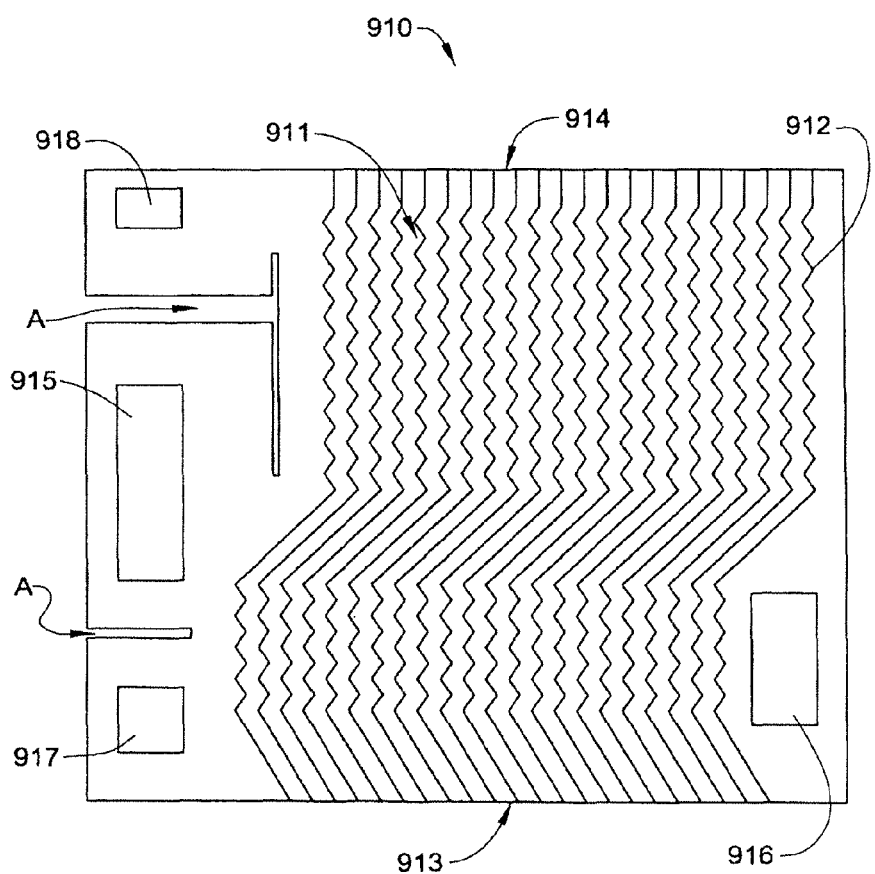
FIG. 9A-E show schematics of plates that may be used to form an embodiment of a pre-reformer.

FIG. 9A shows a bounding plate 910 having a flue gas flow path 911 comprising multiple independent flow channels 912 connecting flue gas inlets 913 with flue gas outlets 914. Bounding plate 910 also includes reforming chamber or bed penetrations 915, 916 and 917 and gaseous hydrocarbon stream penetration 918. Bounding plate 910 helps serve to balance the heat loads and heat flux throughout the stack when formed into a heat exchanger.

Figure 9B:
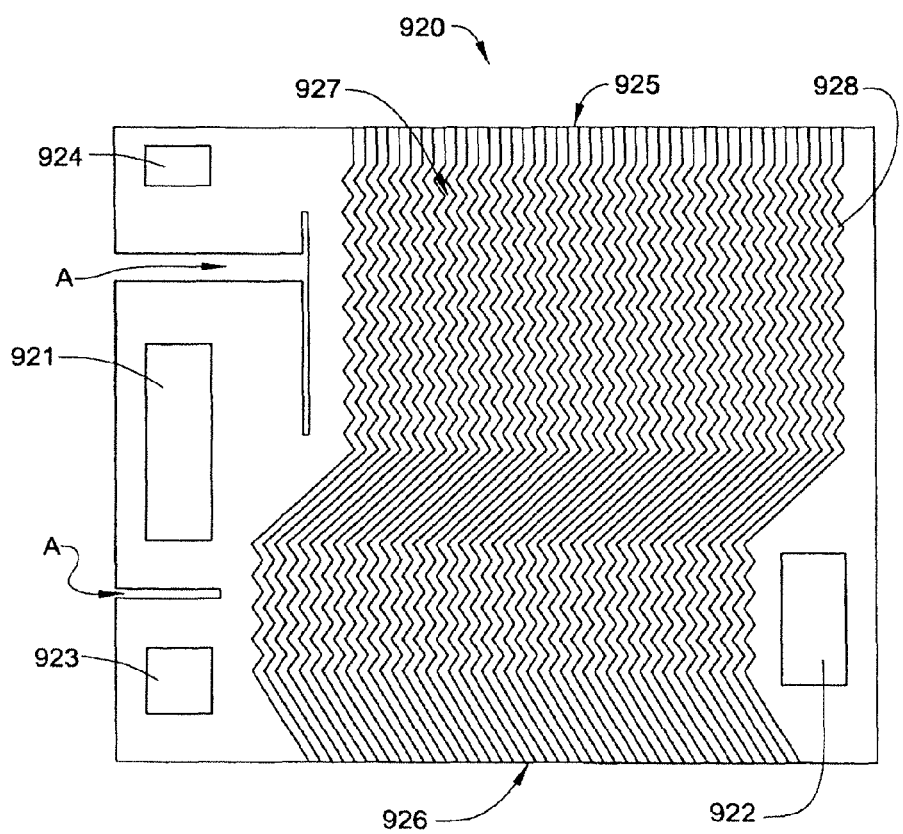

Referring to FIG. 9B, flue gas plate 920 includes reforming chamber or bed penetrations 921, 922 and 923 and gaseous hydrocarbon stream penetration 924. Flue gas plate 920 also includes flue gas flow path 927 with flue gas inlets 926 and flue gas outlets 925. Flow path 927 may comprise one or multiple independent flow channels 928. Though a specific number of independent flow channels 928, are shown in FIG. 9B, it should be understood that flow path 927 may comprise any suitable number of independent flow channels configured appropriately according to the individual needs of the system. Furthermore, though FIG. 9B shows flow path 927 as being cross flow or single pass, in some embodiments flow path 927 may comprise multiple passes, such as from 2 to 20 passes, from 2 to 10 passes or from 2 to 5 passes. Preferably, flow path 925 is a cross flow or single pass flow path.

Figure 9C:
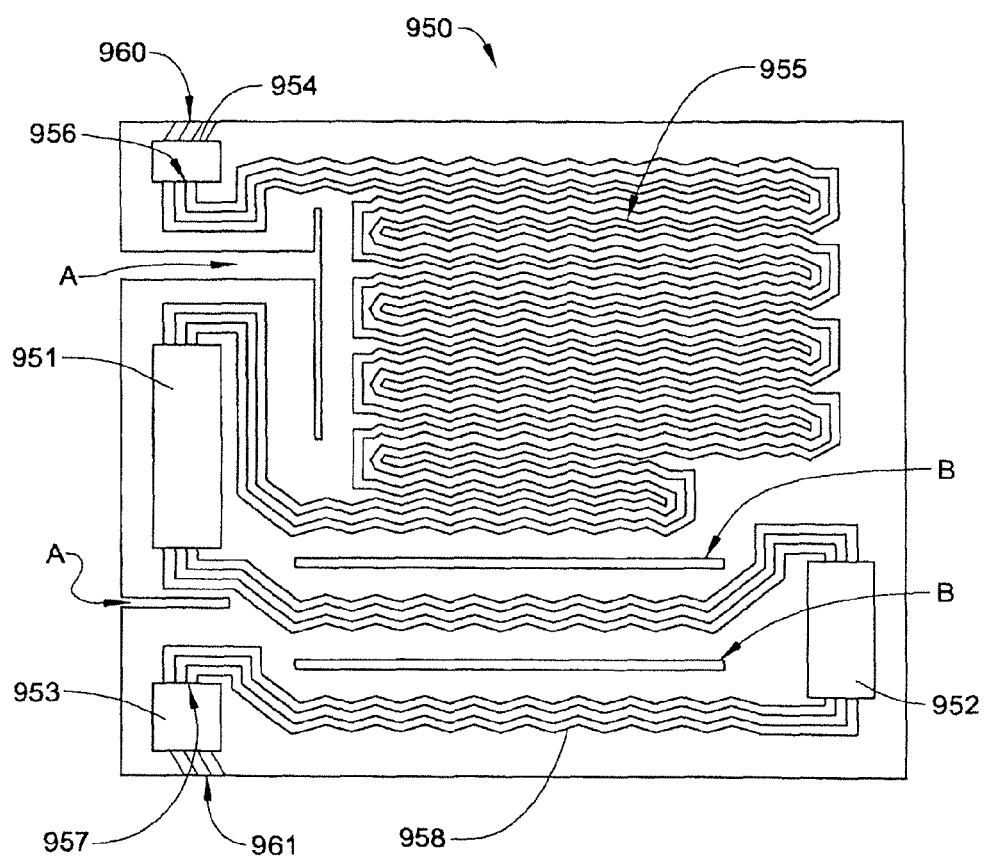

Referring to FIG. 9C, gaseous hydrocarbon-steam plate 950 includes reforming chamber or bed penetrations 951, 952 and 953 and gaseous hydrocarbon stream penetration 954. Gaseous hydrocarbon-steam plate 950 includes gaseous hydrocarbon-steam flow path 955 with gaseous hydrocarbon-steam inlets 956 and reformer stream outlets 957. Flow path 955 may comprise one or multiple independent flow channels 958. Though a specific number of independent flow channels 958, are shown in FIG. 9C, it should be understood that flow path 955 may comprise any suitable number of independent flow channels configured appropriately according to the individual needs of the system. Furthermore, though FIG. 9C shows flow path 955 as being a combination of multiple cross flow passes and single pass cross flow, in some embodiments flow path 955 may comprise multiple flow passes, such as from 2 to 20 passes, from 2 to 10 passes or from 2 to 5 passes and in other embodiments, flow path 955 may comprise single pass cross flow, co-flow or counter flow. Preferably, flow path 955 is a combination of multiple cross flow passes and single pass cross flow during heat exchange, while flowing in a generally counter-flow or cross flow direction relative to flue gas stream 160. In some embodiments, flow path 955 comprises multiple cross flow passes between inlet 956 and the first reforming chamber or bed penetration 951, while flowing in a generally counter-flow direction and single pass cross flow between the first and the second combustion chambers and the second and the third combustions chambers, while still flowing in a generally counter-flow direction.

In some embodiments, FIG. 9C also includes gaseous hydrocarbon-steam channels 960 and reformer stream channels 961. Gaseous hydrocarbon-steam channel 960 may serve to feed the gaseous hydrocarbon-steam stream 174 into the pre-reformer 800 and gaseous hydrocarbon stream penetrations 954 and may be supplied via a header that may be welded or connected over the ends of the individual channels across the stack of plates making up the PCR. Gaseous hydrocarbon-steam penetrations 954, along with the gaseous hydrocarbon-steam stream penetrations on the other plates may form a chamber that may be an empty chamber or that may optionally contain catalyst to promote additional reforming of the gaseous hydrocarbon-steam stream in the pre-reformer 800. In some embodiments, such as embodiments where channels 960 are not included, the chamber formed from the gaseous hydrocarbon-steam stream penetrations may serve as the inlet for the gaseous hydrocarbon-steam stream 174 into the pre-reformer 800 by feeding the stream through a port attached to an endplate that provides access to the chamber. Similarly, reformer stream channels 961 may serve to collect the reformer stream 811 flowing in the individual plates of pre-reformer 800 as stream 174 completes its pre-reforming in the chamber formed by reforming chamber or bed penetrations 917, 923 and 953 and the endplates for feeding to the reformer 820. Channels 961 may feed the stream into a header that may be welded or otherwise connected to the pre-reformer over the ends of the individual channels across the stack of plates making up the PCR. Channels 960 and 961 may be configured and sized the same or differently than channels 958 and there may be the same or a different number of channels 960 and 961 compared to channels 958. Generally channels 960 and 961 may independently have the sizes described in Table 1.

Figure 9D:
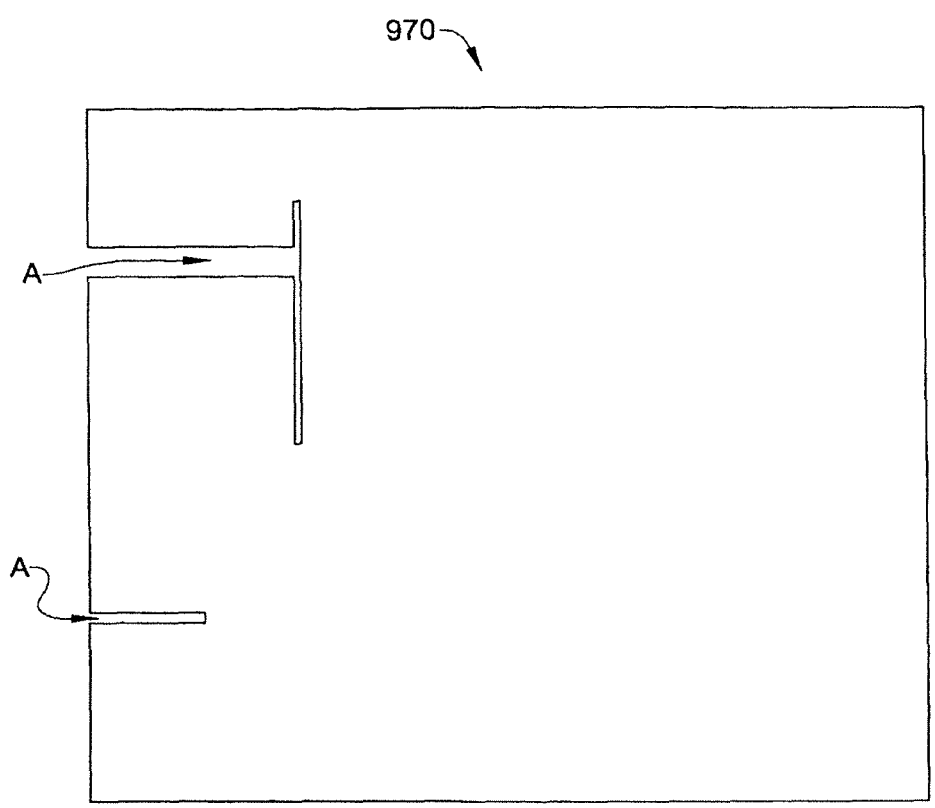
Figure 9E:
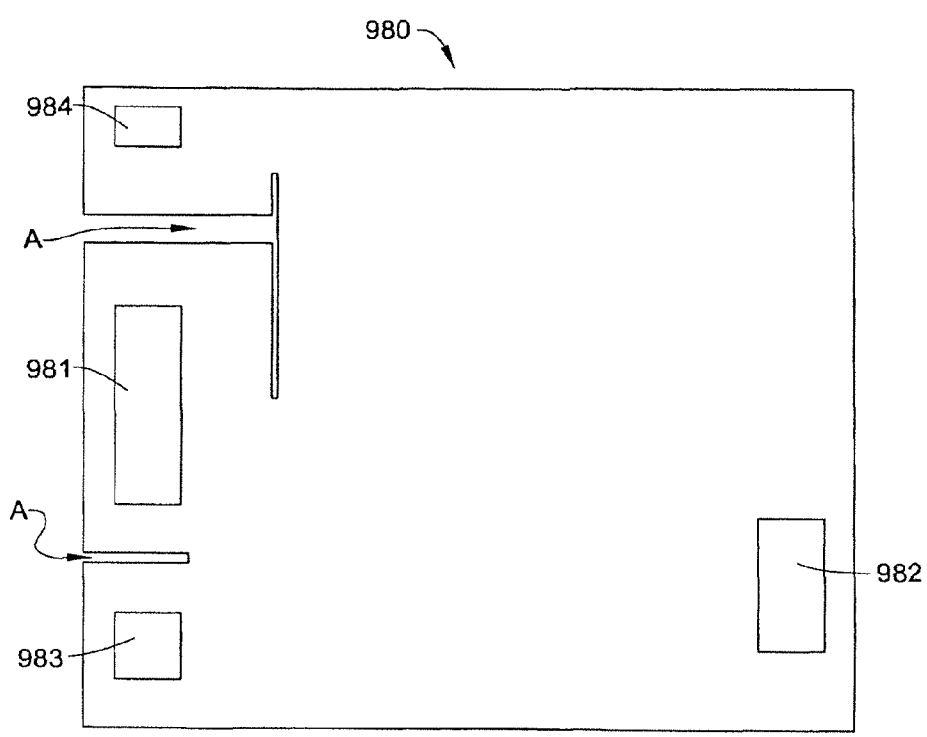

Referring to FIG. 9D, top end plate 970 may be a blank plate or a plate with no flow path circuitry and may be insulated to enhance heat transfer and limit heat loss. In some embodiments, top end plate 970 may include inlets and outlets or ports for entry and exit of the various streams. In some embodiments, multiple top endplates may be used at each end. In some embodiments, a single top endplate 970 is used. In other embodiments, multiple top endplates may be used to provide sufficient thickness for the headers or ports. Similarly, referring to FIG. 9E, bottom end plate 980 may be a blank plate or plates with no flow path circuitry and may be insulated to enhance heat transfer and limit heat loss. In some embodiments, bottom end plate 980 may include inlets and outlets or ports for entry and exit of the various streams, such as penetration 984 as well as access to the catalyst chambers via access ports 981, 982 and 983 formed when the individual plates are stacked. In some embodiments, bottom endplate 980 may not include penetration 984. In some embodiments, multiple bottom endplates may be used. In some embodiments, a single bottom endplate 980 is used. In other embodiments, multiple endplates may be used to provide sufficient thickness for the headers or ports. In some embodiments, the end plates may provide a wall against the bounding plate adjacent to the top end plate, serve as lids to the penetrations and support connection of the relevant streams to PCR 900, such as via ports or headers. Accordingly, the endplates should be thick enough to accommodate the pressures in each of the penetrations and to support the ports or headers.

When stacked and diffusion bonded or otherwise bonded to form a PCR, the various bounding plates 910, flue gas plates 920 and gaseous hydrocarbon-steam plates 950 are preferably aligned such that each of the various reforming chamber or bed penetrations 915, 921 and 951, and 916, 922 and 952, and 917, 923 and 953 are aligned to form reforming chambers or reforming beds, such as reforming chambers or beds 807, 808 and 809. The reforming chambers or beds may be loaded with structured or unstructured catalyst and the reforming reaction may be catalyzed using any suitable catalyst. In addition, the various plates are preferably aligned such that gaseous hydrocarbon stream penetrations 918, 924, 954 and 984 form a flow access path or chamber for the gaseous hydrocarbon-steam stream.

In addition to aligning the reforming chamber or bed penetrations, the stacking of the plates preferably places flow paths 911, 925 and 955 in close proximity to one another to facilitate heat transfer between the relevant streams through the walls of independent channels 912, 928 and 958. In some embodiments, this heat transfer is represented in FIG. 8 as heat exchangers 804, 805 and 806.

Figure 10A:
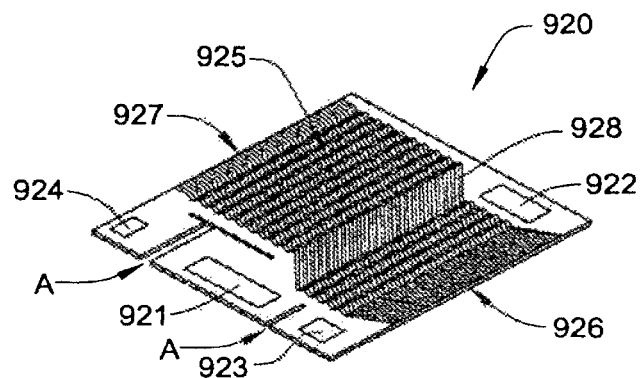
FIG. 10A-B show schematics of plates that may be used to form a cell in a pre-reformer.
Figure 10B:
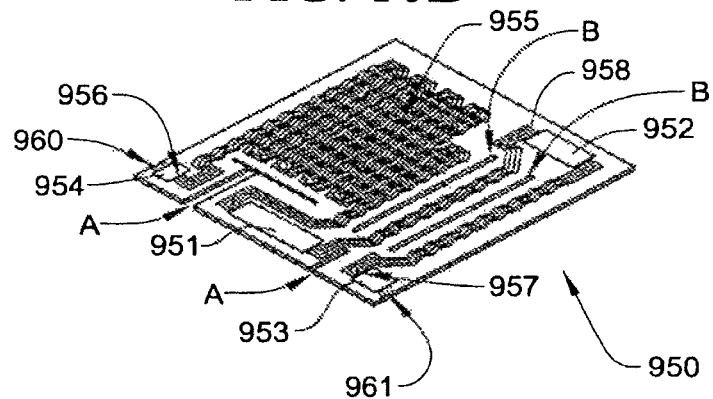

In some embodiments, the plates may be stacked and diffusion bonded or otherwise bonded in any suitable order to form a PCR. In some embodiments, the plates may be stacked in order as follows: at least one top end plate 970, a bounding plate 910, multiple pre-reforming cells, each pre-reforming cell comprising a flue gas plate 920 and a gaseous hydrocarbon plate 950, followed by one more flue gas plate 920, another bounding plate 910 and a bottom endplate 980. Accordingly, the order of printed circuit reactor plates in a given stack may have the following pattern for the active plates (bounding plate 910=B, flue gas plate 920=F, gaseous hydrocarbon plate 950=G): B F G F G F G . . . F G F G F B. A perspective view of a flue gas plate 920 and a gaseous hydrocarbon plate 950, i.e. a pre-reforming cell, is shown in FIG. 10. The end plates may be blank plates with no flow path circuitry and may be insulated to enhance heat transfer and limit heat loss. The end plates may serve as lids to the chambers and flow access paths formed by alignment of the penetrations and support connection of the relevant streams to the PCR, such as via ports or headers in fluid connection with the chambers and flow paths.

Accordingly, the endplates should be thick enough to accommodate the pressures in each of the penetrations and to support the ports or headers. In some embodiments, a single endplate is used for each end of the PCR, where the endplate is thicker than the other plates. In other embodiments, multiple endplates may be used at each end to provide sufficient thickness to support or provide for the headers or ports.

In one specific embodiment for reforming 2 SCMH of natural gas using PSA off-gas as fuel, the PCR comprises 3 top end plates, followed by a bounding plate 910 followed by 11 reforming cells followed by a flue gas plate 920, followed by a bounding plate 910 and 3 bottom end plates. This configuration results in a stacked pre-reformer 800 that is 49.6 mm tall when using plates having a thickness of 1.60 mm. Preferably the PCR making up pre reformer 800 is constructed from materials suitable to withstand the pressures and temperatures to which pre-reformer 800 is exposed. In some embodiments, the PCR and therefore pre-reformer 800 may be constructed from Alloy 800H or Alloy 617.

The individual plates making up the PCR may independently have the thicknesses described in Table 1. In some embodiments, the plates may each be 1.6 mm thick. In addition each of the independent flow channels 912, 928 and 958 may independently comprise a generally semicircular cross-section and may independently have the dimensions described in Table 1. In some embodiments, each of independent flow channels 912, 928 and 958 may have a semicircular cross-section and may have a width of about 1.99 mm, a depth of about 1.1 mm and about 0.5 mm ridges.

In some embodiments, the PCR may operate as follows: the gaseous hydrocarbon-steam stream 174 may enter the first stage of reforming 801 through gaseous hydrocarbon-steam inlet 956 and the flow access path or chamber formed from alignment of gaseous hydrocarbon-steam penetrations 918, 924, 954 and 984 and end plates 970 and 980 and into gaseous hydrocarbon-steam flow path 955 on gaseous hydrocarbon-steam plates 950. The gaseous hydrocarbon-steam flows through gaseous hydrocarbon-steam inlet 956 into independent flow channels 958 on the gaseous hydrocarbon-steam plates 950 where the stream is heated by flue gas that has entered the PCR on flue gas plates 920 and bounding plates 910 and is flowing in independent flow channels 928 and 912 of flow paths 925 and 911 respectively. In the embodiment in FIG. 9A-E, during this first stage of heat exchange, independent flow channels 958 form a flow path 955 that has multiple passes and is in cross flow during heat exchange relative to the flue gas flowing in single pass flow paths 927 and 911.

After the first stage of heating, the gaseous hydrocarbon-steam flowing in channels 958 is directed to reforming chamber or bed 807 formed from alignment of reforming penetrations 915, 921 and 951 and the endplates and is partially catalytically reformed. This partially reformed stream then enters the second stage of pre-reforming 802 where it is heated by the flue gas stream 160. In this second heating stage, independent flow channels 958 form a flow path 955 that is a single pass flow path flowing in cross flow relative to the flue gas flowing in single pass flow paths 927 and 911.

After the second stage of heating, the partially reformed stream flowing in channels 958 is directed into reforming chamber or bed 808 formed from alignment of reforming penetrations 916, 922 and 952 and the endplates and is partially catalytically reformed. The resulting partially reformed stream then enters the third stage of pre-reforming 803 where it is heated by the flue gas stream 160. In this third heating stage, independent flow channels 958 form a flow path 955 that is a single pass flow path flowing in cross flow relative to the flue gas flowing in single pass flow paths 925 and 911.

After the third stage of heating, the partially reformed stream flowing in channels 958 is directed into reforming chamber or bed 809 formed from alignment of reforming penetrations 917, 923 and 953 and the endplates and is partially catalytically reformed. The stream leaving reforming chamber or bed 809 leaves the pre-reformer 800 as reformer stream 811 and proceeds to the first stage of reforming in reformer 820. The flue gas stream 160 leaves the pre-reformer 800 and is optionally re-heated in a combustion chamber 175 before it provides additional heat to water stream 108 in heat exchanger 164 prior to leaving the reformer system 100.

In some embodiments, gaseous hydrocarbon-steam stream 174 enters pre-reformer 800 at a temperature just below to above the saturated steam temperature such as between 200° C. and 270° C., between 210° C. and 260° C., between 215° C. and 250° C., between 220° C. and 240° C. or between 225° C. and 240° C. and at a pressure of between 10 bara and 100 bara, such as between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara and may leave pre-reformer 800 as reformer stream 811 at a temperature of between 500° C. and 700° C., such as between 510° C. and 675° C., between 520° C. and 650° C., between 530° C. and 625° C., between 550° C. and 600° C. or between 560° C. and 590° C. and at a pressure of between 10 bara and 100 bara, such as between 10 bara and 90 bara, between 10 bara and 75 bara, between 10 bara and 60 bara, between 10 bara and 50 bara, between 10 bara and 40 bara, between 10 bara and 30 bara, between 10 bara and 20 bara, between 10 bara and 18 bara, between 11 bara and 17 bara, between 12 bara and 16 bara, between 13 bara and 15 bara or between 13.5 bara and 14.5 bara.

Flue gas stream 160 may enter pre-reformer 800 at a temperature of between 700° C. and 1050° C., such as between 750° C. and 1000° C., between 800° C. and 950° C., between 825° C. and 925° C., between 850° C. and 900° C. and at a pressure of less than 1 barg, such as less than 0.75 barg, less than 0.50 barg, less than 0.40 barg, less than 0.30 barg, less than 0.20 barg, less than 0.15 barg, less than 0.10 barg, less than 0.075 barg, or less than 0.05 barg and may leave pre-reformer 800 at a temperature of between 500° C. and 650° C., such as between 510° C. and 625° C., between 520° C. and 600° C. or between 530° C. and 575° C. and at a pressure of less than 1 barg, such as less than 0.75 barg, less than 0.50 barg, less than 0.40 barg, less than 0.30 barg, less than 0.20 barg, less than 0.15 barg, less than 0.10 barg, less than 0.075 barg, or less than 0.05 barg.

Referring to FIG. 8, after leaving pre-reformer 800, reformer stream 811 enters reformer 820. As shown in FIG. 8, reformer 820 comprises multiple reforming stages, such as 821, 822, 823, 824 and 825 and stages represented by the break 880 which is intended to represent any suitable number of stages configured essentially the same as stages 821-825 as described below, each stage including heat exchange from reformer air stream 126 into reformer stream 811 in heat exchangers 831, 832, 833, 834 and 835 followed by catalytic reforming of reformer stream 811 in reformers

841, 842, 843, 844 and 845 and reheating of reformer air stream 126 by catalytic combustion of a portion of reformer fuel stream 124 in combustion chambers 851, 852, 853 and 855. Reformer fuel stream 124 may be supplied in parallel to the individual stages via a fuel distribution network comprising reforming fuel stream 124 and reforming stage fuel streams 861, 862, 863 and 865. Though FIG. 8 shows five complete stages 821, 822, 823, 824 and 825, it should be understood that any suitable number of reforming stages may be used, such as from 1-40 reforming stages, such as from 2 to 35 stages, from 3 to 30 stages, from 5 to 25 stages, from 8 to 20 stages or from 10 to 15 reforming stages as represented by the break at 880. It should also be noted that the latter stages of reforming may not require reheating of the reformer air stream 126 to provide adequate heat for the catalytic reforming and thus one or more of the latter stages may not include the step of reheating of the reformer air stream 126, may not include combustion chambers or may not have catalyst in their combustion chambers and/or may not include a reforming stage fuel stream. In some embodiments, the last stage of reforming does not include reheating of the reformer air stream 126. For example, though reforming stage 824 shows a combustion chamber 875, it does not include a fuel supply and thus combustion chamber 875 may not include catalyst and additional combustion may not occur therein. Alternatively, combustion chamber 875 may include catalyst and may combust any combustible components remaining in reformer air stream 126. Preferably, metal dusting and coking conditions are avoided throughout the reforming stages.

In some embodiments, reformer 820 comprises a PCR. The PCR may be configured similar to a printed circuit heat exchanger ("PCHE"), with reforming catalyst chambers or beds provided intermittently within the flow path of the reformer stream 811 and combustion catalyst chambers provided intermittently within the flow paths for the reformer air stream 126 and the reformer fuel stream 124 such that the reformer stream 811 may be alternately heated by the reformer air stream 126 and then partially reformed catalytically while the reformer air stream 126 alternately heats the reformer stream 811 and is re-heated by combustion of a portion of the reformer fuel stream 124. The PCR may be constructed from a series of plates that may be combined into a stack and diffusion bonded to one another to provide heat exchange between the hot and cold streams by placing the channels that make up the flow paths in close proximity to one another and to provide catalytic reforming of the reformer stream 811 and catalytic combustion of a portion of the reforming fuel stream 124 in the presence of reforming air stream 126. The stacking may include stacking of end plates, bounding plates and specific configurations of reformer stream plates, reforming air plates and reforming fuel plates.

In general the flow paths for each of the streams may be formed as channels in the plates by etching, milling or other suitable process and may be configured to provide for the desired heat exchange, while controlling pressure drops for one or more of the streams across the PCR. The channels on the reforming stream plates and the reforming air stream plates may be configured for single or multiple pass heat transfer between the streams, and may be configured to operate in co-flow, cross-flow or counter-flow. In some embodiments, the plates for one of the reforming streams or reforming air streams may be configured for multiple passes, while the plates for the other stream are configured for single passes. Preferably, the streams entering and leaving the PCR are maintained at temperature, pressure and composition conditions that avoid or reduce metal dusting conditions and coking conditions within the PCR.

An example of the plates that make up an embodiment of such a PCR may be found in FIGS. 11A-F. The embodiments shown in FIGS. 11A-F comprise 14 stages of reforming, but it should be understood that any suitable number of stages may be used with appropriate modification to the various plates shown. Referring to FIGS. 11A-F, the PCR may comprise one or more bounding plates 1101, one or more reformer plates 1121, one or more reformer air plates 1141, one or more reformer fuel plates 1161, one or more top endplates 1180 and one or more bottom endplates 1190.

Figure 11A:
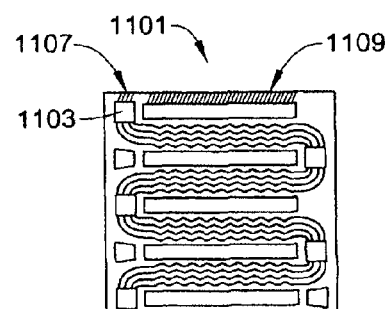
Figure 11A:
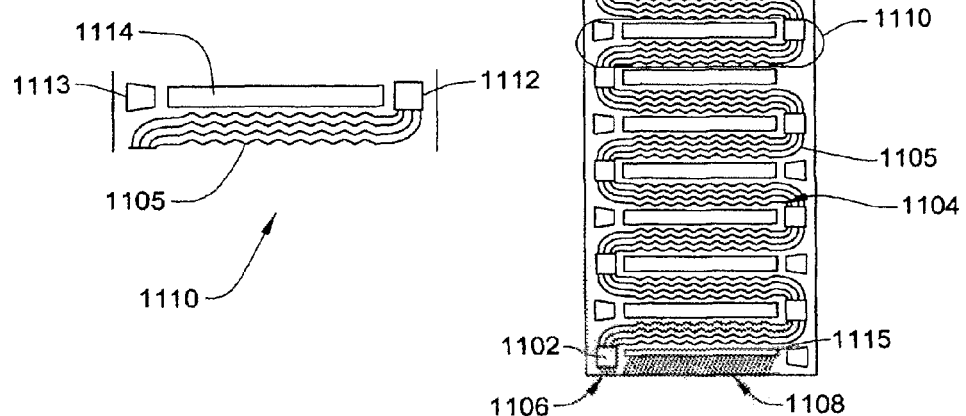

Referring to FIG. 11A, bounding plate 1101 includes reformer stream inlet chamber penetration 1102 and reformer stream outlet chamber penetration 1103, which may also be the last reforming chamber or bed penetration, and a flow path 1104 comprising multiple independent flow channels 1105. In general, bounding plate 1101 will have fewer independent flow channels 1105 than the number of independent flow channels on reformer plate 1121. In some embodiments, bounding plate 1101 has half the number of independent flow channels as reformer plate 1121. As shown in the expanded view of bounding plate 1101 in FIG. 11AA, an example of a single stage of reforming 1110 of the 14 stages included on bounding plate 1101 includes a reforming chamber or bed penetration 1112, a combustion chamber penetration 1114 and a fuel supply penetration 1113. Bounding plate 1101 helps serve to balance the heat loads and heat flux throughout the stack when formed into a heat exchanger.

Though FIG. 11AA shows reformer chamber penetration 1112 on the right hand sided of bounding plate 1101, it should be understood that the reformer chamber penetrations for the stages of reforming alternate sides along the bounding plate 1101 with fuel supply penetrations 1113 from the first or inlet penetrations 1102 to the last or outlet penetrations 1103 and may be started on either side of bounding plate 1101. Accordingly, the stages immediately before and after stage 1110 would have the reforming chamber or bed penetrations 1112 on the left hand side of bounding plate 1101 and the fuel supply penetrations 1113 on the right hand side of bounding plate 1101. In some embodiments, the stages may be configured differently as suitable for the intended use and the embodiments of the process and apparatus described herein should not be understood to be limited to alternating of the various penetrations. For example, where the heat exchange includes one or more passes, the configuration may change to accommodate these passes.

In operation a portion of the reformer stream 811 flows through independent channels 1105 where it recovers heat from the heated reformer air stream 126 flowing in independent channels 1145 shown in FIG. 11C and FIG. 11 CC and then proceeds to reformer chamber penetration 1112. Reformer chamber penetrations 1112 (including penetrations 1102 and 1103) combine with the corresponding reformer chamber penetrations 1132 (including penetrations 1122 and 1123), 1152, 1172 and 1192 on the plates in FIGS. 11B-D and F respectively, to form reformer chambers, such as reformer chambers 841, 842, 843, 844 and 845 shown in FIG. 8, where reformer stream 811 is partially catalytically reformed. In some embodiments, the chamber formed by inlet penetrations 1102 along with the corresponding penetrations on the other plates may be aligned to form a blank or empty chamber that does not include catalyst and does not reform reformer stream 811. After being partially reformed reformer stream 811 leaves the reformer chamber and recovers heat in the next stage of reforming, until leaving the last stage of reforming via reformer stream outlet penetrations 1103, at which point the reformed stream is combined with the reformed stream leaving the last stage of reforming on reformer plate 1121 to form syngas stream 180.

Figure 11B:
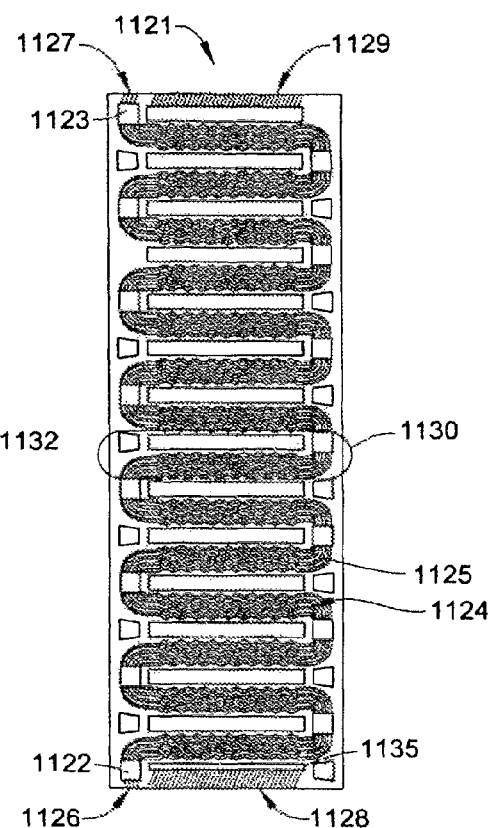
Figure 11B:
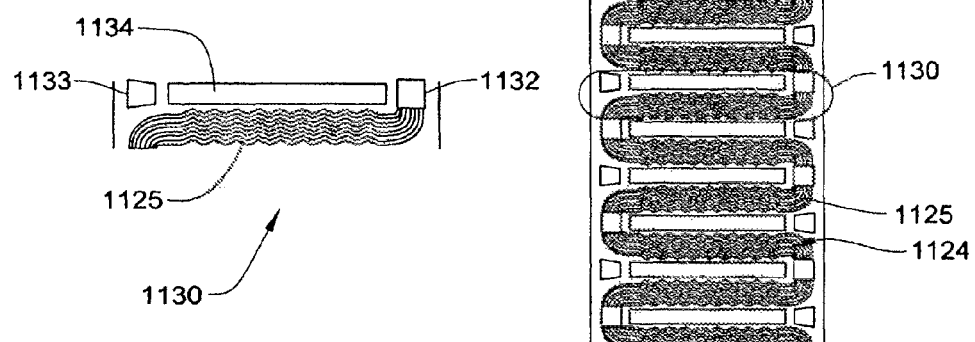

FIG. 11B shows reformer plate 1121 having reformer stream inlet penetration 1122, and reformer stream outlet chamber penetration 1123, which may also be the last reforming chamber or bed penetration, and a flow path 1124 that comprises multiple independent channels 1125. As shown in the expanded view of reformer plate 1121 in FIG. 11BB, an example of a single stage of reforming 1130 of the 14 stages included on reformer plate 1121 includes a reforming chamber or bed penetration 1132, a combustion chamber penetration 1134 and a fuel supply penetration 1133. Though FIG. 11BB shows reformer chamber penetration 1132 on the right hand sided of reformer plate 1121, it should be understood that the reformer chamber penetrations for the stages of reforming alternate sides along the reformer plate 1121 with fuel supply penetrations 1133 from the inlet penetrations 1122 to the outlet penetrations 1123 and may be started on either side of reformer plate 1121. Accordingly, the stages immediately before and after stage 1130 would have the reforming chamber or bed penetrations 1132 on the left hand side of reformer plate 1121 and the fuel supply penetrations 1133 on the right hand side of reformer plate 1121. In some embodiments, the stages may be configured differently as suitable for the intended use and the embodiments of the process and apparatus described herein should not be understood to be limited to alternating of the various penetrations. For example, where the heat exchange includes one or more passes, the configuration may change to accommodate these passes.

In operation a portion of the reformer stream 811 flows through independent channels 1125 where it recovers heat from the heated reformer air stream 126 flowing in independent channels 1145 shown in FIG. 11C and FIG. 11CC and then proceeds to reformer chamber penetration 1132. Reformer chamber penetrations 1132 (including penetrations 1122 and 1123) combine with the corresponding reformer chamber penetrations 1112 (including penetrations 1102 and 1103), 1152, 1172 and 1192 on the plates in FIGS. 11A, C-D and F to form reformer chambers, such as reformer chambers 841, 842, 843, 844 and 845 shown in FIG. 8, where reformer stream 811 is partially catalytically reformed. In some embodiments, the chamber formed by inlet penetrations 1122 along with the corresponding penetrations on the other plates may be aligned to form a blank or empty chamber that does not include catalyst and does not reform reformer stream 811. After being partially reformed, the reformer stream 811 leaves the reformer chamber and recovers heat in the next stage of reforming, until leaving the last stage of reforming and into reformer stream outlet penetrations 1123, at which point the reformed stream is combined with the reformed stream leaving the last stage of reforming on reformer plate 1101 to form syngas stream 180.

In some embodiments, FIG. 11A-B also include reformer stream inlet channels 1106 and 1126 and reformer stream outlet channels 1107 and 1127. Reformer stream inlet channels 1106 and 1126 may serve to feed the reformer stream 811 into the reformer 820 and inlet penetrations 1102 and 1122 and may be supplied via a header that may be welded or connected over the ends of the individual channels across the stack of plates making up the PCR. Inlet penetrations 1102 and 1122, along with the corresponding penetrations on the other plates may form a chamber that may be an empty chamber or that may optionally contain catalyst to promote additional reforming of the reformer stream in reformer 820. In some embodiments, such as embodiments where channels 1106 and 1126 are not included, the chamber formed from the inlet penetrations may serve as the inlet for the reformer stream 811 into the pre-reformer 800 by feeding the stream through a port attached to an endplate that provides access to the chamber. Similarly, reformer stream outlet channels 1107 and 1127 may serve to collect the syngas stream 180 flowing in the individual plates of reformer 820 as stream 811 completes its reforming in the chamber formed by reforming chamber or bed penetrations 1103 and 1123 and the corresponding penetrations on the other plates and the endplates. Channels 1107 and 1127 may feed stream 180 into a header that may be welded or otherwise connected to the pre-reformer over the ends of the individual channels across the stack of plates making up the PCR. Channels 1106, 1107, 1126 and 1127 may be configured and sized the same or differently than channels 1105 and 1125 and there may be the same or a different number of channels 1106, 1107, 1126 and 1127 compared to channels 1105 and 1125. Generally channels 1106, 1107, 1126 and 1127 may independently have the sizes described in Table 1.

FIG. 11C shows a reformer air plate 1141, having reformer air inlets 1142 and reformer air outlets 1143 and a flow path 1144 that comprises multiple independent channels 1145. As shown in the expanded view of reformer air plate 1141, FIG. 11CC, an example of a single stage of reforming 1150 of the 14 stages included on reformer air plate 1141 includes a reformer chamber or bed penetration 1152, a combustion chamber penetration 1154 and a fuel supply penetration 1153. Though FIG. 11CC shows reformer chamber penetration 1152 on the right hand sided of reformer air plate 1141, it should be understood that the reformer chamber penetrations for the stages of reforming alternate sides along the reformer air plate 1141 with fuel supply penetrations 1153 from the inlets 1142 to the outlets 1143 and may be started on either side of reformer air plate 1141. Accordingly, the stages immediately before and after stage 1150 would have the reforming chamber or bed penetrations 1152 on the left hand side of reformer air plate 1141 and the fuel supply penetrations 1153 on the right hand side of reformer air plate 1141. In some embodiments, the stages may be configured differently as suitable for the intended use and the embodiments of the process and apparatus described herein should not be understood to be limited to alternating of the various penetrations. For example, where the heat exchange includes one or more passes, the configuration may change to accommodate these passes.

In operation, reformer air stream 126 flows through independent channels 1145 which may provide heat to a portion of reformer stream 811 flowing in independent channels 1105 on bounding plate 1101 shown in FIG. 11A and a portion of reformer stream 811 flowing in independent channels 1125 shown in FIG. 11B through the walls of the independent channels on each plate. Reformer air stream 126 then proceeds to combustion chamber penetration 1154. Combustion chamber penetrations 1154, combine with the corresponding combustion chamber penetrations, 1114, 1134, 1174 and 1194 on the plates in FIGS. 11A-B, D and F to form combustion chambers, such as combustion chambers 851, 852, 853, and 855 shown in FIG. 8, where reformer air stream 126 is reheated by catalytic combustion of fuel from independent channels 1165 on reformer fuel plates 1161. After being reheated, reformer air stream 126 leaves the combustion chamber and heats reformer stream 811 in the next stage of reforming, until leaving the last stage of reforming and into the reforming air penetrations where, with reference to FIG. 8, it leaves reformer module 150 as flue gas stream 160.

Figure 11D:
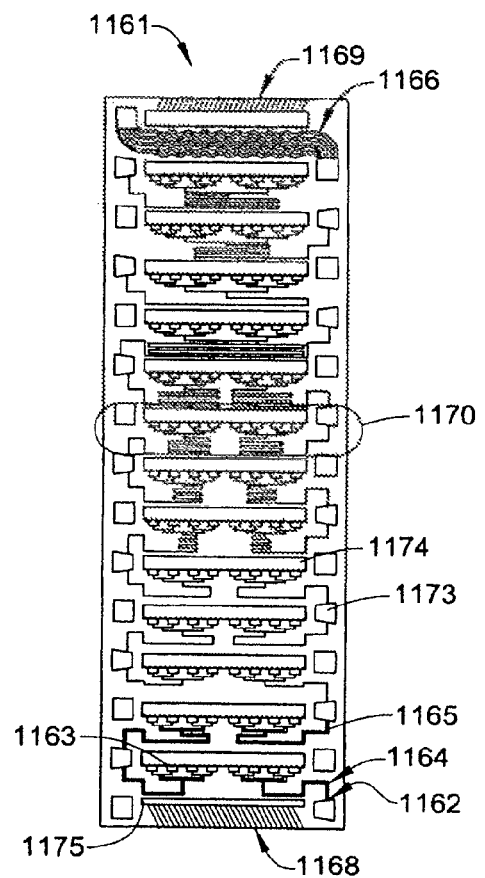
Figure 11D:
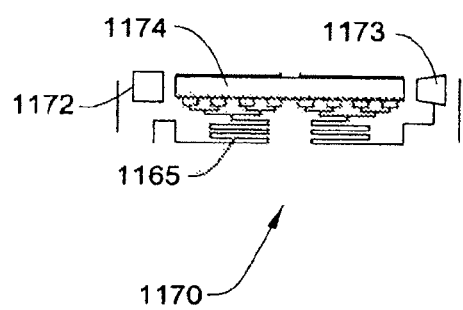
Figure 12A:
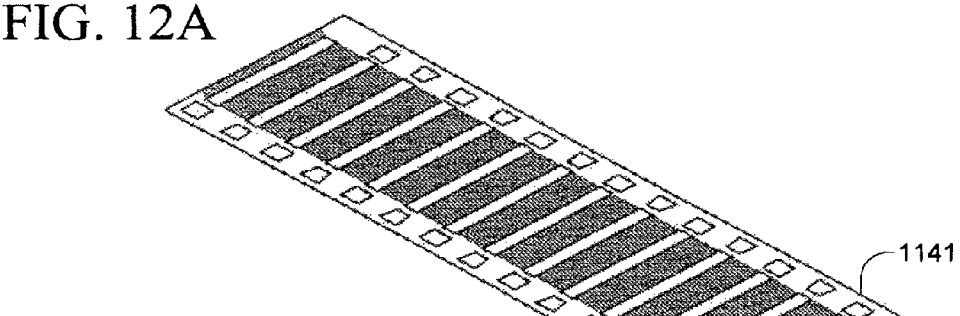
FIG. 12A-D show schematics of plates that may be used to form a cell in a reformer.
Figure 12B:
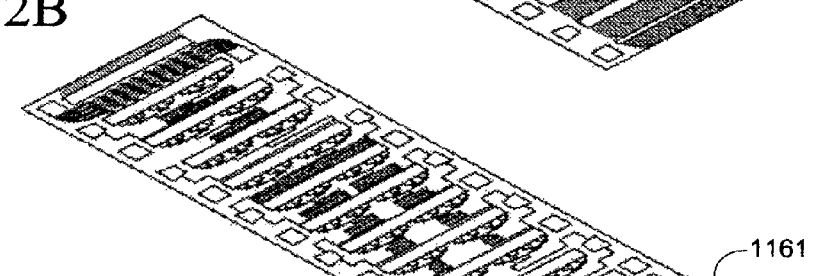
Figure 12C:
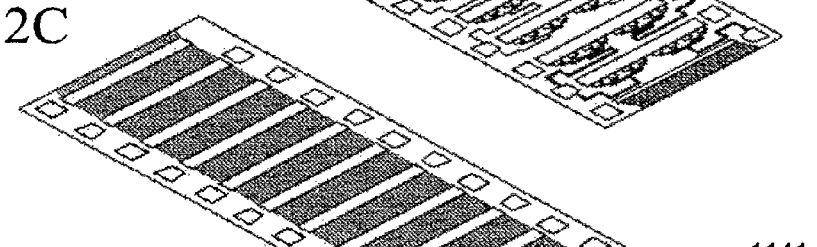
Figure 12D:
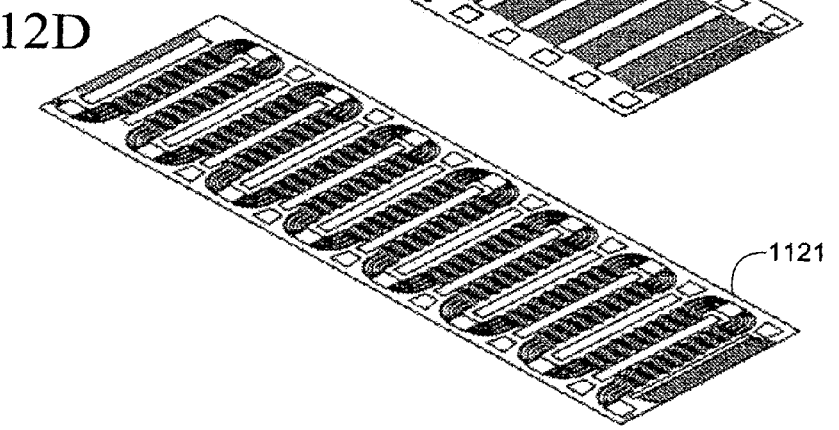

FIG. 11D shows a reformer fuel plate 1161, having reformer fuel inlets 1162, reformer fuel outlets 1163 and flow paths 1164 that comprise one or more independent channels 1165. Unlike the serial flow of the streams flowing in the plates shown in FIG. 11A-C, a portion of reformer fuel stream 124 is supplied individually and independently to each of the stages within the reformer in parallel. Accordingly, each stage of reforming to which fuel is supplied on the reformer fuel plates 1161 has its own reformer fuel inlets 1162, reformer fuel outlets 1163 and flow path 1164. In addition, the amount of reformer fuel stream 124 supplied to each stage may be the same or different from the amount of reformer fuel stream 124 supplied to the other stages. As a result, the reformer fuel inlets 1162, reformer fuel outlets 1163 and flow paths 1164 of each stage may be configured the same or differently relative to the other stages. In some embodiments, the amount of reformer fuel stream 124 supplied to each stage after the first stage may be reduced relative to the preceding stage. Furthermore, one or more of the later stages may not receive any portion of reformer fuel stream 124, as the need to reheat the reformer air stream 126 may be reduced or absent in some of the later stages of reforming. An embodiment of a system in which the amount of reformer fuel stream 124 supplied to each successive reforming stage is reduced is discussed below with respect to FIG. 15.

As shown in FIG. 11D, flow paths 1164 may be configured to passively control the amount of reformer fuel stream 124 supplied to the reforming stages by controlling the size, number and geometry of the independent channels 1165 and the pressure drops throughout the reforming system 100. Multiple reforming fuel outlets 1163 may be used for each stage to more evenly supply the portion of reformer fuel stream 124 to the combustion penetration 1174 of that stage. In addition, for some stages, the portion of reformer fuel stream 124 supplied to the stage may be provided from one or more than one fuel supply penetrations 1173. Accordingly, it should be understood that when referring to a single stage of reforming, a portion of the fuel supplied to that stage may come from a fuel supply penetration 1173 physically associated with a different stage and that the fuel supply penetrations 1173 may be configured to supply fuel to more than one stage. Fuel supply penetrations 1173, combine with the corresponding fuel supply penetrations 1113, 1133, 1153 and 1183 on the plates in FIGS. 11A-C and E to form fuel supply flow access paths or chambers.

As shown in the expanded view of reformer fuel plate 1161 in FIG. 11DD, an example of a single stage of reforming 1170 of the 14 stages included on reformer fuel plate 1161 includes a fuel supply penetration 1173, a combustion chamber penetration 1174 and a reforming chamber or bed penetration 1172. Though the expanded view of reformer fuel plate 1161 shows fuel supply penetration 1173 on the right hand sided of reformer fuel plate 1161, it should be understood that the fuel supply penetrations alternate sides along the reformer fuel plate 1161 with reforming chamber or bed penetrations 1172. Accordingly, the stages immediately before and after stage 1170 would have the fuel supply penetrations 1173 on the left hand side of reformer fuel plate 1161 and the reforming chamber or bed penetrations 1172 on the right hand side of reformer fuel plate 1161. In some embodiments, the stages may be configured differently as suitable for the intended use and the embodiments of the process and apparatus described herein should not be understood to be limited to alternating of the various penetrations.

In operation a portion of reformer fuel stream 124 flows from the fuel supply flow access paths or chambers through the fuel inlets 1162 along flow paths 1164 comprising independent channels 1165, through fuel outlets 1163 and into the combustion chambers 1174 where the portion of fuel from reformer fuel stream 124 is catalytically combusted in the presence of reformer air stream 126, thereby re-heating reformer air stream 126. The byproducts from the combustion of the portion of fuel from reformer fuel stream 124 leave the combustion chamber with reformer air stream 126.

In some embodiments, FIG. 11A-D each include reformer air stream inlet channels 1108, 1128, 1142 and 1168 and reformer air stream outlet channels 1109, 1129, 1143 and 1169. Reformer stream inlet channels 1108, 1128, 1142 and 1168 may serve to feed the reformer air stream 126 into the reformer 820 and reformer air inlet penetrations 1115, 1135, 1155 and 1175 and may be supplied via a header that may be welded or connected over the ends of the individual channels across the stack of plates making up the PCR. Inlet penetrations 1115, 1135, 1155 and 1175 may form a chamber that may be an empty chamber that gathers the reformer air stream for feeding into flow path 1144 comprising channels 1145. Similarly, reformer stream outlet channels 1109, 1129, 1143 and 1169 may serve to feed the flue gas stream 160 flowing in the individual plates of reformer 820 after the final stage of heat exchange and optional combustion to the piping or tubing feeding the flue gas stream to the pre-reformer 800. Channels 1109, 1129, 1143 and 1169 may feed stream 160 into a header that may be welded or otherwise connected to the pre-reformer over the ends of the individual channels across the stack of plates making up the PCR. Reformer air stream inlet channels 1108, 1128, 1142 and 1168 and reformer air stream outlet channels 1109, 1129, 1143 and 1169 may be configured and sized the same or differently than channels 1145 and there may be the same or a different number of reformer air stream inlet channels 1108, 1128, 1142 and 1168 and reformer air stream outlet channels 1109, 1129, 1143 and 1169 compared to channels 1145. Generally reformer air stream inlet channels 1108, 1128, 1142 and 1168 and reformer air stream outlet channels 1109, 1129, 1143 and 1169 may independently have the sizes described in Table 1. By configuring the feed of the reformer air stream 126 in this manner, the pressure drop of the stream across the reformer may be minimized.

FIG. 11E shows an example of a top endplate 1180 having fuel supply penetrations 1183. Top end plate 1180 may be a blank plate or plates with no flow path circuitry and may be insulated to enhance heat transfer and limit heat loss. In some embodiments, a single top endplate 1180 is used. In other embodiments, multiple top endplates 1180 may be used to provide sufficient thickness for the headers or ports that supply the fuel. In some embodiments, a header may be provided that is connected, such as welded, across the length and width of the top plate and that provides for supply of the fuel to each of the fuel supply penetrations. In some embodiments, this supply may be accomplished by providing the fuel to the header, where the header is a single open space that provides access to each of the fuel supply penetrations, which by virtue of their configuration provide the desired pressure drop to achieve the desired passive control of the fuel supply to the combustion chambers in the reformer. Similarly, as shown in FIG. 11F bottom end plate 1190 may be a blank plate or plates with no flow path circuitry and may be insulated to enhance heat transfer and limit heat loss. In some embodiments, bottom end plate 1190 may include inlets and outlets for entry and exit of one or more of the various streams as well as reforming chambers or bed penetrations 1192 and combustion chamber penetrations 1194, which may have access ports connected thereto. In some embodiments, multiple bottom endplates may be used. In some embodiments, a single bottom endplate 1190 is used. In other embodiments, multiple endplates may be used to provide sufficient thickness for headers or ports. In some embodiments, the end plates provide a wall for the passages on the bounding plate facing the end plate, serve as lids to the penetrations and support connection of the relevant streams to the PCR, such as via ports or headers. Accordingly, in some embodiments, the endplates should be thick enough to accommodate the pressures in each of the penetrations and to support the ports or headers. In some embodiments, the various penetrations in the bottom endplates may each be capped with penetration caps, after the plates have been stacked and formed into a reformer. In some embodiments, the penetration caps may comprise any suitable material, including the material from which the plates are formed and may be connected, such as welded or otherwise connected to block, seal or cover the penetrations on the bottom endplates.

When stacked and diffusion bonded or otherwise bonded to form a PCR, the various bounding plates 1101, reformer plates 1121, reformer air plates 1141, reformer fuel plates 1161, tope endplates 1180 and bottom endplates 1190 are preferably aligned such that each of the various reforming chamber or bed penetrations 1112, 1132, 1152, 1172 and 1192 are aligned to form reforming chambers or reforming beds, such as reforming chambers or beds 841, 842, 843, 844 and 845. In addition to aligning the reforming chamber or bed penetrations, the stacking of the plates preferably aligns the fuel supply penetrations 1113, 1133, 1153, 1173 and 1183 to form fuel supply flow access paths or chambers and aligns the combustion chamber penetrations 1114, 1134, 1154, 1174 and 1194 to form combustion chambers, such as combustion chambers 851, 852, 853 and 855. The reforming chambers or beds and the combustion chambers may be loaded with structured or unstructured catalyst and the reforming reaction and the combustion reaction may be catalyzed using any suitable catalyst. For those plates and streams that do not have penetrations through which the flow paths and flow channels are accessed, headers may be attached, such as welded, over the individual channel ends to facilitate delivery and/or collection of the stream flowing through the relevant channels.

In addition to aligning the various penetrations, the stacking of the plates preferably places flow paths 1104 and 1124 in close proximity to flow path 1144 to facilitate heat transfer through the walls of independent channels 1145 into independent channels 1105 and 1125. In some embodiments, this heat transfer occurs in what are represented in FIG. 8 as heat exchangers, such as heat exchangers 831, 832, 833 and 834.

In some embodiments, the plates may be stacked and diffusion bonded or otherwise bonded in any suitable order to form a PCR version of the reformer 820. In some embodiments, the plates may be stacked and diffusion bonded or otherwise bonded in order as follows: at least one top end plate 1180, a bounding plate 1101, multiple reforming cells; each reforming cell comprising a reformer air plate 1141, reformer fuel plate 1161, a second reformer air plate 1141 and a reformer plate 1121, and the rest of stack includes in order a reformer air plate 1141, a reformer fuel plate 1161, a second reformer air plate 1141, another bounding plate 1101 and a bottom endplate 1190. Accordingly, the order of printed circuit reactor plates in a given stack for some embodiments of reformer 820 may have the following pattern for the active plates (bounding plate 1101=B, reformer air plate 1141=A, reformer fuel plate 1161=F, a reformer plate 1121=R): B A F A R A F A R . . . A F A B. A perspective view of a reforming cell is shown in FIG. 12.

In one specific embodiment for reforming 2 SCMH of natural gas, reformer 820 comprises a PCR having 3 top end plates, followed by a bounding plate 910 followed by 5 reforming cells followed by a reformer air plate 1141, a reformer fuel plate 1161, a second reformer air plate 1141, another bounding plate 1101 and 3 bottom end plates. Preferably, reformer 820 comprises a PCR that is constructed from materials suitable to withstand the pressures and temperatures to which reformer 820 is exposed. In some embodiments, reformer 820 may be constructed from Alloy 800H or Alloy 617.

The individual plates making up the PCR may independently have the thicknesses described in Table 1. In some embodiments, the plates may each be 1.6 mm thick. In addition each of the independent flow channels 1105, 1125, 1145, and 1165 may independently comprise a generally semicircular cross-section and may independently have the dimensions described in Table 1. In some embodiments, independent channels 1105 on bounding plates 1101 may have a depth of 1.10 mm depth, a width of 1.69 mm and 1.00 mm ridges. In some embodiments, independent channels 1125 on reformer plates 1121 may have a depth of 1.10 mm depth, a width of 1.69 mm and 1.00 mm ridges. In some embodiments, independent channels 1145 on reformer air plates 1141 may have a depth of 1.10 mm depth, a width of 1.69 mm and 0.90 mm ridges. In some embodiments, independent channels 1165 on reformer fuel plates 1161 may have a depth of 1.10 mm depth, a width of 1.69 mm and 0.4 mm ridges.

In some embodiments, when reformer 820 comprises a PCR, the PCR may operate as follows: the reformer stream 811 may enter flow paths 1104 and 1124 on bounding plates 1101 and reformer plates 1121 a catalyst free reformer chamber formed by alignment of the relevant reformer penetrations on each of the plates making up the PCR including reformer stream inlet penetrations 1102 and 1122. The reformer stream 811 may enter the independent channels 1105 and 1125 making up flow paths 1104 and 1124 where it is heated by reformer air stream 126 that has entered the PCR on reformer air plate 1141 through reformer air inlets 1142 and into reforming the multiple independent channels 1145 of flow path 1144. Preferably, reformer air stream 126 and reformer stream 811 exchange heat through the walls of their independent channels 1145, 1105 and 1125 while flowing in single pass cross flow yet generally the streams preferably flow in a co-flow direction as shown in FIG. 8. Thus, during the actual heat transfer the streams preferably flow in cross flow relative to each other, but the flow of both of the streams through the PCR is preferably in a generally co-flow direction.

After receiving heat from the reformer air stream 126, the reformer stream 811 enters reforming chamber or bed 841 formed from alignment of the various reforming chamber or bed penetrations on the plates of the PCR where the gaseous hydrocarbon in the reformer stream is partially catalytically reformed. Similarly, after heating reformer stream 811 reformer air stream 126 enters combustion chamber 851 where it is re-heated by combustion of a portion of the fuel from reformer fuel stream 124. The portion of reformer fuel stream 124 enters the PCR through one or more reformer fuel flow access paths or chambers formed by alignment of the relevant fuel supply penetrations on each of the plates making up the PCR and enter independent channels 1165 of flow path 1164 and through reformer fuel inlets 1162. The portion of the reformer fuel stream 124 flows through independent channels 1165 and into combustion chamber 851 through reformer fuel outlets 1163 and the fuel is catalytically combusted in the presence of reformer air stream 126 to re-heat the reformer air stream 126 for the next stage of reforming. In this manner, the reformer stream 811 and the reformer air stream 126 are subjected to multiple stages of heat exchange, reforming, and combustion until reformer stream 811 leaves the PCR as syngas stream 180 and the reformer air stream 126 leaves the reformer as flue gas stream 160.

Figure 13A:
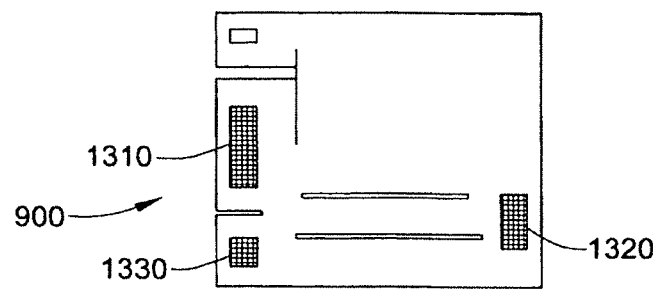
FIG. 13A-B show a bottom view of a stack plates forming a pre-reformer (FIG. 13A) and reformer (FIG. 13B).
Figure 13B:
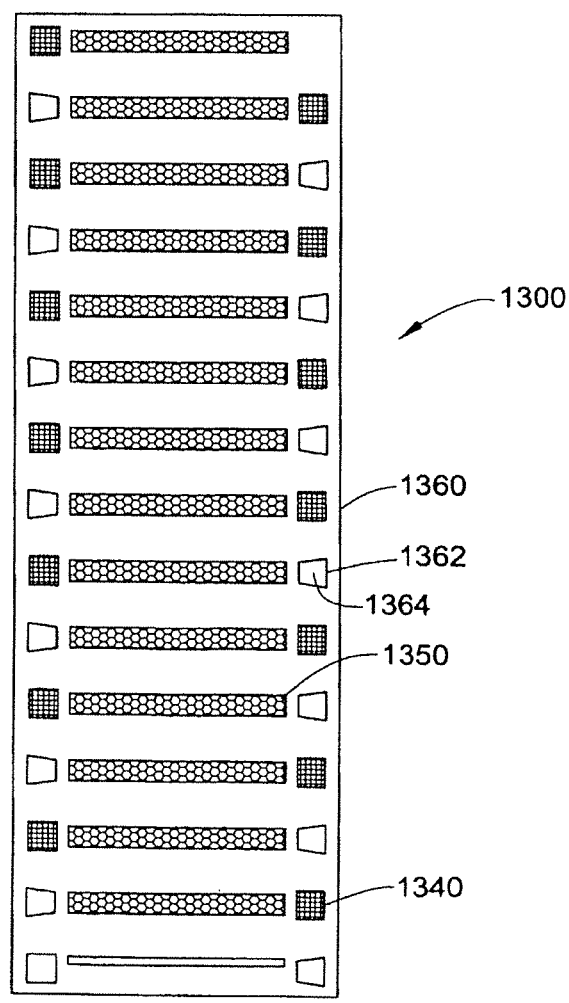

A top view of PCR version 900 or pre-reformer 800 and a top view of PCR version 1300 of reformer 820 are shown in FIG. 13A-B. As shown in, each of the pre-reforming chambers or pre-reforming beds 1310, 1320, 1330 and reforming chambers or beds 1340 are shown packed with reforming catalyst. Similarly, each of combustions chambers 1350 are shown packed with catalyst. In this version of PCR 1300, top plates 1360 also include fuel supply penetrations 1362 which help to form fuel supply chambers 1364. Accordingly, in this embodiment of PCR 1300, access to each of the chambers may be obtained through the top plates 1360.

Figure 14:
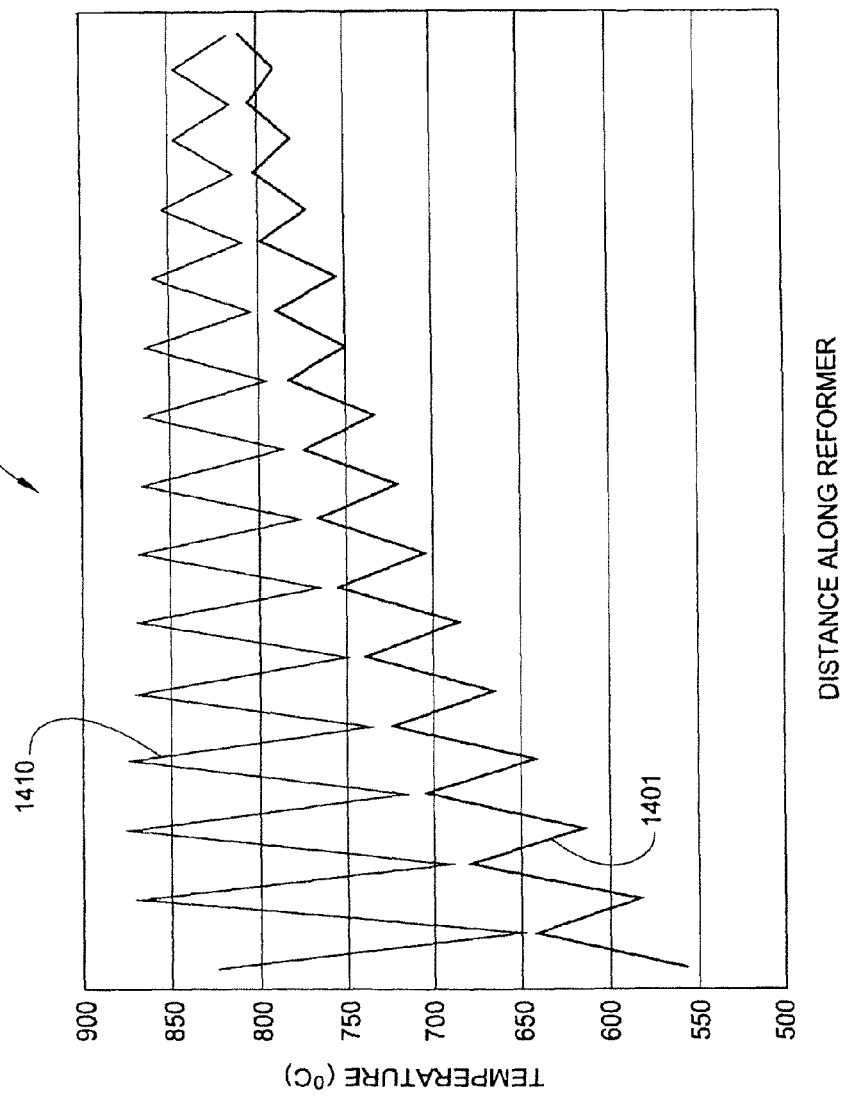
FIG. 14 shows an illustration of the desired trends of the temperature profiles for the reformer air stream and the reformer stream in an embodiment.

The various PCHE's and PCR's described herein may comprise plates that include independent flow channels for the various streams. The plates for each of the PCHES's and PCR's may, independently for each plate or flow channel, have the dimensions described in Table 1:

believed that the temperature of the reformer stream 811 as it is reformed in each of the reforming chambers or beds 841, 842, 843 etc. of a 14 stage reformer is likely to appear approximately as shown by line 1401 and the temperature of reformer air stream 126 is likely to appear as it is heated and exchanges heat with reformer stream 811 as shown by line 1410. As shown, the average temperature difference between reformer stream 811 and reformer air stream 126 for each stage should decrease from stage to stage and the temperature of reformer stream 811 should rise from stage to stage. Preferably, the rise in temperature of reformer stream 811 should be preceded by an increase in the partial pressure of hydrogen in the reformer stream 811 as a result of the reforming. By leading the rise in temperature with an increase in hydrogen content in the reformer stream 811, coking and metal dusting conditions should be reduced or avoided. As a result of the increasing reformer stream temperature from stage to stage, the fuel requirements for each successive stage of this embodiment should be reduced between the stages as the heat load required to re-heat the reformer stream 811 and to re-heat the reformer air stream 126 should be reduced from stage to stage. Preferably, as shown in FIG. 14, the temperature of the reformer stream and the reformer air stream will converge to an asymptote somewhere above 800° C.

In some embodiments, the supply of fuel and/or air to each of the stages of reforming may be passively controlled by controlling the pressure and the pressure drops in the air and the fuel streams throughout the reformer system 100. By passively controlling the supply of fuel to each of the stages, the amount of heat generated by combustion of the fuel is controlled, thereby controlling the amount of heat provided

TABLE 1

Example PCHE and PCR Plate Thicknesses and Flow Channel Dimensions

CHANNEL DIMENSIONS

|  | Width (millimeters) | Depth (millimeters) | Ridge Width between channels (millimeters) |
|---|---|---|---|
| Preferred ranges of dimensions | 0.6 to 4.5 | 0.3 to 2.5 | 0.2 to 2.5 |
| Example ranges of dimensions | 0.8 to 3.25, 1 to 3, 1.1 to 2.5, 1.2 to 2.25, 1.3 to 2, 1.4 to 1.75, 1.4 to 1.6 | 0.4 to 2, 0.5 to 1.5, 0.6 to 1.4, 0.75 to 1.25, 1 to 1.25 | 0.3 to 2, 0.5 to 1.2, 0.7 to 1.1, 0.8 to 1.1, 0.8 to 1.0, 0.3 to 0.8, 0.3 to 0.5 |

PLATE THICKNESSES

|  | Plate Thickness (millimeters) |
|---|---|
| Preferred range of thicknesses | 0.5 to 3 |
| Example ranges of thicknesses | 0.75 to 2.9, 0.9 to 2.5, 1 to 1.75, 1.1 to 1.6, 1.25 to 1.5 |

In one embodiment for reforming 2 SCMH of natural gas using PSA off-gas as a fuel, efficient operation of the reformer module 150 while remaining within the material design temperatures may have the temperature profiles for reforming and combustion that appear approximately like those shown in FIG. 14. Though not representing actual data, FIG. 14 shows a graph 1400 of a desired trend in the temperature profile of reformer stream 811 and reformer air stream 126 as they proceed through 14 stages of reforming (with the last reforming chamber or bed and combustion chamber omitted) with passive control of the fuel supply to each stage of combustion such that the amount of fuel supplied decreases from stage to stage. As shown, it is to the reformer air stream 126 and ultimately the reformer stream 811 and associated reforming chambers or beds. The pressure of the fuel at the inlet in a given line and the pressure drop across the length of the line determines the volume of fuel that is delivered through that line per unit time. Pressure drop may be adjusted in a given fuel line by, for example, varying the length of the fuel line, varying the tortuosity of the flow path, i.e. the number and severity of turns in the fuel line, varying the number of fuel lines and/or varying the cross-sectional area of the fuel line. Changing one or some of these fuel line characteristics thus adjusts the amount of "resistance" encountered by the flow of fuel in a given fuel line en route to a combustion chamber, and may thus passively control the amount of fuel provided per unit time.

The efficiency of the reforming process is temperature dependent because the methane conversion achieved depends on the maximum temperature achieved. It is also desirable to limit the upper temperature of the metal that forms the physical structure of the reformer. Therefore, by controlling the amount of fuel fed to each successive combustion chamber by configuring the fuel lines specifically for each reforming stage, the metal temperatures may be controlled while providing for stage by stage increases in reforming temperature, thereby increasing the efficiency of the overall reformer system 100.

It is preferred that the control provided by tuning the fuel line configurations is passive. In other words, the fuel line configurations themselves provide the control without the need for affirmative control mechanisms. To this end, it is preferred that the fuel lines be configured specifically for the parameters of a particular system. For example, in the PCR version of reformer 820 described with respect to FIG. 11A-F, each independent channel 1165 which feeds fuel to a combustion chamber may be independently etched or otherwise formed according to a desired fuel line configuration for that channel to provide a desired resistance. After the system is manufactured with the fuel lines so configured, additional active control mechanisms are preferably unnecessary. By providing for such passive control, reformer system 100 may be simpler and smaller because the use of active flow measurement and control devices is limited or avoided resulting in cost and design benefits and flexible turndown ratios.

In some embodiments, to reduce the number of parameters that may need to be considered in arriving at the appropriate resistance to be provided by each independent channel 1165, and for ease of manufacturing the channels, it is preferred that independent channels 1165 feeding the respective combustion chambers each have the same cross-sectional dimension. It is also preferred that all independent channels 1165 be configured for laminar flow so that the pressure drop is a direct function of flow for all of the channels. As such, due to the linear variation in flow relative to pressure drop, the ratios of the fuel flow and air flow at each stage of combustion may remain relatively constant even during significant turndown of reformer system 100.

The delivery of air and fuel to the combustion chambers, such as combustion chamber 821 is balanced by the design of plates 1141 and 1161. Moreover, the pressure of the air arriving through air lines 1145 and the pressure of the fuel arriving through independent channels 1165 match or self adjust to match at the combustion chamber to produce the desired amount of combustion for that particular chamber. This balancing of the pressures in turn provides the appropriate amount of heat to the reforming reactants as they enter the associated reforming chamber or bed. It is preferred that the pressure drops in each line are established so that the overall fuel pressure is just above atmospheric. However, other pressure drops may be established and are within the scope of some embodiments.

Figure 15:
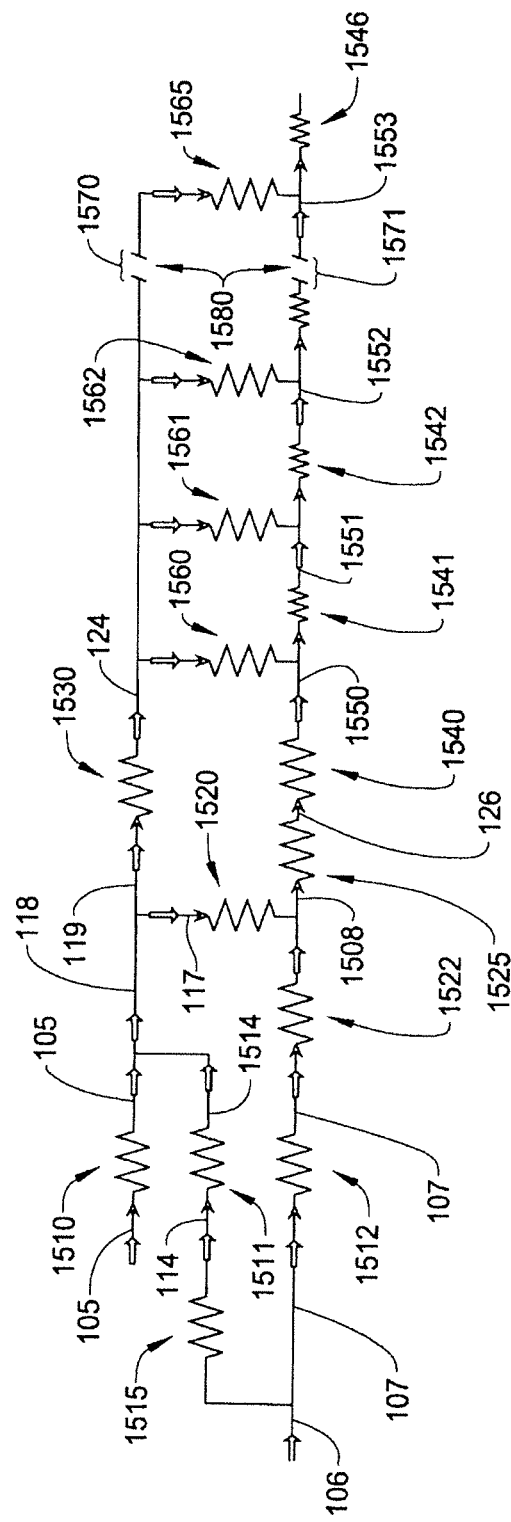
FIG. 15 shows an embodiment of a flow resistance network for the air and fuel streams in a reforming system.
Figure 16B:
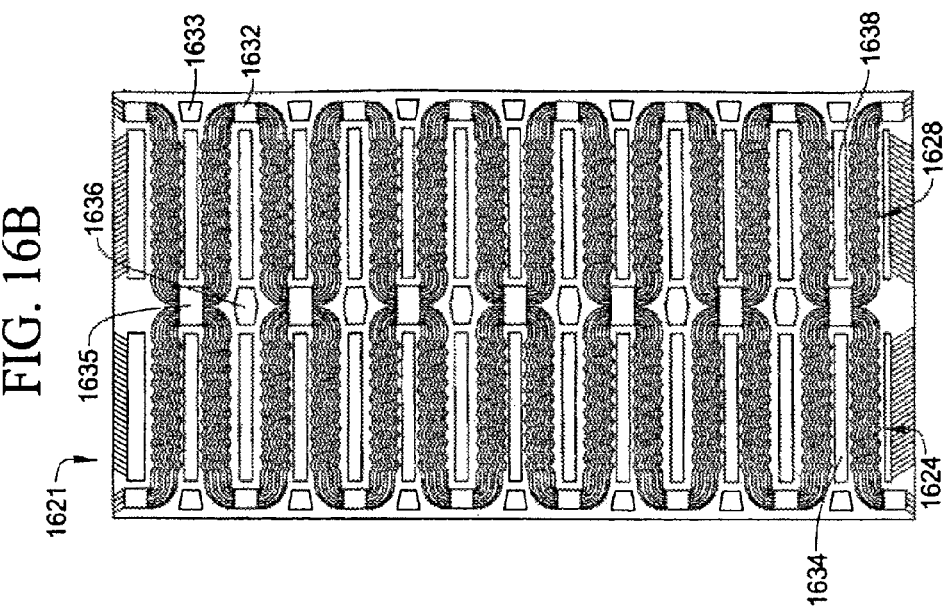
FIG. 16A-D show schematics of plates that may be used to form an embodiment of a reformer.
Figure 16A:
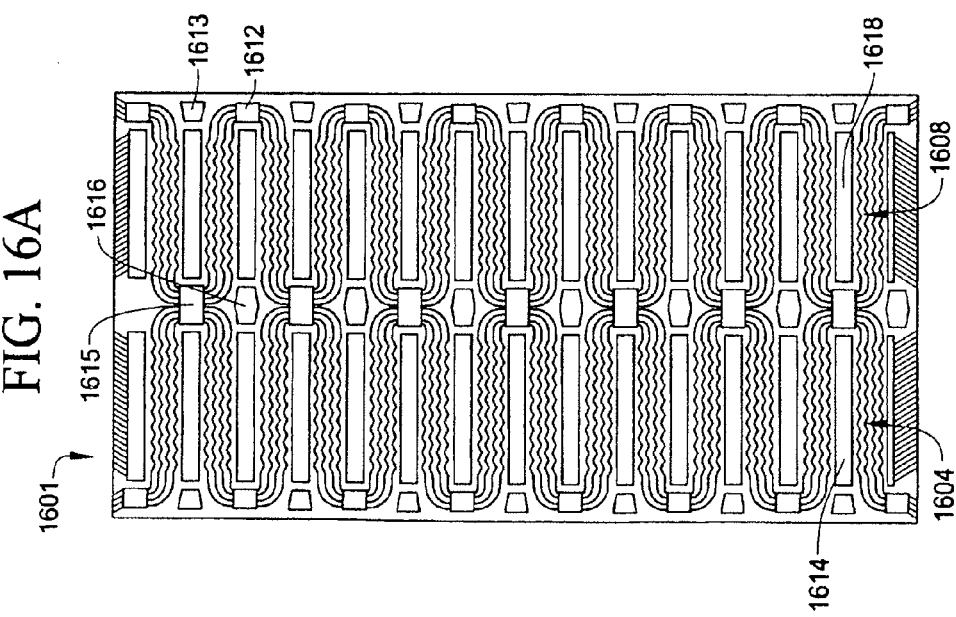
Figure 16C:
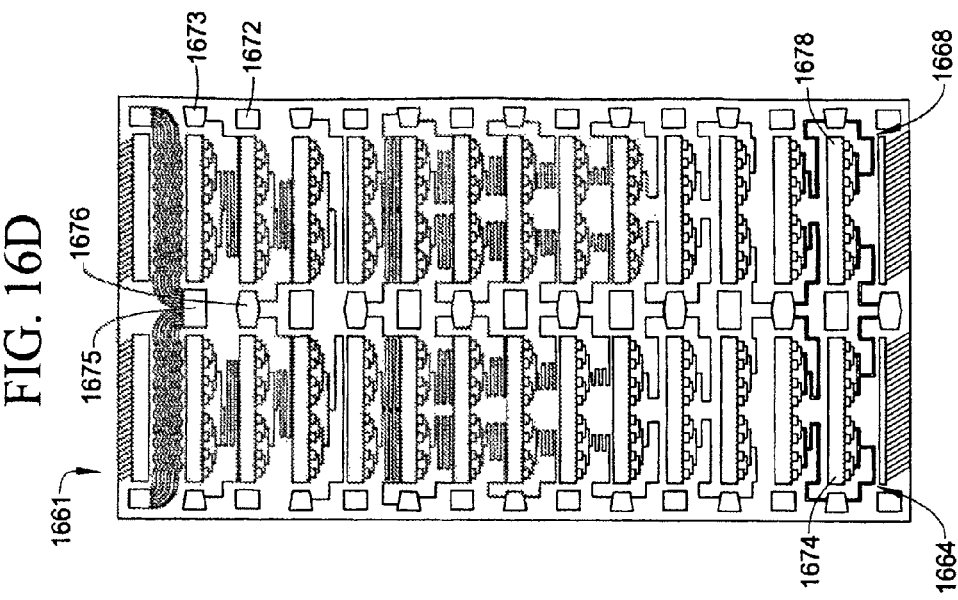
Figure 16D:
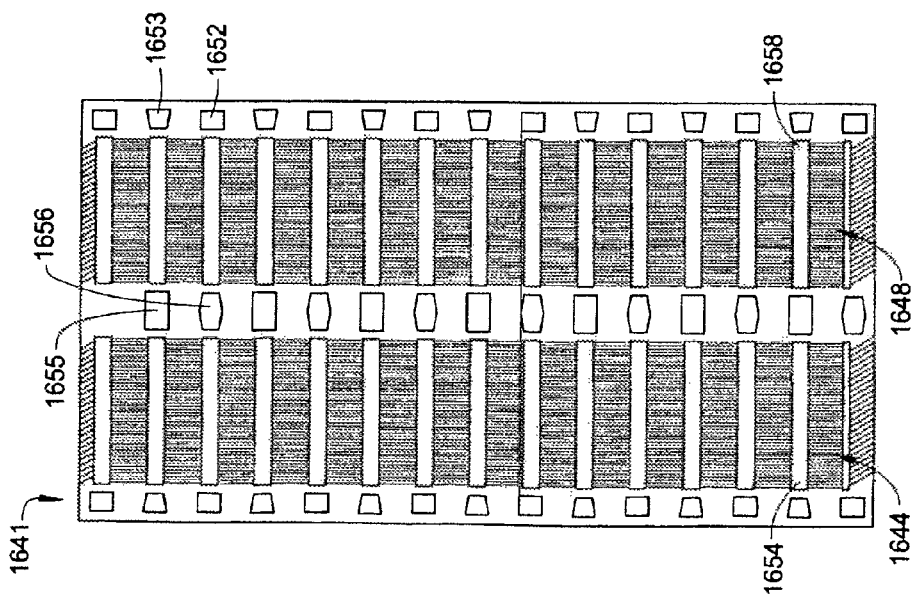

FIG. 15 is a diagram of the flow resistances within the air and fuel lines that supply an embodiment of the reformer module. The flow resistances within this network as shown in FIG. 15 are preferably tuned so that the amount of fuel delivered to each combustion stage through successive reforming stage fuel streams 861, 862, 863, etc., diminishes over the length of the reformer despite the fact that the pressure drop driving the fuel flow increases. This reduction over the length of the reformer results in the diminishment of reforming that occurs in each successive reforming stage and the increase in temperature of the reforming stream in each successive reforming stage. FIG. 15 shows the flow resistance in the air and fuel lines associated with the individual components through which the fuel lines flow and is discussed with reference to streams and components described with respect to FIG. 1. As shown, air feed stream 106 is split into air feed stream 107 and combustion air stream 114. Combustion air stream 114 experiences flow resistance 1515 associated with valve 115a, before it proceeds into syngas heat recovery heat exchanger 110, where it experiences flow resistance 1511 and leaves syngas heat recovery heat exchanger 110 as combustion air stream 1514. Similarly, air feed stream 107 and fuel feed stream 105 proceed into syngas heat recovery heat exchanger 110 where they experience flow resistances 1512 and 1510 respectively.

After leaving syngas heat recovery heat exchanger 110, combustion air stream 1514 and fuel feed stream 105 are combined to form fuel/air mixture stream 118. A passively controlled portion of fuel/air mixture stream 118 corresponding to air preheat mixture 117 experiences resistance 1520 as it is split from fuel/air mixture 118 to be combusted in the presence of air feed stream 1508 in air pre-heater 122. The remaining portion of fuel/air mixture 118, fuel preheat mixture 119, is partially catalytically combusted in fuel pre-heater 120, where it experiences flow resistance 1530 and becomes reformer fuel stream 124. In air pre-heater 122, air feed stream 107 is heated by catalytic combustion of the fuel in air preheat mixture 117, experiences flow resistance 1522 and then experiences flow resistance 1525 as it enters reformer module 150 becomes reforming air stream 126. Flow resistance 1525 is associated with a non-negligible flow resistance which is physically after air pre-heater 122 at the entrance to the reformer block.

At this point in FIG. 15, the reformer fuel stream 124 and reformer air stream 126 enter reformer 820. As shown, reformer air stream 126 experiences resistance 1540 in heat exchanger 831 in the first stage of reforming in reformer 820 becoming reformer air stream 1550. After leaving heat exchanger 831, reformer air stream 1550 is joined with a passively controlled portion of reformer fuel stream 124, such as reforming stage fuel stream 861, and the fuel is subsequently combusted in combustion chamber 851 to reheat reformer air stream 1550. The passively controlled portion of reformer fuel stream 124 experiences flow resistance 1560 prior to joining reformer air stream 1550 as a result of the flow control. Reformer air stream 1550 experiences flow resistance 1541 in heat exchanger 832 in the next stage of reforming, leaves heat exchanger 832 as reformer air stream 1551 and is combined with a passively controlled portion of reformer fuel stream 124, such as reforming stage fuel stream 862, which experiences flow resistance 1561 prior to combining with reformer air stream 1551. Reformer air stream 1551 is then reheated in combustion chamber 852 and experiences flow resistance 1542 in heat exchanger 833 in the next stage of reforming becoming reformer air stream 1552. After leaving heat exchanger 833, reformer air steam 1552 is combined with a passively controlled portion of reformer fuel stream 124, such as reforming stage fuel stream 863, which experiences flow resistance 1562 prior to combining with reformer air stream 1552, and is reheated by combustion of the fuel in combustion chamber 853.

In this manner the flow resistance network for the air and fuel streams operates through any suitable number of stages represented by 880 in FIG. 8 and experiences the flow resistances represented by brackets 1570 and 1571 in FIG. 15. Just prior to the last stage of reforming, reformer air stream 1553 is combined with a passively controlled portion of reformer fuel stream 124, such as reforming stage fuel stream 865, which experiences flow resistance 1565 prior to combining with reformer air stream 1553, and is reheated by combustion of the fuel in combustion chamber 855. After being reheated, reformer air stream 1552 exchanges heat one last time with the reformer stream before leaving reformer 820 as flue gas 160.

In the reformer of FIG. 15, there are two routes to any point at which fuel and air may mix, and in operation of the equipment, the flows down the branches self-adjust so that the pressures at the mixing points match. Thus, in some embodiments the following constraints may be placed upon the design pressures and pressure drops of the components in the fuel/air flow resistance network shown in FIG. 15 ($P_x$ indicates the pressure in x line, while $\Delta P_x$ indicates the pressure drop due to the x reference numeral resistance shown in FIG. 15; $P_{105(hot)}$ is the pressure in stream 105 after experiencing resistance 1510 in syngas heat recovery heat exchanger 110 and $P_{105(cold)}$ is the pressure in stream 105 prior to entering syngas heat recovery heat exchanger 110):

$$P_{105(hot)} = P_{105(cold)} - \Delta P_{1510} = P_{106} - \Delta P_{1515} - \Delta P_{1511}$$

$$P_{1508} = P_{1518} - \Delta P_{1520} = P_{107} - \Delta P_{1512} - \Delta P_{1522}$$

$$P_{1550} = P_{1518} - \Delta P_{1530} - \Delta P_{1560} = P_{1508} - \Delta P_{1525} - \Delta P_{1540}$$

$$P_{1551} = P_{1518} - \Delta P_{1530} - \Delta P_{1561} = P_{1550} - \Delta P_{1541}$$

$$P_{1552} = P_{1518} - \Delta P_{1530} - \Delta P_{1562} = P_{1551} - \Delta P_{1542}$$

$$P_{1553} = P_{1518} - \Delta P_{1530} - \Delta P_{1565} = P_{PREVIOUS\ STAGE} - \Delta P_{HEAT\ EXCHANGER}$$

PREVIOUS STAGE

In one embodiment for reforming 2 SCMH of natural gas using PSA off-gas as a fuel, a suitable solution for the pressure drops satisfying the above constraints in a PCR reformer comprising 14 stages of reforming is shown in Table 2 below using the reference numerals used in FIGS. 1 and 8 to identify the components or streams within which the pressure drop occurs where appropriate. Note that for the stages of reforming represented by the brackets 836 and 826 in FIG. 8, the relevant heat exchanger/combustion stages or reforming stage fuel streams are identified by the reference numerals are 836(x) and 826(x) respectively, where x is a letter of the alphabet starting at "a" and proceeding down the alphabet for each successive stage of reforming. Thus for the first stage of reforming represented by brackets 836 and 826, the reformer air stream is represented by 836(a) and the reforming stage fuel supply is represented by 826(a) and so on.

TABLE 2

Examples of Suitable Pressure Drops in the Fuel and Air Streams in One Embodiment of the Reforming System

| Component/Stream | ΔP (kPa) | Component/Stream | ΔP (kPa) |
|---|---|---|---|
| 110/107 | 3.08 | 117 | 1.07 |
| 110/105 | 1.05 | 861 | 1.93 |
| 115a/114 | 0.00 | 862 | 2.32 |
| 110/114 | 1.87 | 863 | 2.73 |
| 122/107 | 0.10 | 826(a) | 3.17 |
| 150/126 | 0.09 | 826(b) | 3.62 |
| 126/831 | 0.37 | 826(c) | 4.10 |

TABLE 2-continued

Examples of Suitable Pressure Drops in the Fuel and Air Streams in One Embodiment of the Reforming System

| Component/Stream | ΔP (kPa) | Component/Stream | ΔP (kPa) |
|---|---|---|---|
| 832 | 0.40 | 826(d) | 4.61 |
| 833 | 0.43 | 826(e) | 5.12 |
| 836(a) | 0.45 | 826(f) | 5.66 |
| 836(b) | 0.48 | 826(g) | 6.23 |
| 836(c) | 0.50 | 826(h) | 6.77 |
| 836(d) | 0.52 | 826(i) | 7.33 |
| 836(e) | 0.54 | 865 | 8.04 |
| 836(f) | 0.56 | | |
| 836(g) | 0.57 | | |
| 836(h) | 0.59 | | |
| 836(i) | 0.60 | | |
| 835 | 0.61 | | |

In one embodiment for reforming 2 SCMH of natural gas using PSA off-gas as a fuel comprising 14 stages of reforming and starting with the fuel in line 117 sent to combustion chamber 122 to reformer air stream 126 and proceeding through each of the successive reforming stage fuel streams 861, 862, 863, the proportion of the fuel stream 118 sent into each line may be as indicated in Table 3 below. Note that for the stages in FIG. 8 represented by bracket 826, the reference numerals used are 826(x) where x is a letter of the alphabet starting at "a" and proceeding down the alphabet for each successive stage of reforming.

TABLE 3

Example of Fuel Distribution in a 14 Stage Reformer

| Fuel Stream | % of Fuel Flow |
|---|---|
| 117 | 18.6% |
| 861 | 10.4% |
| 862 | 9.8% |
| 863 | 8.9% |
| 826(a) | 8.1% |
| 826(b) | 7.7% |
| 826(c) | 6.9% |
| 826(d) | 6.3% |
| 826(e) | 5.5% |
| 826(f) | 4.9% |
| 826(g) | 4.1% |
| 826(h) | 3.5% |
| 826(i) | 2.8% |
| 865 | 2.5% |

Preferably, a high degree of precision is not required in the rate of fuel distribution in some embodiments of the reformer, but in some embodiments, the rate of fuel addition to each stage generally falls, as the reformer temperature increases, in order to keep reforming temperatures below, but close to, the material design temperature for the equipment. In some embodiments, the design temperature may be on the order of 820° C. or higher. Higher temperatures may favor methane conversion within the reformer, but may also create more severe operating conditions for the materials of construction. Because the heat transfer coefficients of the gases on the reforming side are considerably higher than those on the combustion side, the overall temperature of the materials of construction tends to stay close to the reforming gas temperature, and hence, in some embodiments the combustion gas temperatures may exceed the material design temperature.

In order to achieve the fuel/air mixtures throughout the reformer which will achieve the desired temperature profiles, the heat exchange and combustion components are preferably designed to fulfill their primary functions while ensuring that the pressure drops associated with each correspond to those required for sound fuel/air mixing. Preferably, the pressure drops for the air and fuel streams across reformer 820 are low, such as less than 0.50 bar, less than 0.30 bar, less than 0.25 bar, less than 0.20 bar, less than 0.175 bar, less than 0.15 bar, less than 0.125 bar or less than 0.10 bar or on the order of 0.10 bar or less in total to avoid inefficiencies associate with large blower power consumption. In addition, the entering fuel feed stream 104 may also be pressure-drop sensitive. For example, where fuel feed stream 104 is the off-gas from a PSA system a high fuel pressure drop, requiring high fuel inlet pressure, may lower the efficiency of the PSA system.

In some embodiments, it is desirable that the flow distribution selected and the corresponding plate configurations are suitable for a large range of turndown conditions. This may be accomplished by designing the relevant reformer plates, heat exchangers and combustion chambers and the relevant flow paths for the fuel and air streams such that the pressure drop is essentially proportional to the flow rates (i.e., that the flow is essentially laminar; in straight passages, flow is essentially laminar when the Reynolds Number is less than 2000). By maintaining laminar flow, sound fuel distribution may be maintained to very low turndown conditions, as shown in Table 4 below for 10% capacity operation of an embodiment for reforming 2 SCMH of natural gas using PSA off-gas as a fuel comprising 14 stages of reforming when compared to the design capacity. The data in Table 4 assumes that the air flow is varied proportionately to the capacity, but no further control of the fuel/air system is required.

TABLE 4

Comparison of Fuel Flow between Design Capacity and Turndown to 10% of Capacity

| Fuel Stream | % of Fuel Flow (Design Capacity) | % of Fuel Flow (10% of Capacity) |
|---|---|---|
| 117 | 18.6% | 18.3% |
| 821 | 10.4% | 8.8% |
| 822 | 9.8% | 8.9% |
| 823 | 8.9% | 8.6% |
| 826(a) | 8.1% | 8.1% |
| 826(b) | 7.7% | 7.8% |
| 826(c) | 6.9% | 7.2% |
| 826(d) | 6.3% | 6.7% |
| 826(e) | 5.5% | 6.0% |
| 826(f) | 4.9% | 5.3% |
| 826(g) | 4.1% | 4.5% |
| 826(h) | 3.5% | 3.9% |
| 826(i) | 2.8% | 3.1% |
| 865 | 2.5% | 2.8% |

In PCR embodiments of the reformer 820, the reformer design may be a four way balance between air pressure drop in the reformer air plate 1141, fuel pressure drop in the reformer fuel plate 1161, the heat required by the endothermic reforming reaction in the reforming chambers or beds and limiting the maximum temperature produced in the combustion chambers to temperatures suitable for the materials of construction. To simplify the surrounding system requirements, the reformer fuel plate 1161 and reformer air plate 1141 are preferably configured to provide a reduced or minimum pressure drop. As mentioned above, the air and fuel preferably are delivered to the combustion chambers at slightly above atmospheric pressure, preferably eliminating the need for fuel compression to accomplish the matching of the four variables and thereby avoiding the associated added cost, complexity and unreliability.

In some embodiments, therefore, the design of the independent channels 1165 may control the amount of fuel being delivered into each of the respective combustion chambers with only one exterior variable in terms of fuel supply having to be controlled, and that is pressure of the fuel as it is being provided to the fuel manifold that feeds each of the fuel supply flow access paths or chambers formed from the fuel supply penetrations. The fuel pressure is preferably controlled to maintain the reformer air stream temperature at a level to limit the maximum overall reformer temperature while supplying the heat required by the endothermic reforming reaction. The need for compression of the fuel is preferably eliminated by designing all of the independent channels 1165 for minimum pressure drop.

The fuel distribution system described above provides several benefits over the prior art. For example, the metered addition of fuel to each stage preferably limits the heat which may be added to each stage thereby eliminating the balance of combustion, heat transfer and reforming reaction both radially and axially that must be achieved in tubular reformers. Furthermore, the inter-stage heat exchangers are of microstructure (PCHE) construction, which supports higher heat transfer coefficients, minimizes equipment size and high alloy usage thereby reducing cost, and may be configured with a large face area and short flow path for low pressure drops. In addition the heat exchangers are readily characterized by engineering analysis without the need for expensive product full scale tests to validate performance.

In a preferred embodiment, a cross-flow arrangement is used for the heat exchange aspect of reformer 820 and a co-flow arrangement may be used for the reforming aspect of reformer 820. The use of a cross-flow arrangement in the heat exchange aspect may permit a higher proportion of the PCR plate area to be devoted to heat exchange duties relative to that achievable with co-flow or counter-flow arrangements, including those employing multiple passes. To this end, the cross-flow heat exchanger component of reformer 820 may be coupled with the co-flow reforming chamber or bed component to produce satisfactory temperature profiles for the reformer stream as it travels from one reforming chamber or bed to the next within the series of reforming stages.

Figure 17:
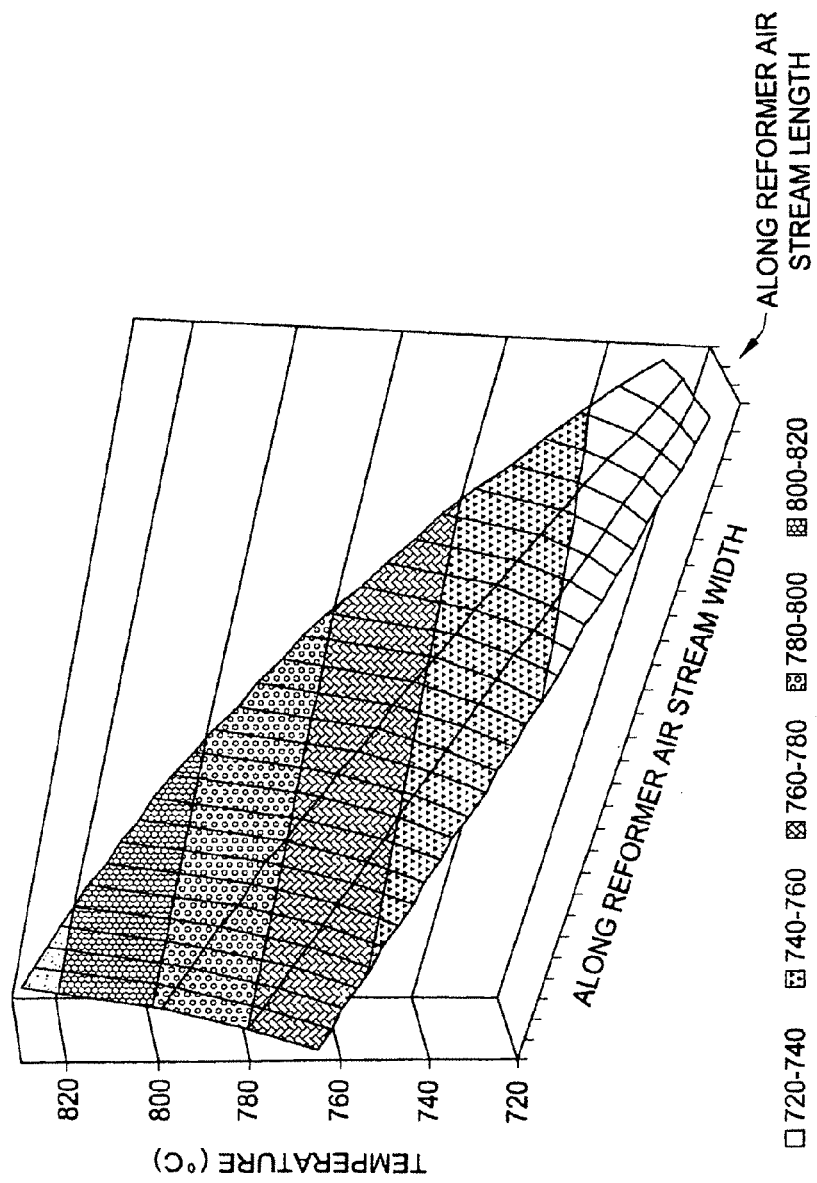
FIG. 17 shows a simulated syngas temperature distribution for a reformer cross-flow heat exchanger without taking wall conduction into account.
Figure 18:
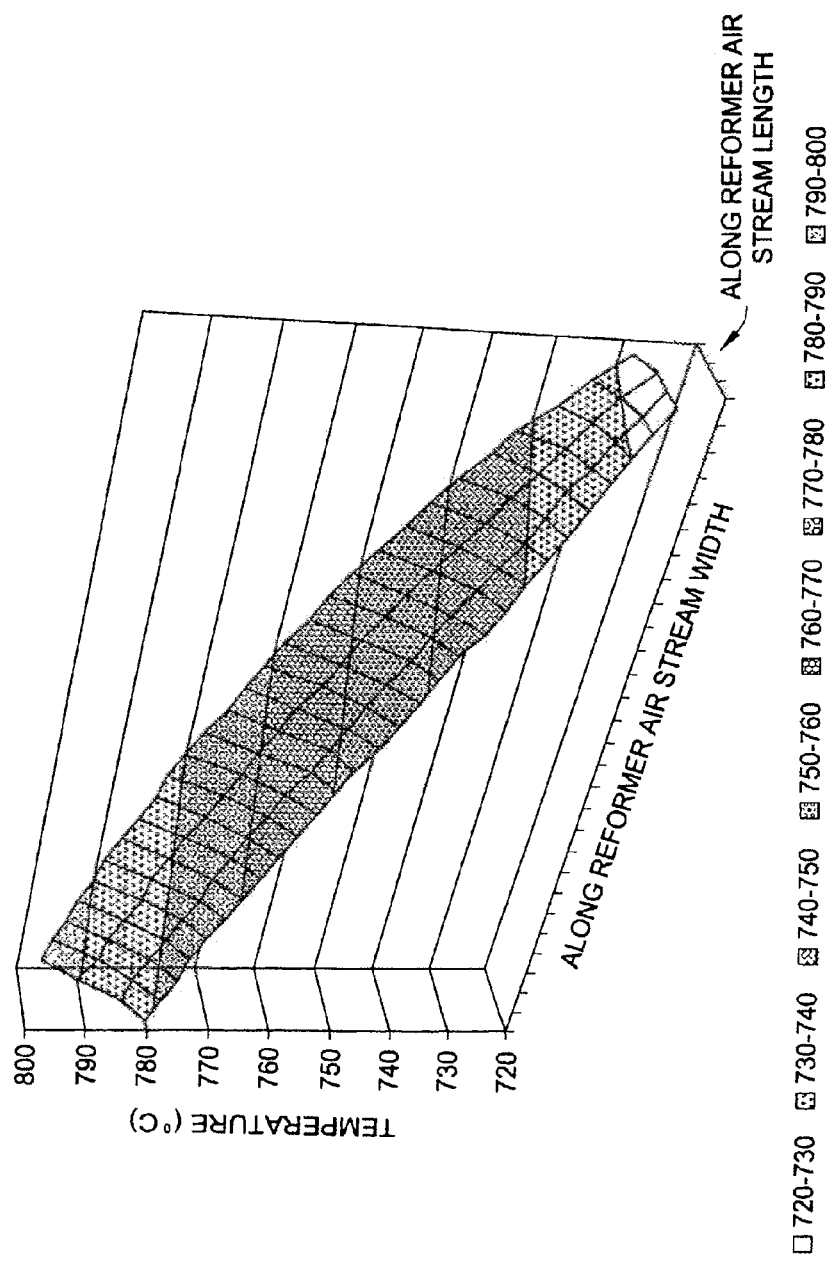
FIG. 18 shows a simulated syngas temperature distribution for a reformer cross-flow heat exchanger taking wall conduction into account.

A potential issue with this cross flow configuration relates to the possible variation in the temperature at the outlet of the heat exchanger of each stage because a significant variation in the heat exchanger outlet temperature would result in a wide variation in reaction characteristics in the associated downstream reformer chamber and catalyst. Simulation studies of the eighth heat exchange stage of an embodiment for reforming 2 SCMH of natural gas using PSA off-gas as a fuel comprising 14 stages of reforming, without considering wall heat conduction and assuming that the fluid enters the heat exchanger at a uniform temperature of about 730° C. showed that the fluid exited the heat exchanger at a temperature range of about 765° C. to 825° C. as shown in FIG. 17. Such a wide variation of the heat exchanger outlet temperature could result in a wide variation in the reforming reaction characteristics. However, when the effect of wall heat conduction was included, the heat exchanger outlet temperature range for the eighth heat exchange stage was significantly less, as shown in FIG. 18, e.g., on the order of about 15° C., or from about 780° C. to about 795° C. In both FIG. 17 and FIG. 18, with temperature along the z axis, the x and y axes represent the dimensions of the cross flow heat exchanger with the reformer air stream flowing along the shorter axis from upper right to lower left and the reformer stream flowing along the longer axis from lower right to upper left in cross flow relative to the reformer air stream.

This narrow exit temperature range may result from the fact that the walls of the heat exchanger in some embodiments are preferably thicker than those of typical finned heat exchangers. As such, it is believed that there is lengthwise conduction along the wall which serves to reduce the range of exit temperatures. Thus, it is preferred to use simple cross flow contact in the heat exchangers which allows higher utilization of the plates for heat exchange.

In other embodiments of some PCRs, the reformer air stream and the reformer stream may generally be configured in a counter-flow arrangement but may employ a number of cross-flow passes to achieve the counter-flow effect. In this situation, to achieve the counter-flow effect, an amount of plate area may be inactive for heat transfer. To this end, reforming gas may be led from each reforming bed to the far edge of the inter-stage heat exchanger before it enters the heat exchanger, and is then led from the near end of the heat exchanger to the succeeding reforming bed. However, the areas consumed in leading the reformer stream between the far and near ends of the heat exchanger to and from the reforming beds may be ineffective for heat exchange, and may thus compromise the efficiency of plate material usage of the reformer. Also, multi-passing the reformer stream at each stage may limit the width of each plate element, if pressure drop were not to become excessive, and thereby compound the loss of efficiency of reformer material utilization as the proportion of plate area which is ineffective for heat exchange is held high. Accordingly, though workable, such a configuration is not the preferred configuration.

The use of cross-flow heat exchange preferably avoids the need to lead the reformer stream from one end of the heat exchanger to the other that exists to achieve counter-flow heat exchange characteristics. As such, the use of cross-flow generally decreases the amount of plate area required for heat exchange. Furthermore, by reducing the number of passes, the pressure drop across the heat exchangers is decreased which in turn decreases the number of channels needed. The cross-flow arrangement also preferably allows the use of wider plate elements without generating undue pressure drop on the reforming side, such as the plates shown in FIG. 16 described below.

The use of an overall co-flow configuration for the reforming aspect of the process is believed to decrease temperature control requirements of the reformer because as the reforming air and reformer streams flow in the same direction over the length of the co-flow configuration, their temperatures will tend to converge. Thus, the control of the exit temperature of one of the streams results in the exit temperature of both streams being controlled.

Figure 19:
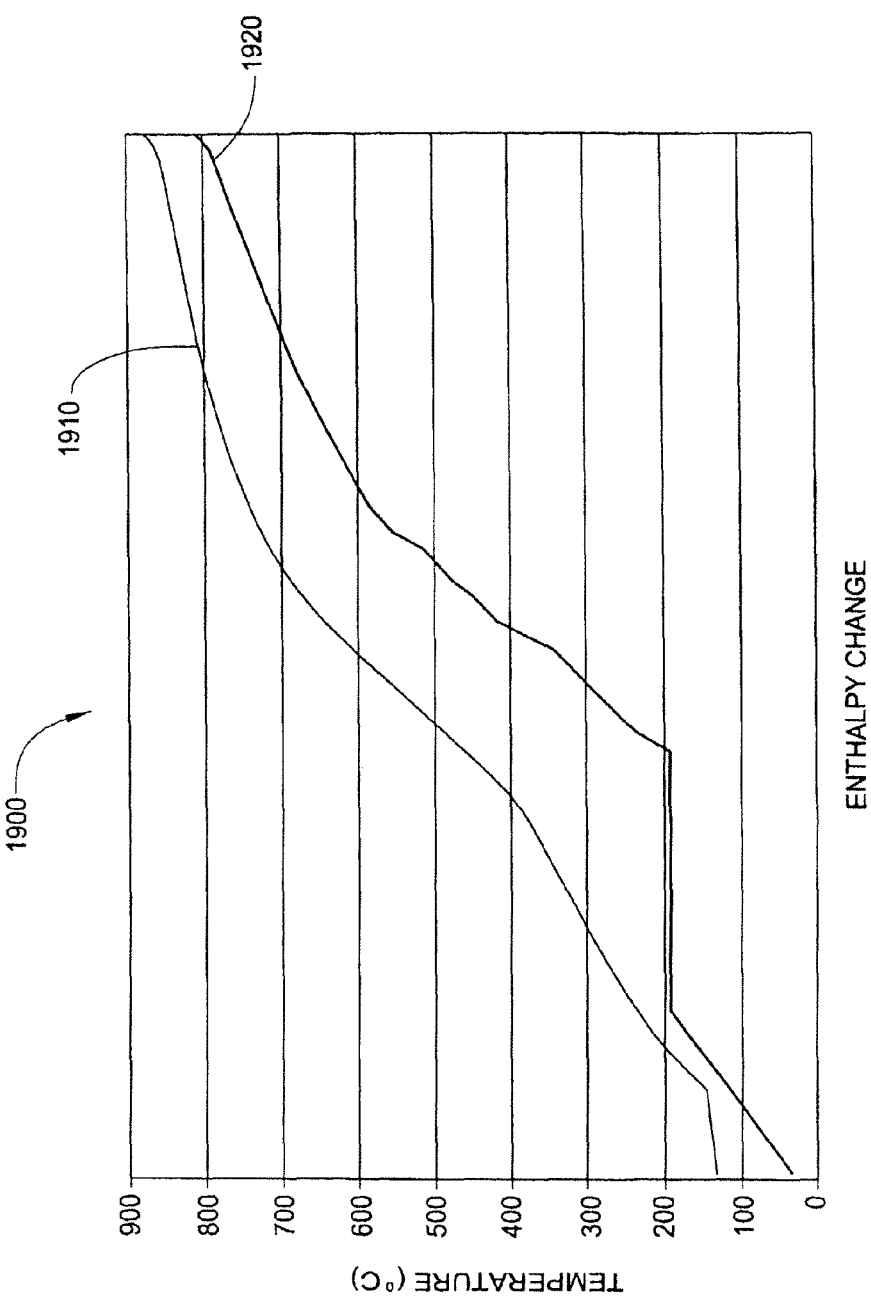
FIG. 19 shows a graph of the composite hot and cold temperature-enthalpy curves for the process streams in an embodiment of a reformer system.

FIG. 19 shows the composite hot and cold enthalpy curves for an embodiment of the reformer system. Curve 1910 represents the composite heat curve for the hot streams of the process, i.e., those streams which are cooled in heat exchangers, and curve 1920 is the composite curve for the cold streams of the process. The closest vertical approach of the curves is approximately 34° C. and may be referred to as the temperature "pinch". Because heat cannot flow from cold to hot streams ($2^{nd}$ Law of Thermodynamics), the highest possible heat recovery efficiency occurs for a pinch of zero. Thus, the smaller the pinch, the higher the overall heat recovery efficiency. In this regard, a pinch of 34° C. is quite small, especially considering the fact that one of the streams involved in heat transfer is low pressure air or flue gas having poor heat transfer characteristics. Note that in addition to the heat recovery efficiency the steam ratio and the methane conversion also bear on the overall efficiency of the process, as reflected in the formula described herein. Ideally, to avoid efficiency loss, heat should not be transferred across the pinch (from above the pinch to below the pinch) in any heat exchanger. Some embodiments of the process or apparatus limit this occurrence by the process schemes, though in some embodiments, this transfer does occur to a minor extent in heat exchanger 164.

It should be noted that the fourteen stage embodiment of reformer 820 described above with respect to FIGS. 11-12 is only an example and is not intended to limit the embodiments of the reformer. Nor is it necessary that the number of reforming and combustion stages should be equal. In fact, different plate sizes, configurations and/or the use of any suitable number of plates and reforming and combustion chambers so that reformer 820 may be scaled up or down to meet process requirements are specifically contemplated. Indeed, the printed circuit reformer design of some embodiments of reformer 820 allows reformer 820 to be readily scaled up or down without the significant cost associated with scaling up or down a typical tubular reformer. For example, where greater reforming capacity is required, the size of the reformer 820 may be increased by adding more plates or cells to the stack.

As another example for increasing capacity, the plates may be increased in size as shown in FIG. 16 by expanding the plates in a side ways direction rather than increasing the number of plates in the stack. As shown in FIG. 16, bounding plates 1601, reformer plates 1621, reforming air plates 1641 and reformer fuel plates 1661 may be configured essentially as a sideways mirror image combination of two of the corresponding plates discussed previously with respect to FIGS. 11A-D. As shown, each plate has two independent flow paths 1604 and 1608, 1624 and 1628, 1644 and 1648 and 1664 and 1668 respectively that share a central set of reforming chamber or bed penetrations and fuel supply chamber penetrations 1615 and 1616, 1635 and 1636, 1655 and 1656 and 1675 and 1676 respectively. Because the chambers formed from the central set of penetrations are shared, they and the penetrations that form them are correspondingly bigger than the chambers formed from outer independent reforming chamber or bed penetrations and fuel supply chamber penetrations 1612 and 1613, 1632 and 1633, 1652 and 1653 and 1672 and 1673, which may generally correspond to the reforming chamber or bed and fuel supply chamber penetrations discussed above with respect to FIGS. 11A-11D. Each of the plates also includes two sets of combustion chamber penetrations 1614 and 1618, 1634 and 1638, 1654 and 1658 and 1674 and 1678 respectively which may generally correspond to the combustion chamber penetrations discussed above with respect to FIGS. 11A-11D.

It should also be understood that the plates of a PCR corresponding to reformer 820 may also be lengthened or shortened to include more or fewer stages of reforming. Furthermore, it should also be understood that similar modifications such as those described above may be made to the pre-reformer and any of the heat exchangers described in here that have PCHE construction.

In some embodiments, the temperatures and pressures of some of the various streams are interrelated and may have the properties as shown in the following tables 5-8 with reference to the configuration for the reforming system shown in FIG. 1 and FIG. 8, with the combustion air stream 114 combining with fuel feed stream 105 inside syngas heat recovery heat exchanger 110. In some cases the values are presented relative to other values in the Tables, such as for example "relative to the reforming pressure", "relative to the reforming temperature", "relative to atmospheric pressure" or "relative to saturated steam temperature" in which case the presented values may be above or below ("+xxx"/"−yyy") or a multiple of ("times") the identified property, showing the interrelatedness of the properties. In addition, in some cases the values presented may refer to a specific physical parameter such as "above dew point" or "above freezing point" in which case the identified stream should meet the requirement based on the identified physical parameter of the stream. "Reforming pressure" or "reforming temperature" in the tables refer to the properties associated with syngas stream 180. It should be understood that the values presented are by way of example only and that different configurations of the reforming system may be used that may have different conditions in one or more of the relevant streams.

TABLE 5

Temperature and Pressure Properties of Some Process Streams of an Embodiment According to FIG. 1

| | Temperature (° C.) | Pressure (bara) |
|---|---|---|
| Streams 180, 170 & 182 - "reforming temperature" or "reforming pressure" | | |
| Preferred range of conditions | 700 to 1000 | 5 to 120 |
| Example ranges of conditions | 750 to 950, 900 to 1000, 800 to 900, 700 to 800, 760 to 900, 780 to 820 | 10 to 80, 50 to 100, 40 to 60, 30 to 50, 10 to 40, 15 to 30, 5 to 20, 5 to 10, 10 to 15 |
| Stream 174 | | |
| Preferred range of conditions | Relative to saturated steam temperature: −10 to +100 | Relative to reforming pressure: 1.25 to 1 times |
| Example ranges of conditions | Relative to saturated steam temperature: −0 to +80, +10 to +70, +20 to +50 | Relative to reforming pressure: 1.2 to 1.01 times, 1.15 to 1.01 times, 1.1 to 1.02 times |
| Stream 811 | | |
| Preferred range of conditions | 500 to 700 | Relative to reforming pressure: 1.25 to 1 times |
| Example ranges of conditions | 520 to 680, 530 to 600, 540 to 560 | Relative to reforming pressure: 1.2 to 1.01 times, 1.15 to 1.01 times, 1.1 to 1.02 times |
| Stream 160 immediately prior to entering pre-reformer 800 | | |
| Preferred range of conditions | Relative to reforming temperature: +10 to +50 | Relative to atmospheric pressure: 1.25 to 1 times |
| Example ranges of conditions | Relative to reforming temperature: +12 to +40, +15 to +30, +18 to +25 | Relative to atmospheric pressure: 1.2 to 1.01 times, 1.15 to 1.01 times, 1.1 to 1.02 times |
| Stream 190 | | |
| Preferred range of conditions | 200 to minimum metal dusting temperature | Relative to reforming pressure: 0.75 to 1 times |
| Example ranges of conditions | 250 to 450, 300 to 420, 350 to 400 | Relative to reforming pressure: 0.8 to 0.9999 times, 0.85 to 0.9999 times, 0.95 to 0.999 times, 0.99 to 0.999 times |

TABLE 6

Temperature and Pressure Properties of Some Process Streams of an Embodiment According to FIG. 1

| | Temperature (° C.) | Pressure (bara) |
|---|---|---|
| Stream 189 | | |
| Preferred range of conditions | 250 to 350 | Relative to reforming pressure: 0.75 to 1 times |
| Example ranges of conditions | 260 to 340, 280 to 330, 290 to 310 | Relative to reforming pressure: 0.8 to 0.9999 times, 0.85 to 0.9999 times, 0.95 to 0.999 times, 0.99 to 0.999 times |
| Stream 191 | | |
| Preferred range of conditions | 100 to 200 | Relative to reforming pressure: 0.75 to 1 times |
| Example ranges of conditions | 120 to 180, 130 to 170, 130 to 150 | Relative to reforming pressure: 0.8 to 0.9999 times, 0.85 to 0.9999 times, 0.95 to 0.999 times, 0.99 to 0.999 times |

TABLE 6-continued

Temperature and Pressure Properties of Some Process Streams of an Embodiment According to FIG. 1

| | Temperature (° C.) | Pressure (bara) |
|---|---|---|
| Stream 192 | | |
| Preferred range of conditions | 100 to 200 | Relative to reforming pressure: 0.7 to 0.999 times |
| Example ranges of conditions | 110 to 180, 115 to 160, 120 to 150 | Relative to reforming pressure: 0.8 to 0.999 times, 0.85 to 0.999 times, 0.95 to 0.99 times, 0.98 to 0.99 times |
| Stream 102 entering syngas heat recovery heat exchanger 110 | | |
| Preferred conditions | Above dew point to below stream 190 temperature | Relative to reforming pressure: 1.25 to 1 times |
| Example ranges of conditions | −40 to 350, −10 to 250, 0 to 200, 10 to 150, 15 to 50 | Relative to reforming pressure: 1.2 to 1.01 times, 1.15 to 1.01 times, 1.1 to 1.03 times |
| Stream 102 leaving syngas heat recovery heat exchanger 110 | | |
| Preferred conditions | Relative to syngas feed stream 190 temperature: −20 to −100 | Relative to reforming pressure: 1.25 to 1 times |
| Example ranges of conditions | Relative to syngas feed stream 190 temperature: −25 to −90, −25 to −50, −25 to −40 | Relative to reforming pressure: 1.2 to 1.01 times, 1.15 to 1.01 times, 1.1 to 1.03 times |

TABLE 7

Temperature and Pressure Properties of Some Process Streams of an Embodiment According to FIG. 1

| | Temperature (° C.) | Pressure (bara) |
|---|---|---|
| Stream 108 entering syngas heat recovery heat exchanger 109 | | |
| Preferred conditions | Above freezing point to below stream 190 temperature | Relative to reforming pressure: 1.3 to 1 times |
| Example ranges of conditions | 0.1 to 350, 1 to 250, 10 to 150, 15 to 50 | Relative to reforming pressure: 1.2 to 1.01 times, 1.15 to 1.01 times, 1.1 to 1.03 time |
| Stream 108 leaving syngas heat recovery heat exchanger 109 | | |
| Preferred conditions | 100 to 200 | Relative to reforming pressure: 1.3 to 1 times |
| Example ranges of conditions | 110 to 190, 120 to 180, 120 to 150, 120 to 140 | Relative to reforming pressure: 1.2 to 1.01 times, 1.15 to 1.01 times, 1.1 to 1.03 time |
| Stream 107, air feed stream entering syngas heat recovery heat exchanger 110 | | |
| Preferred conditions | Above stream dew point to below stream 190 temperature | Relative to atmospheric pressure: 1.2 to 1 times |
| Example ranges of conditions | −40 to 350, −10 to 250, 0 to 200, 10 to 150, 15 to 50 | Relative to reforming pressure: 1.2 to 1.01 times, 1.15 to 1.01 times, 1.1 to 1.03 times |
| Stream 107, air feed stream leaving syngas heat recovery heat exchanger 110 | | |
| Preferred conditions | Relative to syngas feed stream 190 temperature: −20 to −100 | Relative to atmospheric pressure: 1.2 to 1 times |
| Example ranges of conditions | Relative to syngas feed stream 190 temperature: −25 to −90, −25 to −50, −25 to −40 | Relative to atmospheric pressure: 1.2 to 1.01 times, 1.15 to 1.01 times, 1.1 to 1.03 times |
| Stream 105, fuel feed stream entering syngas heat recovery heat exchanger 110 | | |
| Preferred conditions | Above stream dew point to below stream 190 temperature | Relative to atmospheric pressure: 10 to 1.01 times |
| Example ranges of conditions | −40 to 350, −10 to 250, 0 to 200, 10 to 150, 15 to 50 | Relative to atmospheric pressure: 8 to 1.01 times, 5 to 1.01 times, 1.2 to 1.01 times, 1.1 to 1.03 times |

TABLE 8

Temperature and Pressure Properties of Some Process Streams of an Embodiment According to FIG. 1

| | Temperature (° C.) | Pressure (bara) |
|---|---|---|
| Stream 118, air/fuel effluent from syngas heat recovery heat exchanger 110 | | |
| Preferred conditions | Relative to syngas feed stream 190 temperature: −20 to −100 | Relative to atmospheric pressure: 10 to 1.01 times |
| Example ranges of conditions | Relative to syngas feed stream 190 temperature: −25 to −90, −25 to −50, −25 to −40 | Relative to atmospheric pressure: 8 to 1.01 times, 5 to 1.01 times, 1.2 to 1.01 times, 1.1 to 1.03 times |
| Stream 162 | | |
| Preferred conditions | 200 to 400 | Relative to atmospheric pressure: 1.1 to 1 times |
| Example ranges of conditions | 200 to 300, 220 to 280 | Relative to atmospheric pressure: 1.05 to 1.001 times, 1.02 to 1.001 times |
| Stream 163 entering heat exchanger 164 | | |
| Preferred conditions | 300 to 500 | Relative to atmospheric pressure: 1.1 to 1 times |
| Example ranges of conditions | 350 to 480, 380 to 440 | Relative to atmospheric pressure: 1.05 to 1.001 times, 1.02 to 1.001 times |
| Stream 163 leaving heat exchanger 164 | | |
| Preferred conditions | 120 to 200 | Relative to atmospheric pressure: 1.1 to 1 times |
| Example ranges of conditions | 130 to 190, 140 to 160 | Relative to atmospheric pressure: 1.05 to 1.001 times, 1.02 to 1 times |
| Stream 108 leaving heat exchanger 164 | | |
| Preferred conditions | 120 to saturated steam temperature | Relative to reforming pressure: 1.25 to 1 times |
| Example ranges of conditions | 130 to saturated steam temperature 150 to saturated steam temperature 180 to saturated steam temperature | Relative to reforming pressure: 1.1 to 1.001 times, 1.1 to 1.01 times, 1.1 to 1.05 times |
| Stream 172 | | |
| Preferred conditions | Saturated steam temperature | Relative to reforming pressure: 1.25 to 1 times |
| Example ranges of conditions | Saturated steam temperature | Relative to reforming pressure: 1.1 to 1.001 times, 1.1 to 1.01 times, 1.1 to 1.05 times |

Figure 20:
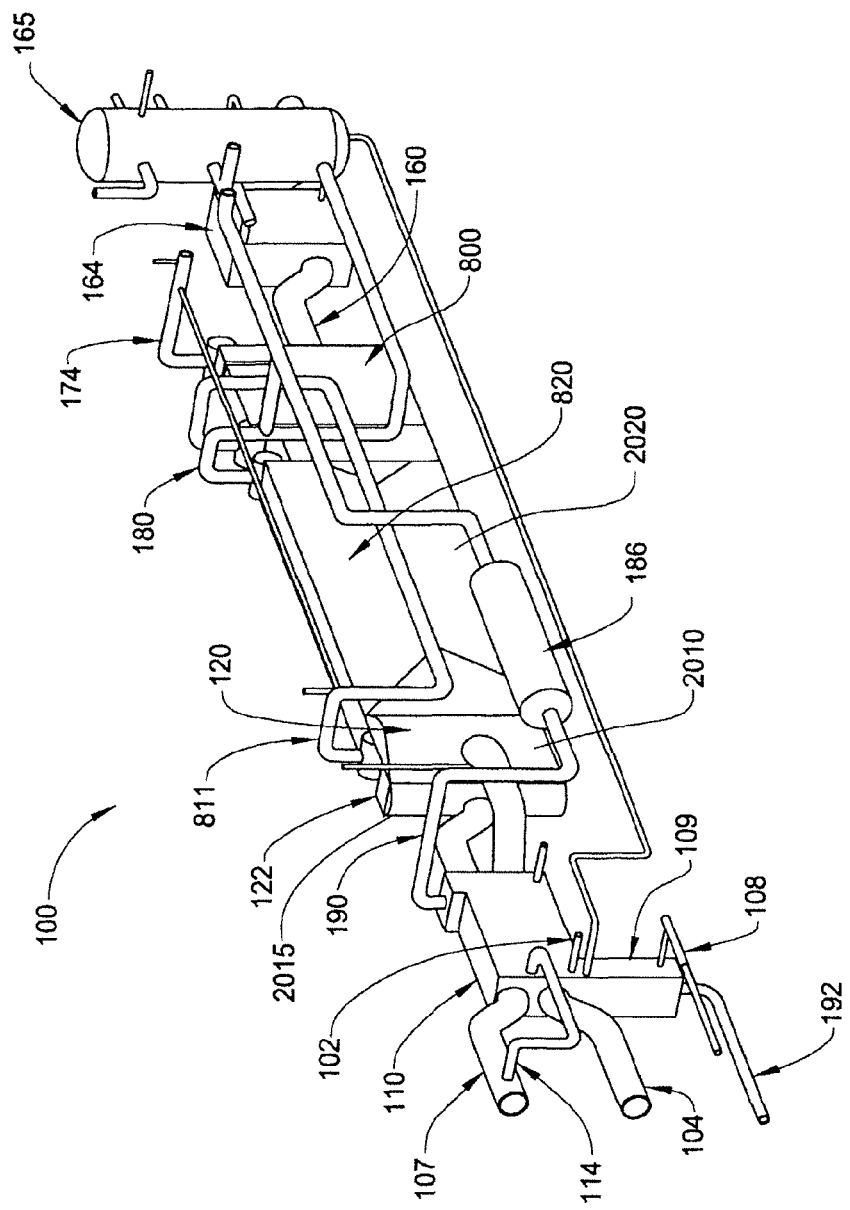
FIG. 20 shows a front perspective view of a partial configuration for an embodiment of a reformer system 100.
Figure 21:
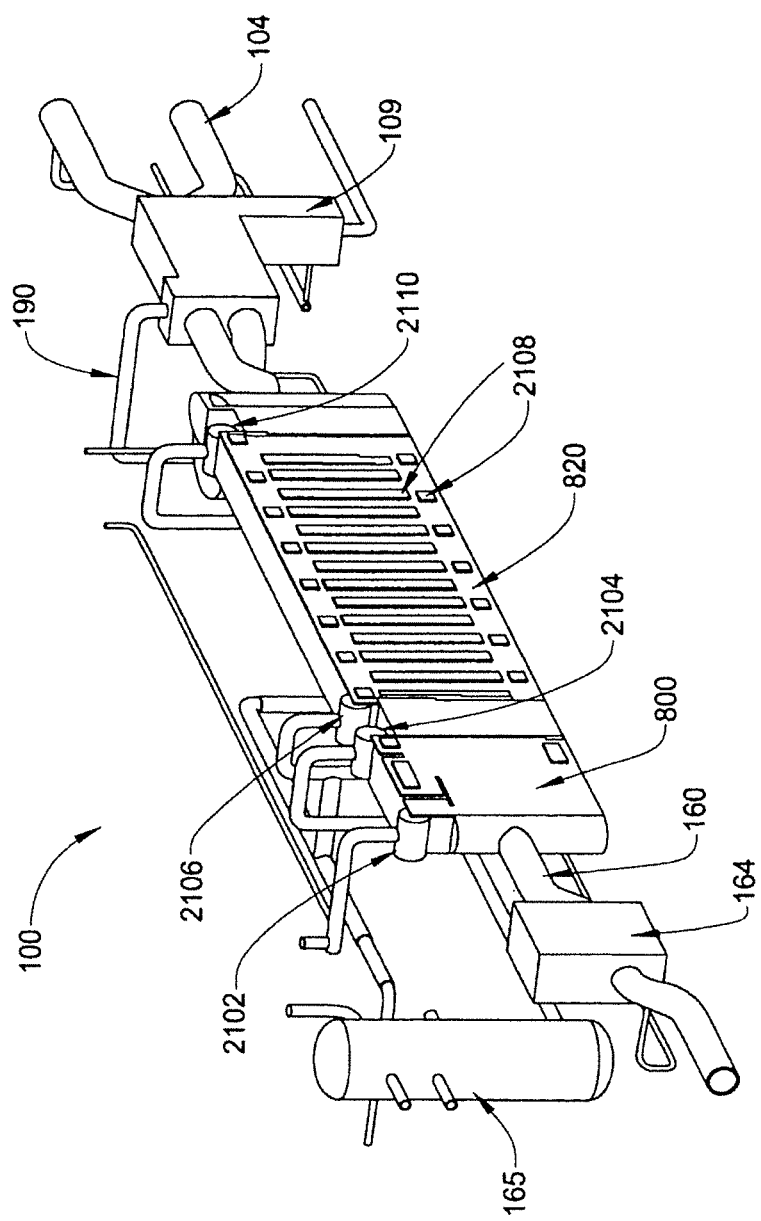
FIG. 21 shows a rear perspective view of a partial configuration for an embodiment of a reformer system 100 shown in FIG. 20.

FIG. 20-21 show front and rear perspective views of a partial configuration of an embodiment of a reformer system 700. The figures have been simplified by removing portions of the piping. The embodiment shown corresponds to a system having the schematic of FIG. 7. As such, only air feed stream 107, combustion air stream 114, fuel stream 104, gaseous hydrocarbon stream 102 enter syngas heat recovery heat exchanger 110 and water stream 108 enters heat exchanger 109, which is part of syngas heat recovery heat exchanger 110, to exchange heat with syngas stream 190 leaving water-gas shift reactor 186. Among the streams or piping not shown is the split of the fuel/air mixture leaving syngas heat recovery heat exchanger 110 to feed fuel/air to the air stream leaving syngas heat recovery heat exchanger 110, prior to the streams entering pre-heaters 120 and 122 as this occurs within the header 2010 supplying pre-heater 120 in connection with the header 2015 for pre-heater 122. After being pre-heated in pre-heater 120, the fuel leaves the pre-heater as the reformer fuel stream and enters a fuel supply header 2020 that spans the length of the reformer 820 and provides for supply of the fuel to each of the individual fuel supply flow access paths or chambers on the reformer stack. In this manner, the fuel may be supplied to each of the reformer stages in parallel and the supply may be passively controlled by the configurations of the individual fuel supply streams connecting to each combustion chamber in the reformer. Because this embodiment corresponds to an embodiment according to FIG. 7, water stream 108 receives heat directly from flue gas stream 160 as it leaves the pre-reformer 800 with no pre-heating of the flue gas stream. After leaving heat exchanger 164, water stream 108 proceeds to quench heat exchanger 165, where it receives heat from a portion of syngas stream 180 after it is split shortly after leaving reformer 820. As shown in FIG. 20-21, pre-reformer 800 and reformer 820 each comprise PCRs that are stacked and diffusion bonded plates as described with respect FIG. 9 and FIG. 11 respectively and then placed on their sides.

Also shown in FIG. 20-21, are gaseous hydrocarbon-steam header 2102 that feeds gaseous hydrocarbon-steam stream 174 to the gaseous hydrocarbon-steam channels on the gaseous hydrocarbon-steam plates of reformer 800 and reformer stream header 2104 that collects the reformer stream 811 as it leaves pre-reformer 800 via the reformer stream channels. From header 2104, reformer stream 811 connects to reformer stream header 2110 that feeds the reformer stream inlet channels of the bounding plates and reformer plates that are included in reformer 820. FIG.

20-21 also include syngas stream header 2106 that collects the reformed streams leaving the bounding plates and the reformer plates of reformer 820 via the reformer stream outlet channels to form syngas stream 180. In FIG. 21, the combustion chamber and the reforming chamber created by stacking the plates are shown capped off with penetration caps 2108, which may be connected, such as welded or otherwise connected over the combustion chamber and the reforming chamber penetrations on the endplate of the reformer 820.

All publications and patent applications mentioned in this specification are herein incorporated by reference to the same extent as if each individual publication or patent application was specifically and individually indicated to be incorporated by reference.

While preferred embodiments of the present invention have been shown and described herein, it will be obvious to those skilled in the art that such embodiments are provided by way of example only. It is intended that the following claims define embodiments of the scope of the invention and that methods and structures within the scope of these claims and their equivalents be covered thereby.

What is claimed is:

1. A method for steam reforming of a gaseous hydrocarbon stream, comprising:
   i) heating a gaseous hydrocarbon-steam stream by recovering heat from a heated air stream to form a heated gaseous hydrocarbon-steam stream and a cooled air stream;
   ii) reforming a portion of the heated gaseous hydrocarbon-steam stream to form a cooled partially reformed stream;
   iii) combusting a fuel/air stream in the presence of the cooled air stream to form a re-heated air stream; and
   iv) heating the cooled partially reformed stream by recovering heat from the re-heated air stream to form a heated partially reformed stream.

2. The method of claim 1, wherein one or more of steps ii-iv occur at a temperature above the maximum metal dusting temperature.

3. The method of claim 2, wherein step i heats the gaseous hydrocarbon-steam stream to a temperature sufficient to reduce metal dusting and/or coking in step ii.

4. The method of claim 1, wherein the heated air stream is formed at least by combusting a further fuel/air stream in the presence of an air stream.

5. The method of claim 1, wherein the fuel/air stream is pre-heated prior to step iii) by combusting a portion of fuel in the fuel/air stream.

6. The method of claim 1, further comprising: forming a syngas stream and a flue gas stream.

7. The method of claim 6, further comprising:
   i) quenching the syngas stream through indirect heat exchange with a water supply to form a steam stream; and
   ii) mixing the steam stream with a gaseous hydrocarbon stream to form the gaseous hydrocarbon-steam stream.

8. The method of claim 7, wherein the heated air stream is formed by at least recovering heat from the quenched synqas stream.

9. The method of claim 7, wherein the water supply is heated prior to quenching by recovering heat from the flue gas stream.

10. The method of claim 9, further comprising:
    combusting a further fuel/air stream in the presence of the flue gas to heat the flue gas prior to heating the water supply.

11. The method of claim 7, further comprising:
    recovering heat from the quenched syngas stream to heat the gaseous hydrocarbon stream.

12. The method of claim 7, further comprising: passing the quenched syngas stream through a water-gas shift reactor under conditions at least sufficient to increase the hydrogen gas concentration of the syngas.

13. A method for steam reforming of a gaseous hydrocarbon stream, comprising:
    i) heating a gaseous hydrocarbon-steam stream by recovering heat from a heated air stream in a first heat exchanger to form a heated gaseous hydrocarbon-steam stream and a cooled air stream;
    ii) reforming a portion of the heated gaseous hydrocarbon-steam stream to form a cooled partially reformed stream;
    iii) combusting a fuel/air stream in the presence of the cooled air stream to form a re-heated air stream; and
    iv) heating the cooled partially reformed stream by recovering heat from the re-heated air stream in a second heat exchanger to form a heated partially reformed stream.

14. The method of claim 13, wherein the fuel/air stream is pre-heated downstream of the first heat exchanger and upstream of the second heat exchanger by combusting a portion of fuel in the fuel/air stream.

15. The method of claim 13, wherein one or more of steps ii-iv occur at a temperature above the maximum metal dusting temperature.

16. The method of claim 15, wherein the first heat exchanger heats the gaseous hydrocarbon-steam stream to a temperature sufficient to reduce metal dusting and/or coking in step ii.

17. The method of claim 13, further comprising:
    i) forming a syngas stream and a flue gas stream;
    ii) quenching the syngas stream through indirect heat exchange with a water supply to form a steam stream; and
    iii) mixing the steam stream with a gaseous hydrocarbon stream to form the gaseous hydrocarbon-steam stream.

18. The method of claim 17, wherein the heated air stream is formed by at least recovering heat from the quenched syngas stream.

19. The method of claim 17, further comprising: recovering heat from the flue gas stream to heat the water supply prior to the quenching.

20. The method of claim 19, further comprising: combusting a further fuel/air stream in the presence of the flue gas to heat the flue gas prior to heating the water supply.

21. The method of claim 17, further comprising: recovering heat from the quenched syngas stream to heat the gaseous hydrocarbon stream.

22. The method of claim 17, further comprising: passing the quenched syngas stream through a water-gas shift reactor under conditions at least sufficient to increase the hydrogen gas concentration of the syngas.

23. A method for steam reforming of a gaseous hydrocarbon stream, comprising:
    i) heating a gaseous hydrocarbon-steam stream by recovering heat from a heated air stream in a heat exchanger to form a heated gaseous hydrocarbon-steam stream and a cooled air stream;
    ii) reforming a portion of the heated gaseous hydrocarbon-steam stream to form a cooled partially reformed stream;
    iii) combusting, downstream of the heat exchanger, a fuel/air stream in the presence of the cooled air stream to form a re-heated air stream; and iv) heating the cooled partially reformed stream by recovering heat from the re-heated air stream to form a heated partially reformed stream.

24. The method of claim 23, wherein one or more of steps ii-iv occur at a temperature above the maximum metal dusting temperature.

25. The method of claim 24, wherein step iii heats the reheated air stream to a temperature sufficient to reduce metal dusting and/or coking in step iv.

26. The method of claim 23, wherein the fuel/air stream is pre-heated prior to step iii) by combusting a portion of fuel in the fuel/air stream outside of the heat exchanger.

27. The method of claim 23, wherein the heated air stream is formed by at least combusting a further fuel/air streamin the presence of an air stream upstream of the heat exchanger.

* * * * *